(12) United States Patent
Hirairi

(10) Patent No.: US 8,648,650 B2
(45) Date of Patent: Feb. 11, 2014

(54) INTEGRATED CIRCUIT WITH DYNAMIC POWER SUPPLY CONTROL

(75) Inventor: Koji Hirairi, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 13/571,613

(22) Filed: Aug. 10, 2012

(65) Prior Publication Data

US 2013/0063206 A1 Mar. 14, 2013

(30) Foreign Application Priority Data

Sep. 12, 2011 (JP) .................................. 2011-197941

(51) Int. Cl.
*G05F 1/10* (2006.01)

(52) U.S. Cl.
USPC .......................................... 327/544; 327/143

(58) Field of Classification Search
USPC ................. 327/564, 544, 141–153, 155, 162; 326/93–98
See application file for complete search history.

(56) References Cited

U.S. PATENT DOCUMENTS 7,782,125 B2 * 8/2010 Shimura ....................... 327/544

FOREIGN PATENT DOCUMENTS

JP 2010-118746 5/2010

* cited by examiner

*Primary Examiner* — Lincoln Donovan
*Assistant Examiner* — Thomas Skibinski
(74) *Attorney, Agent, or Firm* — Rader, Fishman & Grauer PLLC

(57) ABSTRACT

Disclosed herein is an integrated circuit including: a timing signal distribution circuit configured to distribute a timing signal that indicates predetermined timing; a synchronous operation circuit configured to operate in synchronization with the distributed timing signal; a logic circuit configured to perform predetermined logical operation based on an operation result of the synchronous operation circuit; and a power supply section configured to supply a voltage lower than a timing signal distribution circuit drive voltage to drive the timing signal distribution circuit as a logic circuit drive voltage to the logic circuit.

8 Claims, 59 Drawing Sheets

FIG.31

| ERR_CNT | vCK | OPERATION OF CLOCK DISTRIBUTION CIRCUIT DRIVE VOLTAGE CONTROL CIRCUIT |
|---|---|---|
| ERR_CNT<Th | vCK=Vsc | — |
| | vCK>Vsc | DROP CLOCK DISTRIBUTION CIRCUIT DRIVE VOLTAGE vCK TO Vsc |
| ERR_CNT≧Th | — | URGENTLY BOOST CLOCK DISTRIBUTION CIRCUIT DRIVE VOLTAGE vCK TO Vec (>Vsc) |

FIG.34

| ERR_CNT | vDP | OPERATION OF LOGIC CIRCUIT DRIVE VOLTAGE CONTROL CIRCUIT |
|---|---|---|
| ERR_CNT<Th | vDP=Vsd | — |
| | vDP>Vsd | DROP LOGIC CIRCUIT DRIVE VOLTAGE vDP TO Vsd |
| ERR_CNT≧Th | — | URGENTLY BOOST LOGIC CIRCUIT DRIVE VOLTAGE vDP TO Ved (> Vsd) |

FIG.47

| ERR_1 | ERR_2 | ERROR FLAG PREVIOUS VALUE ERR_PRE | OPERATION OF ERROR ANALYZER |
|---|---|---|---|
| 0 | 0 | — | HOLD VIOLATION ALERT FLAG AL_HOLD← 0<br>HOLD VIOLATION ERROR FLAG ERR_HOLD← 0<br>SETUP VIOLATION ERROR FLAG ERR_SET← 0<br>ERROR FLAG PREVIOUS VALUE ERR_PRE← 00 |
| 0 | 1 | 00 | HOLD VIOLATION ALERT FLAG AL_HOLD← 1<br>HOLD VIOLATION ERROR FLAG ERR_HOLD← 0<br>SETUP VIOLATION ERROR FLAG ERR_SET← 0<br>ERROR FLAG PREVIOUS VALUE ERR_PRE← 01 |
| 0 | 1 | 01 OR 11 | HOLD VIOLATION ALERT FLAG AL_HOLD← 0<br>HOLD VIOLATION ERROR FLAG ERR_HOLD← 0<br>SETUP VIOLATION ERROR FLAG ERR_SET← 0<br>ERROR FLAG PREVIOUS VALUE ERR_PRE← 01 |
| 1 | 0 | — | × |
| 1 | 1 | 00 | SETUP VIOLATION ERROR FLAG ERR_SET← 1<br>HOLD VIOLATION ALERT FLAG AL_HOLD← 0<br>HOLD VIOLATION ERROR FLAG ERR_HOLD← 0<br>ERROR FLAG PREVIOUS VALUE ERR_PRE← 11 |
| 1 | 1 | 01 | HOLD VIOLATION ERROR FLAG ERR_HOLD← 1<br>HOLD VIOLATION ALERT FLAG AL_HOLD← 0<br>SETUP VIOLATION ERROR FLAG ERR_SET← 0<br>ERROR FLAG PREVIOUS VALUE ERR_PRE← 11 |
| 1 | 1 | 11 | — |

FIG.48

| HOLD VIOLATION ALERT FLAG AL_HOLD | HOLD VIOLATION ERROR FLAG ERR_HOLD | SETUP VIOLATION ERROR FLAG ERR_SET | OPERATION OF POWER SUPPLY SECTION |
|---|---|---|---|
| 0 | 0 | 0 | • CONTROL CLOCK DISTRIBUTION CIRCUIT DRIVE VOLTAGE vCK TO Vsc<br>• CONTROL LOGIC CIRCUIT DRIVE VOLTAGE vDP TO Vsd |
| 0 | 0 | 1 | • URGENTLY BOOST CLOCK DISTRIBUTION CIRCUIT DRIVE VOLTAGE vCK TO Vec<br>• URGENTLY BOOST LOGIC CIRCUIT DRIVE VOLTAGE vDP TO Ved |
| 0 | 1 | 0 | • URGENTLY BOOST CLOCK DISTRIBUTION CIRCUIT DRIVE VOLTAGE vCK TO Vec<br>• CONTROL LOGIC CIRCUIT DRIVE VOLTAGE vDP TO Vsd |
| 0 | 1 | 1 | × |
| 1 | 0 | 0 | • BOOST CLOCK DISTRIBUTION CIRCUIT DRIVE VOLTAGE vCK TO Vac (>Vec)<br>• CONTROL LOGIC CIRCUIT DRIVE VOLTAGE vDP TO Vsd |
| 1 | 0 | 1 | |
| 1 | 1 | 0 | × |
| 1 | 1 | 1 | |

FIG.56

| COUNT VALUE OF ERROR FLAG ERR01_ CNT AND ERR11_CNT | OPERATION OF ERROR ANALYZER |
|---|---|
| ERR11_CNT = 0 AND ERR01_CNT = 0 | HOLD VIOLATION ALERT FLAG AL_HOLD← 0<br>HOLD VIOLATION ERROR FLAG ERR_HOLD← 0<br>SETUP VIOLATION ERROR FLAG ERR_SET← 0 |
| ERR01_CNT>0 AND ERR11_CNT = 0 | HOLD VIOLATION ALERT FLAG AL_HOLD← 1<br>HOLD VIOLATION ERROR FLAG ERR_HOLD← 0<br>SETUP VIOLATION ERROR FLAG ERR_SET← 0 |
| ERR01_CNT>ERR11_CNT>0 | HOLD VIOLATION ERROR FLAG ERR_HOLD← 1<br>HOLD VIOLATION ALERT FLAG AL_HOLD← 0<br>SETUP VIOLATION ERROR FLAG ERR_SET← 0 |
| ERR11_CNT≧ERR01_CNT>0 | SETUP VIOLATION ERROR FLAG ERR_SET← 1<br>HOLD VIOLATION ALERT FLAG AL_HOLD← 0<br>HOLD VIOLATION ERROR FLAG ERR_HOLD← 0 |
| ERR11_CNT>0 AND ERR01_CNT = 0 | |

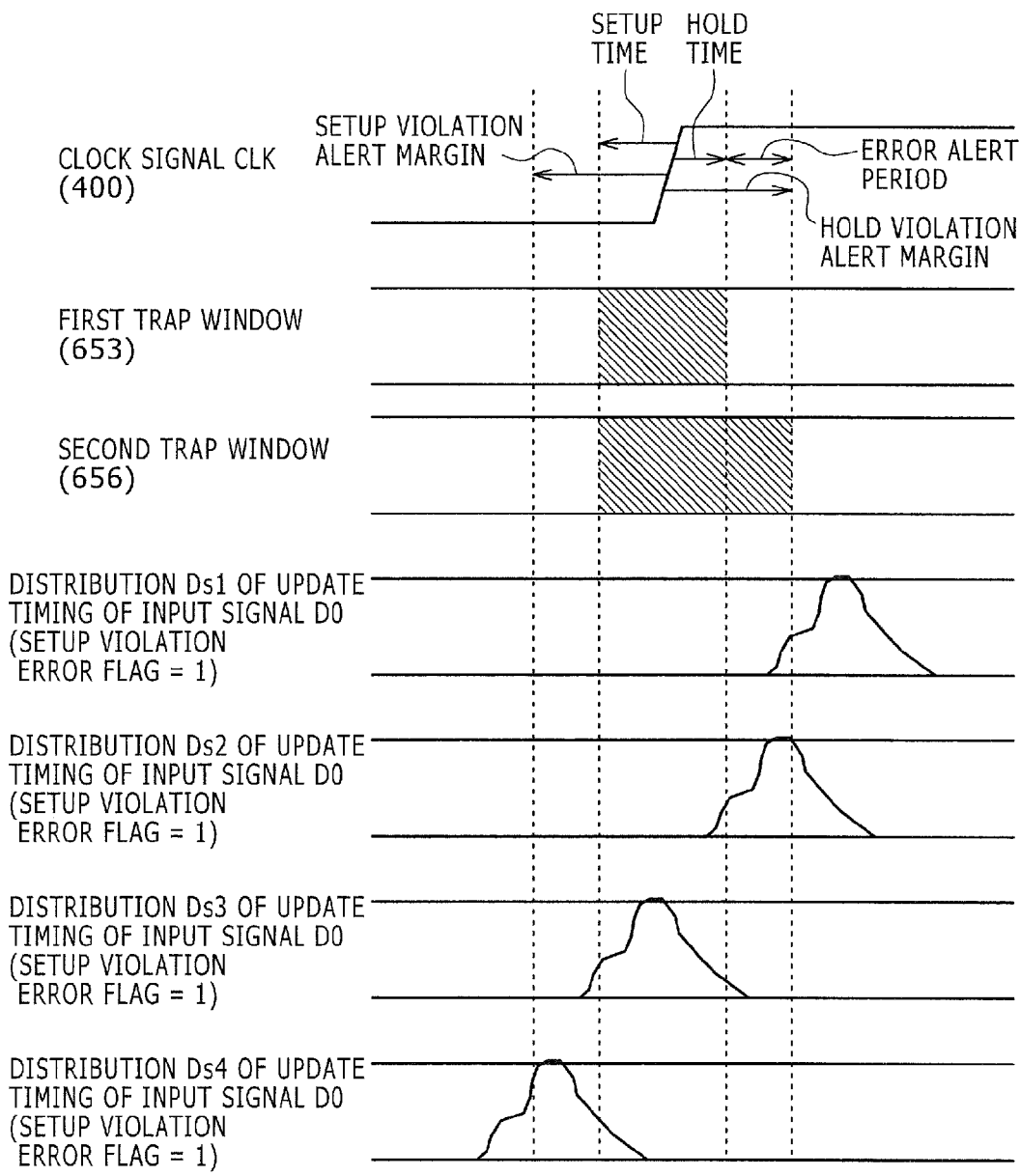

INTEGRATED CIRCUIT WITH DYNAMIC POWER SUPPLY CONTROL

BACKGROUND

The present technique relates to integrated circuits. Specifically, the present technique relates to an integrated circuit that operates in synchronization with a timing signal.

It is known that, when the drive voltage of an integrated circuit including a circuit (e.g. flip-flop) that operates in synchronization with a timing signal such as a clock signal is lowered, variation in skew exponentially increases along with the lowering of the drive voltage. The skew is the difference between delay time until the timing signal reaches a certain circuit and delay time until the timing signal reaches a circuit different from this circuit.

The increase in the skew variation possibly causes the occurrence of a timing error in the circuit such as a flip-flop. The timing error refers to the occurrence of a malfunction in the circuit due to deviation of the timing when the timing signal reaches the circuit from the range supposed in the design.

To suppress this increase in the skew variation, a method for controlling an integrated circuit has been proposed. In this method, when the drive voltage is lowered, simultaneously the operating frequency of the integrated circuit is also lowered (refer to e.g. Japanese Patent Laid-open No. 2010-118746). By lowering the operating frequency at most to such an extent that a timing error does not occur, the power consumption is reduced with ensuring of the stable operation of the integrated circuit.

SUMMARY

However, in the above-described related art, it is often difficult to reduce the amount of power consumption of the integrated circuit. For example, if the drive voltage is lowered when the operating frequency needs to be kept constant, skew variation increases as described above. Furthermore, the incidence rate of a malfunction of the integrated circuit becomes higher due to the increase in the skew variation. Therefore, it is difficult to reduce the amount of power consumption with ensuring of the stable operation of the integrated circuit when the operating frequency is kept constant.

There is a need for the present technique to easily reduce the amount of power consumption in an integrated circuit.

According to an embodiment of the present technique, there is provided an integrated circuit including a timing signal distribution circuit configured to distribute a timing signal that indicates predetermined timing, a synchronous operation circuit configured to operate in synchronization with the distributed timing signal, a logic circuit configured to perform predetermined logical operation based on an operation result of the synchronous operation circuit, and a power supply section configured to supply a voltage lower than a timing signal distribution circuit drive voltage to drive the timing signal distribution circuit as a logic circuit drive voltage to the logic circuit. This provides operation that the logic circuit drive voltage lower than the timing signal distribution circuit drive voltage is supplied.

Furthermore, in this embodiment, the power supply section may further supply a voltage having the same voltage value as the voltage value of the logic circuit drive voltage to the synchronous operation circuit. This provides operation that the voltage having the same voltage value as that of the logic circuit drive voltage is supplied to the synchronous operation circuit.

In addition, in this embodiment, the power supply section may further supply a voltage having the same voltage value as the voltage value of the timing signal distribution circuit drive voltage to the synchronous operation circuit. This provides operation that the voltage having the same voltage value as that of the timing signal distribution circuit drive voltage is supplied to the synchronous operation circuit.

Moreover, in this embodiment, the power supply section may include a timing signal distribution circuit drive voltage controller that drops a supply voltage and supplies the dropped voltage as the timing signal distribution circuit drive voltage to the timing signal distribution circuit, and a logic circuit drive voltage controller that drops the supplied timing signal distribution circuit drive voltage and supplies the dropped voltage as the logic circuit drive voltage to the logic circuit. This provides operation that the voltage obtained by dropping the timing signal distribution circuit drive voltage is supplied as the logic circuit drive voltage.

Furthermore, in this embodiment, the power supply section may include a timing signal distribution circuit drive voltage controller that drops a supply voltage and supplies the dropped voltage as the timing signal distribution circuit drive voltage to the timing signal distribution circuit, and a logic circuit drive voltage controller that drops the supply voltage to a voltage lower than the timing signal distribution circuit drive voltage and supplies the dropped voltage as the logic circuit drive voltage to the logic circuit. This provides operation that the voltage obtained by dropping the supply voltage is supplied as the timing signal distribution circuit drive voltage or the logic circuit drive voltage.

In addition, in this embodiment, the integrated circuit may further include an error detector configured to detect an error in the synchronous operation circuit, and the power supply section may boost the timing signal distribution circuit drive voltage if the detection frequency of the error is equal to or higher than a predetermined value. This provides operation that the timing signal distribution circuit drive voltage is boosted if the detection frequency of the error is equal to or higher than the predetermined value.

Moreover, in this embodiment, the power supply section may boost the logic circuit drive voltage if the detection frequency of the error is equal to or higher than the predetermined value. This provides operation that the logic circuit drive voltage is boosted if the detection frequency of the error is equal to or higher than the predetermined value.

According to another embodiment of the present technique, there is provided an integrated circuit including a timing signal distribution circuit configured to distribute a timing signal that indicates predetermined timing, a synchronous operation circuit configured to operate in synchronization with the distributed timing signal, a logic circuit configured to perform predetermined logical operation based on an operation result of the synchronous operation circuit, and a power supply section configured to supply a voltage higher than a logic circuit drive voltage to drive the logic circuit as a timing signal distribution circuit drive voltage to the timing signal distribution circuit if the logic circuit drive voltage is lower than a first voltage. This provides operation that the timing signal distribution circuit drive voltage higher than the logic circuit drive voltage is supplied if the logic circuit drive voltage is lower than the first voltage.

Furthermore, in this embodiment, the power supply section may supply a voltage lower than the logic circuit drive voltage as the timing signal distribution circuit drive voltage to the timing signal distribution circuit if the logic circuit drive voltage is higher than a second voltage that is a voltage higher than the first voltage. This provides operation that the timing signal distribution circuit drive voltage lower than the logic circuit drive voltage is supplied if the logic circuit drive voltage is higher than the second voltage.

In addition, in this embodiment, the power supply section may keep constant difference between the voltage value of the logic circuit drive voltage and the voltage value of the timing signal distribution circuit drive voltage if the logic circuit drive voltage is lower than the first voltage. This provides operation that the difference between the voltage value of the logic circuit drive voltage and the voltage value of the timing signal distribution circuit drive voltage is kept constant if the logic circuit drive voltage is lower than the first voltage.

Moreover, in this embodiment, the power supply section may supply the first voltage as the timing signal distribution circuit drive voltage to the timing signal distribution circuit if the logic circuit drive voltage is lower than the first voltage. This provides operation that the first voltage is supplied as the timing signal distribution circuit drive voltage if the logic circuit drive voltage is lower than the first voltage.

The embodiments of the present technique can provide an excellent effect that the amount of power consumption can be easily reduced in an integrated circuit.

BRIEF DESCRIPTION OF THE DRAWINGS

FIG. 31 is a diagram showing one example of the operation of a clock distribution circuit drive voltage control circuit in the third embodiment;

FIG. 34 is a diagram showing one example of the operation of a logic circuit drive voltage control circuit in the third embodiment;

FIG. 47 is a diagram showing one example of the operation of an error analyzer in the fourth embodiment;

FIG. 48 is a diagram showing one example of the operation of a power supply section in the fourth embodiment;

FIG. 56 is a diagram showing one example of the operation of the error analyzer in the first modification example of the fourth embodiment;

FIG. 57 is a diagram showing one example of trap windows of the error detection circuit and the update timing of data in the first modification example of the fourth embodiment;

DETAILED DESCRIPTION OF THE PREFERRED EMBODIMENTS

Modes for carrying out the present technique (hereinafter, referred to as the embodiments) will be described below. The order of the description is as follows.

1. First Embodiment (example of clock distribution circuit for reducing clock skew)
2. Second Embodiment (example of main/sub-clock distribution circuits for adaptively reducing variation in delay of a clock signal)
3. Third Embodiment (example of voltage control in which a clock distribution circuit drive voltage is controlled at a voltage lower than a logic circuit drive voltage)
4. Forth Embodiment (example of voltage control in which the kind of timing error is determined to control the drive voltage)

1. First Embodiment

Configuration Example of Integrated Circuit

Figure 1:
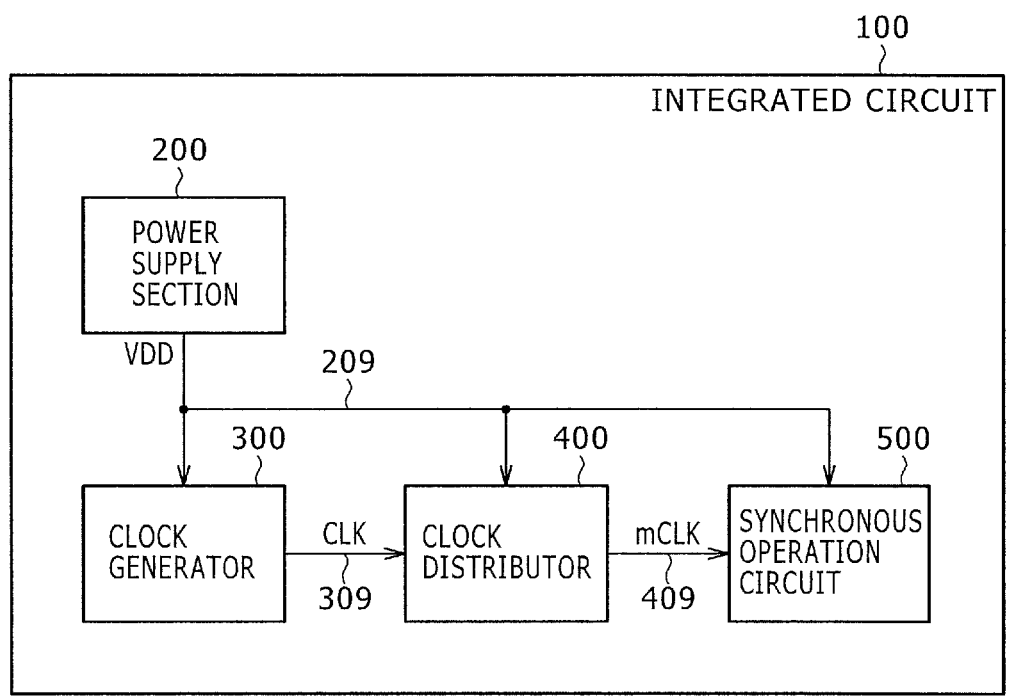
FIG. 1 is a block diagram showing one configuration example of an integrated circuit in a first embodiment.

FIG. 1 is a block diagram showing one configuration example of an integrated circuit 100 in a first embodiment. The integrated circuit 100 in this first embodiment includes a power supply section 200, a clock generator 300, a clock distributor 400, and a synchronous operation circuit 500.

The power supply section 200 supplies a supply voltage VDD to each of the clock generator 300, the clock distributor 400, and the synchronous operation circuit 500 via a signal line 209.

The clock generator 300 generates a clock signal CLK having a predetermined frequency by using e.g. a phase locked loop (PLL). The clock signal CLK is generated as a signal for indicating predetermined timing to the synchronous operation circuit 500. The clock generator 300 outputs the generated clock signal CLK to the clock distributor 400 via a signal line 309.

The clock distributor 400 distributes the clock signal CLK to the synchronous operation circuit 500. The clock distributor 400 generates a minimally-delayed clock signal mCLK from the clock signal CLK. Details of the minimally-delayed clock signal mCLK will be described later. The clock distributor 400 outputs the minimally-delayed clock signal mCLK to the synchronous operation circuit 500 via a signal line 409. The synchronous operation circuit 500 is a circuit that operates in synchronization with the minimally-delayed clock signal mCLK.

[Configuration Example of Clock Distributor]

Figure 2A:
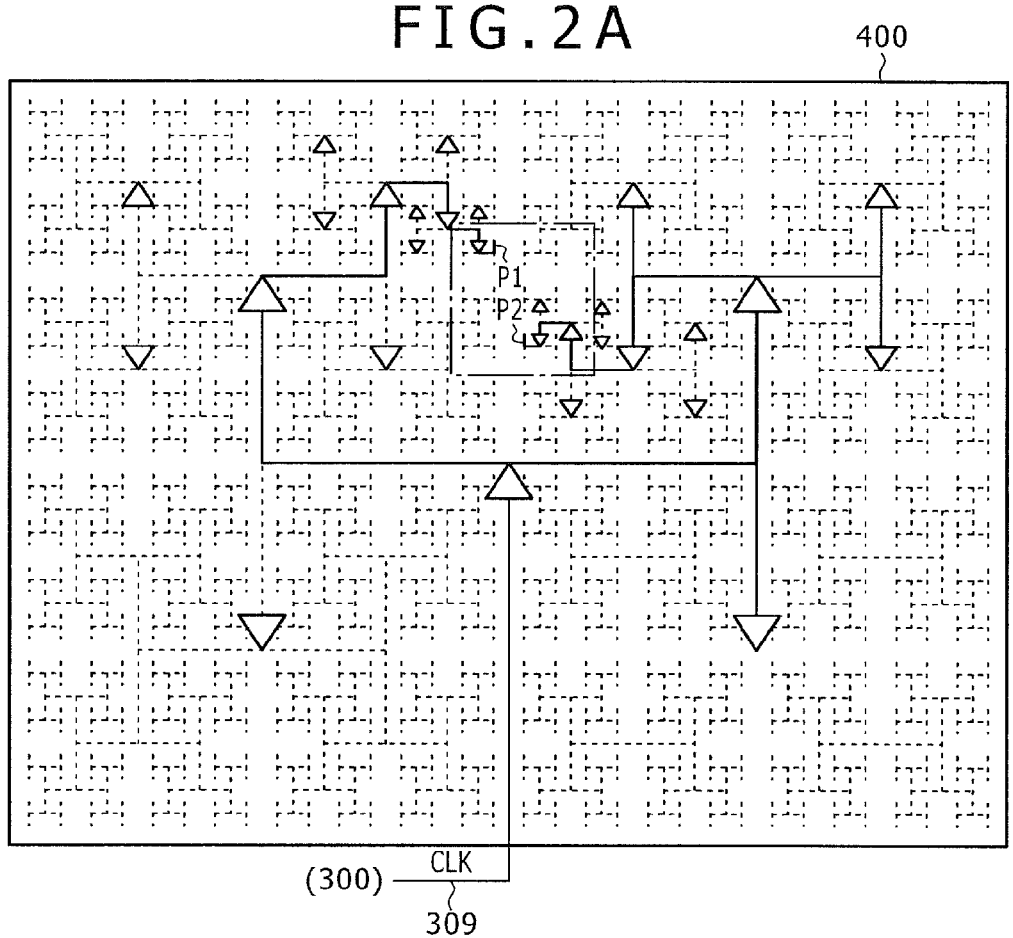
FIGS. 2A and 2B are diagrams showing one configuration example of a clock distributor in the first embodiment.
Figure 2B:
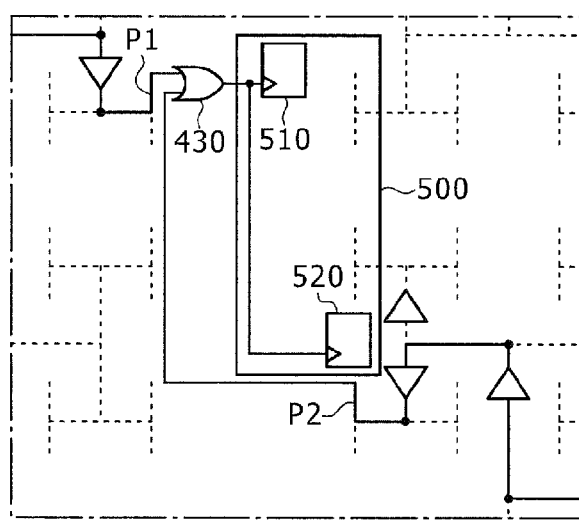

FIGS. 2A and 2B are diagrams showing one configuration example of the clock distributor 400 in the first embodiment. FIG. 2A is a diagram showing an arrangement example of wiring to each of plural distribution points in the clock distributor 400. As exemplified in FIG. 2A, the clock distributor 400 includes a clock tree disposed in an H-tree. Plural buffers are inserted on the paths in this clock tree according to need. The clock signal CLK from the clock generator 300 is input to the root part of the clock tree and this clock signal CLK is distributed to each of the distribution points equivalent to the leaf parts of the clock tree. The synchronous operation circuit 500 or another circuit is connected to each of the distribution points. FIG. 2B is an enlarged diagram of the part surrounded by the one-dot-chain line in FIG. 2A. As shown in FIG. 2B, of the distribution points, distribution points P1 and P2 are connected to the input terminals of an OR (logical sum) gate 430. The output terminal of the OR gate 430 is connected to the synchronous operation circuit 500. Details of the configuration of the synchronous operation circuit 500 will be described later.

The OR gate 430 produces the logical sum of the input values. The OR gate 430 outputs the logical sum of the clock signal from the distribution point P1 and the clock signal from the distribution point P2 to the synchronous operation circuit 500. The respective wiring lines branched in the clock tree do not merge with each other in the middle to the distribution points. Therefore, the circuit from the clock tree root to the distribution point P1 and the circuit from this root to the distribution point P2 have configurations different from each other. For example, the length of wiring and the number of stages of the buffer through which the wiring route passes are different. Thus, difference (i.e. clock skew) possibly arises in the delay time of the clock signal CLK distributed to each of the distribution points P1 and P2. Irrespective of whether or not the Euclidean distance between the distribution points P1 and P2 is short, the clock skew tends to be large at these distribution points if the topological distance in the clock tree is long. Furthermore, if the supply voltage VDD from the power supply section 200 is lowered, possibly variation in the clock skew becomes larger. However, because the OR gate 430 outputs the logical sum of the clock signals CLK distributed to each of the distribution points P1 and P2, the rising edge of the clock signal with the smaller delay, of the rising edges of these clock signals CLK, is output. Hereinafter, this clock signal with the smaller delay output from the OR gate 430 will be referred to as the "minimally-delayed clock signal mCLK."

Figure 3:
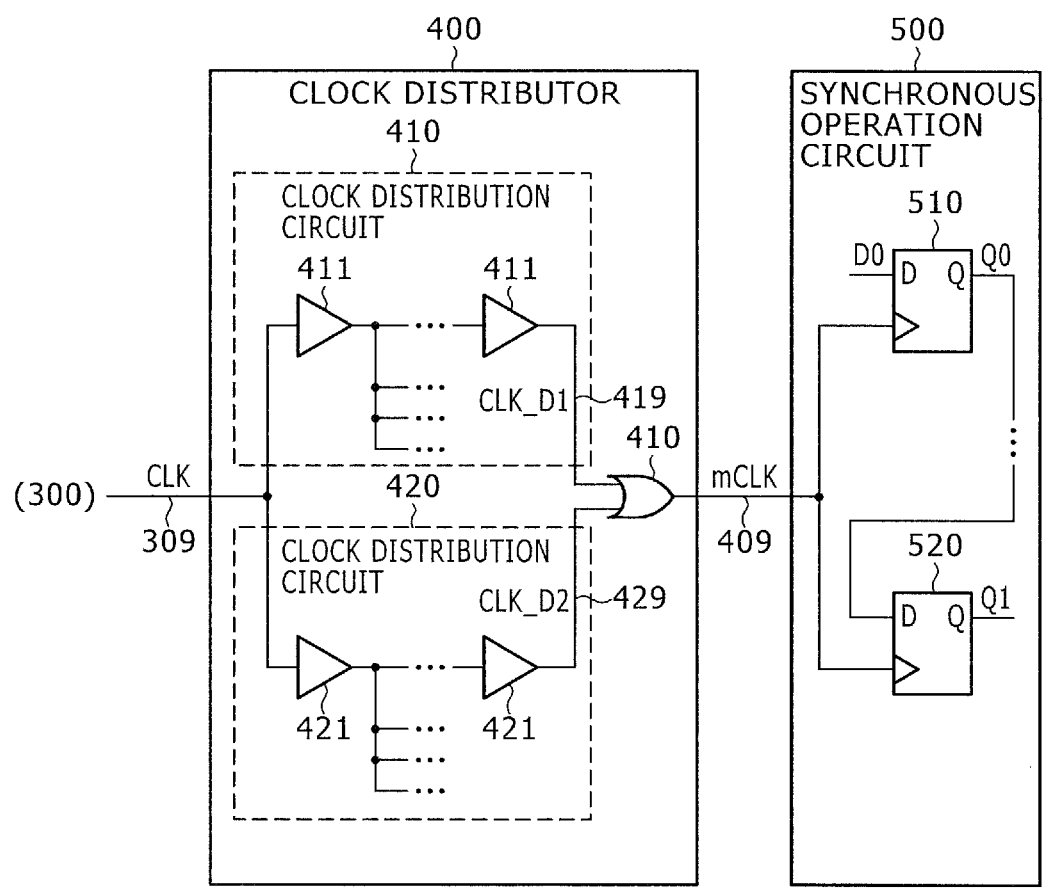
FIG. 3 is a circuit diagram showing one configuration example of the clock distributor and a synchronous operation circuit in the first embodiment.

FIG. 3 is a circuit diagram showing one configuration example of the clock distributor 400 and the synchronous operation circuit 500 in the first embodiment. The clock distributor 400 includes clock distribution circuits 410 and 420 and the OR gate 430. The clock distribution circuit 410 includes buffers 411 of a predetermined number of stages. The clock distribution circuit 420 includes buffers 421 of a predetermined number of stages. The clock distribution circuit 410 distributes the clock signal CLK to any distribution point (e.g. P1) in the clock tree. The clock distribution circuit 410 outputs any of the distributed clock signals as a delayed clock signal CLK_D1 to an input terminal of the OR gate 430 via a signal line 419. The clock distribution circuit 420 distributes the clock signal CLK to a distribution point (e.g. P2) different from the distribution point to which the clock distribution circuit 410 distributes the clock signal. The clock distribution circuit 420 outputs any of the distributed clock signals as a delayed clock signal CLK_D2 to an input terminal of the OR gate 430 via a signal line 429. The clock distribution circuit 410 is one example of the first timing signal distribution circuit set forth in the claims. The clock distribution circuit 420 is one example of the second timing signal distribution circuit set forth in the claims.

The OR gate 430 outputs the logical sum of the delayed clock signals CLK_D1 and CLK_D2 as the minimally-delayed clock signal mCLK to the synchronous operation circuit 500 via the signal line 409. The OR gate 430 is one example of the minimally-delayed clock signal output section set forth in the claims.

The synchronous operation circuit 500 operates in synchronization with the minimally-delayed clock signal mCLK. The synchronous operation circuit 500 includes e.g. flip-flops 510 and 520. The flip-flops 510 and 520 capture and hold data in synchronization with the minimally-delayed clock signal mCLK. For example, the flip-flop 510 captures and holds data of an input signal D0 in synchronization with the rising edge of the minimally-delayed clock signal mCLK and outputs the held data as an output signal Q0 to the flip-flop 520. The flip-flop 520 captures and holds data of the output signal Q0 in synchronization with the rising edge of the minimally-delayed clock signal mCLK and outputs the held data as an output signal Q1.

Figure 4:
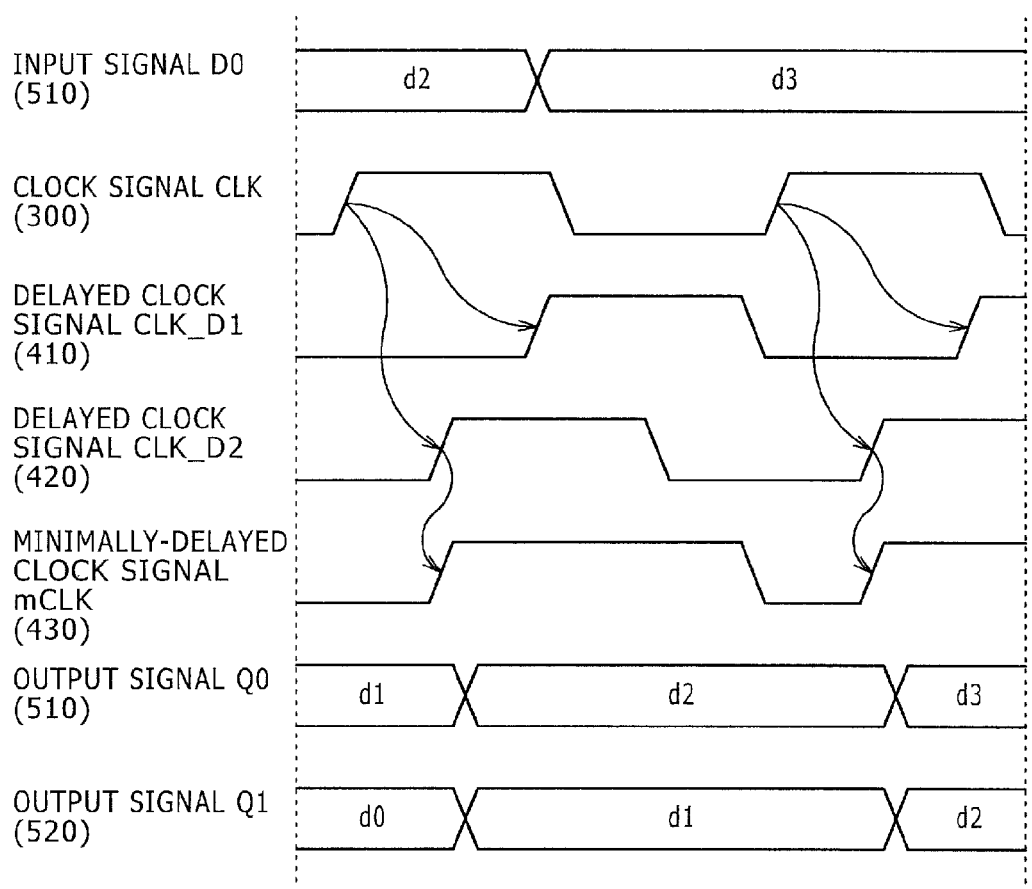
FIG. 4 is a timing chart showing one example of the operation of the synchronous operation circuit in synchronization with the rising of a clock signal in the first embodiment.

FIG. 4 is a timing chart showing one example of the operation of the synchronous operation circuit 500 in synchronization with the rising of the clock signal in the first embodiment. A consideration will be made about the case in which a rising edge is generated in the clock signal CLK at certain timing before the value of the input signal D0 is updated from "d2" to "d3." The clock signal CLK is distributed by the clock distribution circuit 410 and a rising edge is generated in the delayed clock signal CLK_D1 behind the clock signal CLK. Furthermore, the clock signal CLK is distributed by the clock distribution circuit 420 and a rising edge is generated in the delayed clock signal CLK_D2. Suppose that the delay of the delayed clock signal CLK_D1 is larger than that of the delayed clock signal CLK_D2. The OR gate 430 outputs the logical sum of these delayed clock signals as the minimally-delayed clock signal mCLK. If a rising edge is generated in either of the delayed clock signals, the value of the logical sum becomes "1." Thus, a rising edge is generated in the minimally-delayed clock signal mCLK in response to the rising of the delayed clock signal CLK_D2 with the smallest delay. The flip-flop 510 captures the value of "d2" and outputs it as the output signal Q0 to the flip-flop 520 in synchronization with the rising edge of the minimally-delayed clock signal mCLK. The flip-flop 520 captures the value of "d2" in synchronization with the next rising edge of the minimally-delayed clock signal mCLK.

If the delayed clock signals CLK_D1 and CLK_D2 are given to the flip-flops 510 and 520, respectively, without the intermediary of the OR gate 430, a difference (clock skew) often arises in the delay time of these delayed clock signals. If this clock skew increases, possibly trouble is caused in data transfer between the flip-flops 510 and 520 and a malfunction occurs. In particular, when the drive voltage is lowered, variation in the clock skew increases and thus the probability of the occurrence of a malfunction becomes higher. However, in the integrated circuit 100, the clock skew is small because the clock signal mCLK with the smallest delay is supplied to the flip-flops 510 and 520 by the OR gate 430. As a result, the incidence rate of a malfunction of the integrated circuit 100 is decreased.

The measurement value of variation (e.g. standard deviation) in the clock skew of the clock tree in which the OR gate 430 is inserted is smaller than that of the clock tree in which the OR gate 430 is not inserted. For example, when a simulation was performed under a predetermined condition with ten stages of buffers, a result that insertion of the OR gate 430 decreased the measurement value of the standard deviation to about 0.7 times that before the insertion was obtained. In the clock tree, generally increasing the buffer size or decreasing the number of stages of the buffer lowers the variation in the clock skew. To decrease the variation in the clock skew to 0.7 times, the buffer size should be doubled or the number of stages of the buffer should be halved for example. By inserting the OR gate 430, the clock skew can be reduced without changing the buffer size or the number of stages of the buffer. Furthermore, although the OR gate 430 is inserted, a short-circuit current is not generated differently from mesh wiring and thus the amount of power consumption does not increase.

As above, according to the first embodiment, the clock distribution circuit 410 distributes the clock signal CLK to the distribution point P1 and the clock distribution circuit 420 distributes the clock signal CLK to the distribution point P2. The OR gate 430 outputs the signal with the smaller delay, of the clock signals CLK distributed to these distribution points, as the minimally-delayed timing signal mCLK. The synchronous operation circuit 500 operates in synchronization with the minimally-delayed timing signal mCLK. Thereby, the signal with the smaller delay, of the respective clock signals CLK distributed by the clock distribution circuits 410 and 420, is output as the minimally-delayed timing signal mCLK to the synchronous operation circuit 500. This reduces the clock skew in the synchronous operation circuit 500. Furthermore, even when the values of the respective clock signals CLK from the clock distribution circuits 410 and 420 are different, a short-circuit current is not generated differently from mesh wiring and therefore increase in the amount of power consumption is suppressed.

Although the OR gate 430 generates the minimally-delayed timing signal mCLK from two delayed clock signals CLK_D1 and CLK_D2, the minimally-delayed timing signal mCLK may be generated from three or more delayed clock signals.

Although the synchronous operation circuit 500 includes two flip-flops 510 and 520, the circuit configuration of the synchronous operation circuit 500 is not limited to this configuration. For example, it may include one or three or more flip-flops.

Although the integrated circuit 100 has a configuration in which the minimally-delayed timing signal mCLK is generated by using the OR gate 430, the minimally-delayed timing signal mCLK may be generated by a logic gate other than the OR gate. For example, if the synchronous operation circuit 500 operates in synchronization with a falling edge, the integrated circuit 100 may generate the minimally-delayed timing signal mCLK by an AND gate instead of the OR gate.

Although the clock distributor 400 includes a clock tree wired in an H-tree in advance, for example it may include a clock tree generated by using clock tree synthesis (CTS), which is a technique to automatically synthesize a clock tree.

First Modification Example

Figure 5:
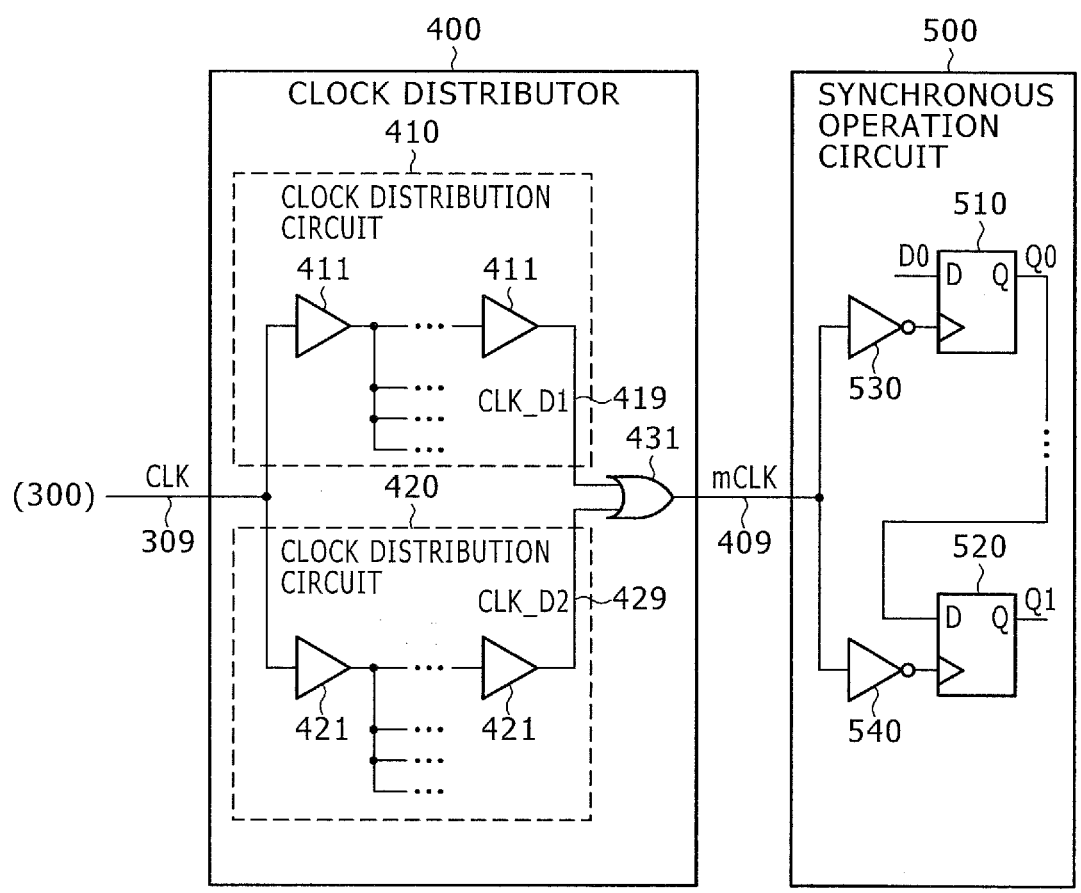
FIG. 5 is a circuit diagram showing one configuration example of the clock distributor and the synchronous operation circuit in a first modification example of the first embodiment.

FIG. 5 is a circuit diagram showing one configuration example of the clock distributor 400 and the synchronous operation circuit 500 in a first modification example of the first embodiment. The configuration of the clock distributor 400 in the first modification example is different from that in the first embodiment in that it includes a NOR (negative logical sum) gate 431 instead of the OR gate 430. The configuration of the synchronous operation circuit 500 in the first modification example is different from that in the first embodiment in that it further includes inverters 530 and 540.

The NOR gate 431 outputs the negative logical sum of the delayed clock signals CLK_D1 and CLK_D2 as the minimally-delayed clock signal mCLK to the synchronous operation circuit 500. The inverter 530 inverts the minimally-delayed clock signal mCLK and outputs the inverted signal to the flip-flop 510. The inverter 540 inverts the minimally-delayed clock signal mCLK and outputs the inverted signal to the flip-flop 520.

As above, according to the first modification example, clock skew can be reduced in the configuration in which inverters are provided for the clock input terminals of the flip-flops 510 and 520.

Second Modification Example

Figure 6:
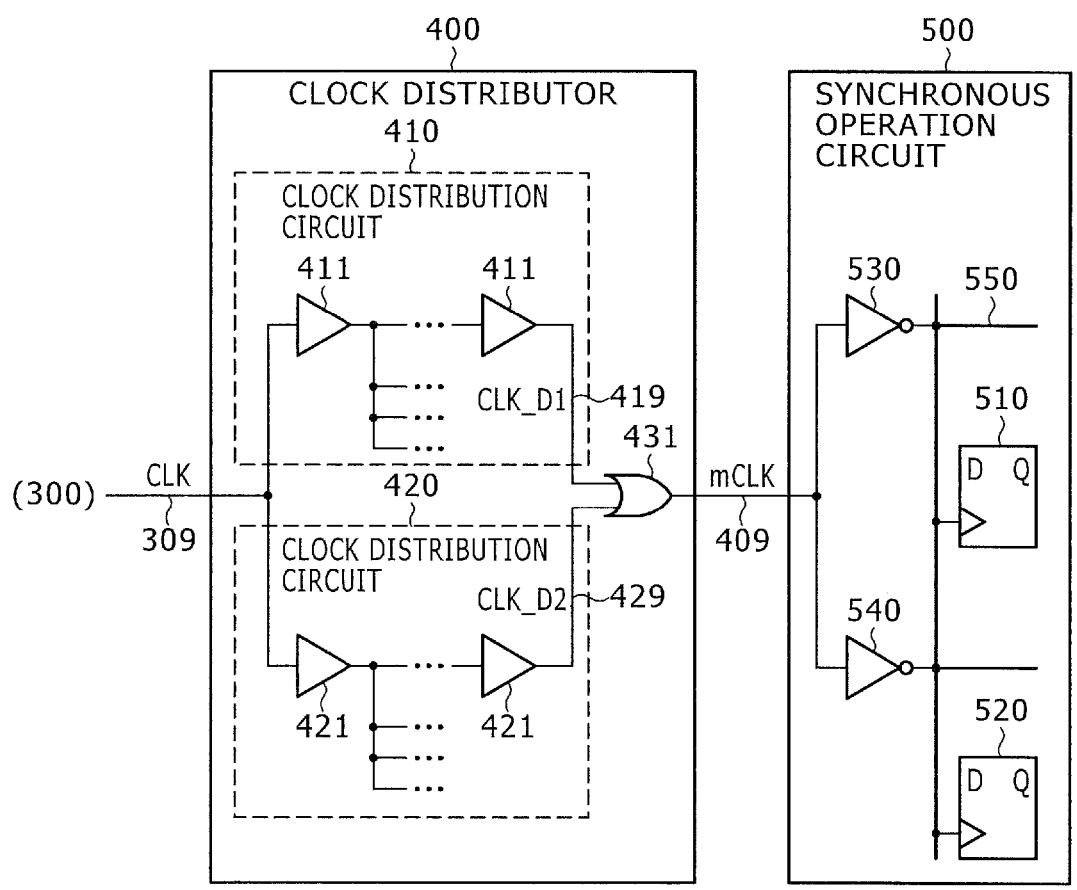
FIG. 6 is a circuit diagram showing one configuration example of the clock distributor and the synchronous operation circuit in a second modification example of the first embodiment.

FIG. 6 is a circuit diagram showing one configuration example of the clock distributor 400 and the synchronous operation circuit 500 in a second modification example of the first embodiment. The configuration of the clock distributor 400 in the second modification example is different from that in the first embodiment in that it includes the NOR (negative logical sum) gate 431 instead of the OR gate 430. The configuration of the synchronous operation circuit 500 in this second modification example is different from that in the first embodiment in that it further includes the inverters 530 and 540 and mesh wiring 550.

The configuration of the NOR gate 431 is the same as that in the first modification example. The inverters 530 and 540 invert the minimally-delayed clock signal mCLK and output the inverted signal to the mesh wiring 550. The mesh wiring 550 distributes the minimally-delayed clock signal mCLK to plural areas disposed in a lattice manner. The flip-flops 510 and 520 and so forth are disposed in these areas.

As above, according to the second modification example, clock skew can be reduced in the configuration in which connection to the clock input terminals of the flip-flops 510 and 520 is established by the mesh wiring 550.

Third Modification Example

Figure 7:
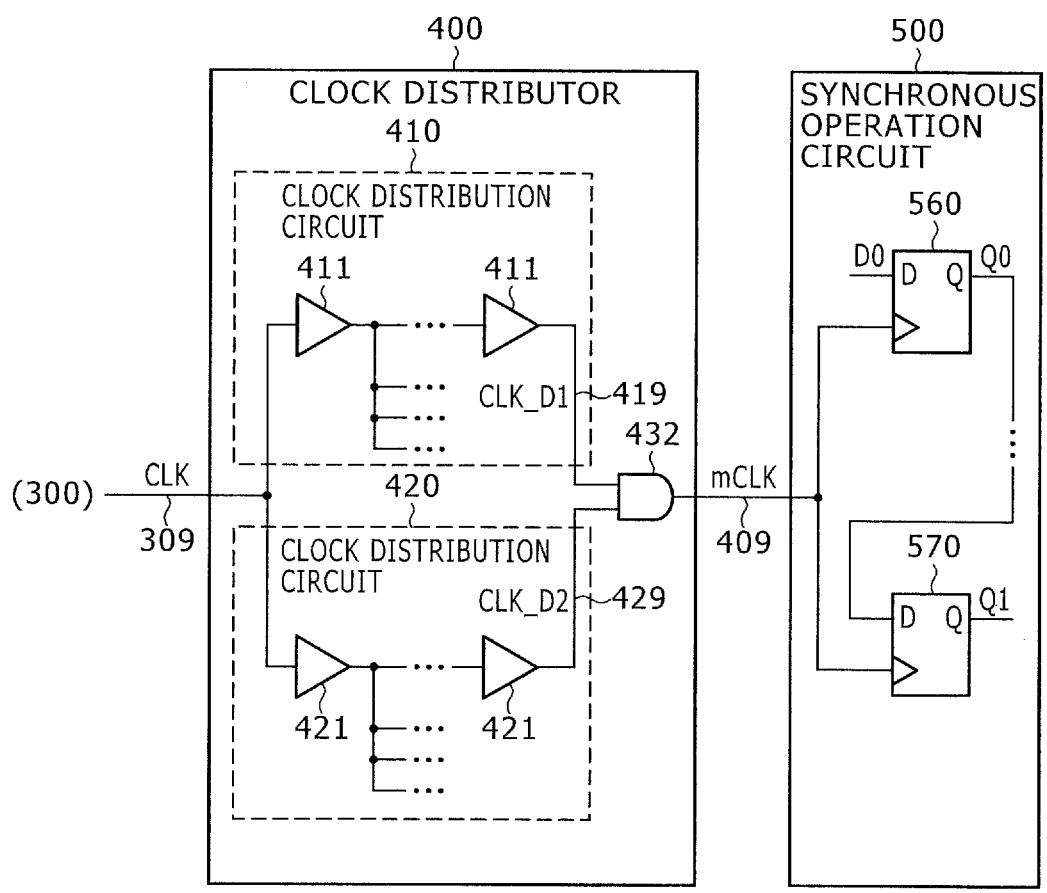
FIG. 7 is a circuit diagram showing one configuration example of the clock distributor and the synchronous operation circuit in a third modification example of the first embodiment.

FIG. 7 is a circuit diagram showing one configuration example of the clock distributor 400 and the synchronous operation circuit 500 in a third modification example of the first embodiment. The above-described first embodiment is based on the supposition that the synchronous operation circuit 500 operates by the rising edge of the clock signal. This third modification example is based on the supposition that the synchronous operation circuit 500 operates by the falling edge of the clock signal. Specifically, the configuration of the clock distributor 400 in the third modification example is different from that in the first embodiment in that it includes an AND (logical product) gate 432 instead of the OR gate 430. The configuration of the synchronous operation circuit 500 in the third modification example is different from that in the first embodiment in that it includes flip-flops 560 and 570 instead of the flip-flops 510 and 520.

The AND gate 432 outputs the logical product of the delayed clock signals CLK_D1 and CLK_D2 as the minimally-delayed clock signal mCLK to the synchronous operation circuit 500. The flip-flops 560 and 570 capture and hold data in synchronization with the falling edge of the minimally-delayed clock signal mCLK.

Figure 8:
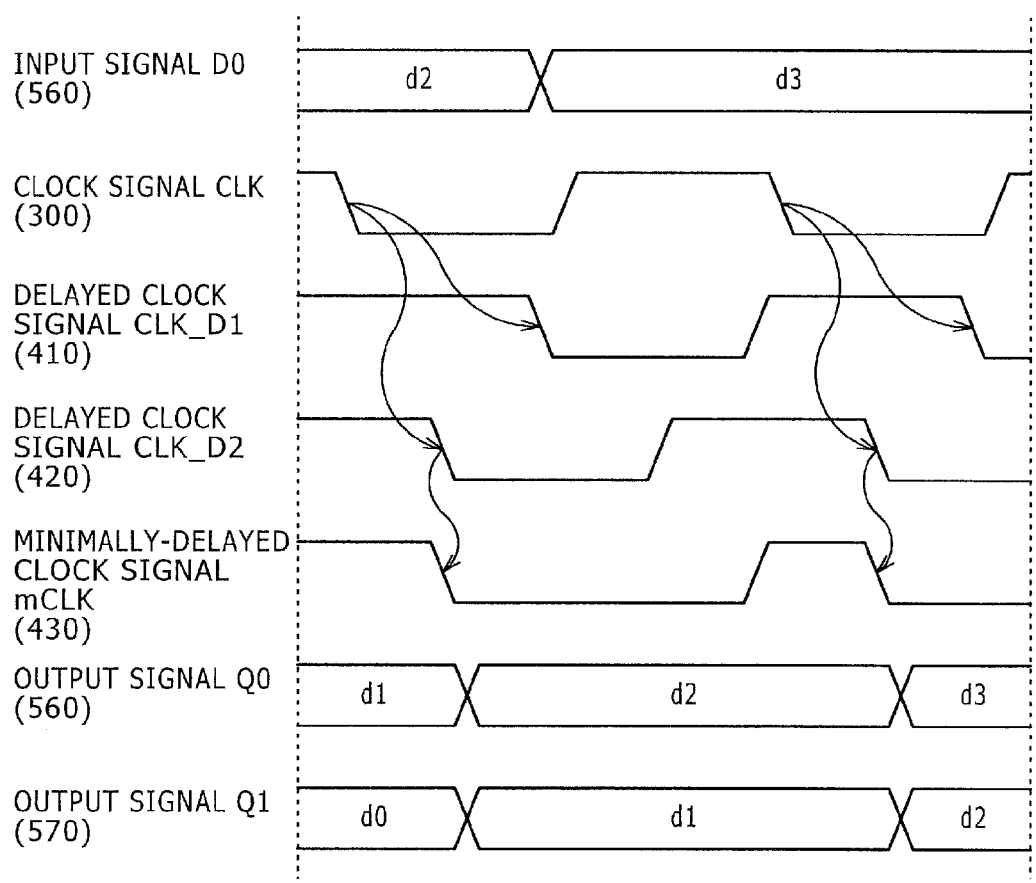
FIG. 8 is a timing chart showing one example of the operation of the synchronous operation circuit in synchronization with the falling of the clock signal in the third modification example of the first embodiment.

FIG. 8 is a timing chart showing one example of the operation of the synchronous operation circuit 500 in synchronization with the falling of the clock signal in the third modification example of the first embodiment. A consideration will be made about the case in which a falling edge is generated in the clock signal CLK at certain timing before the value of the input signal D0 is updated from "d2" to "d3." The clock signal CLK is distributed by the clock distribution circuit 410 and a falling edge is generated in the delayed clock signal CLK_D1 behind the clock signal CLK. Furthermore, the clock signal CLK is distributed by the clock distribution circuit 420 and a falling edge is generated in the delayed clock signal CLK_D2. Suppose that the delay of the delayed clock signal CLK_D1 is larger than that of the delayed clock signal CLK_D2. The AND gate 432 outputs the logical product of these delayed clock signals as the minimally-delayed clock signal mCLK. If a falling edge is generated in either of the delayed clock signals, the value of the logical product becomes "0." Thus, a falling edge is generated in the minimally-delayed clock signal mCLK in response to the falling of the delayed clock signal CLK_D2 with the smallest delay. The flip-flop 560 captures the value of "d2" and outputs it as the output signal Q0 to the flip-flop 570 in synchronization with the falling edge of the minimally-delayed clock signal mCLK. The flip-flop 570 captures the value of "d2" in synchronization with the next falling edge of the minimally-delayed clock signal mCLK.

As above, according to the third modification example, clock skew can be reduced in the configuration in which the synchronous operation circuit 500 operates in synchronization with the falling edge of the clock signal.

Fourth Modification Example

Figure 9:
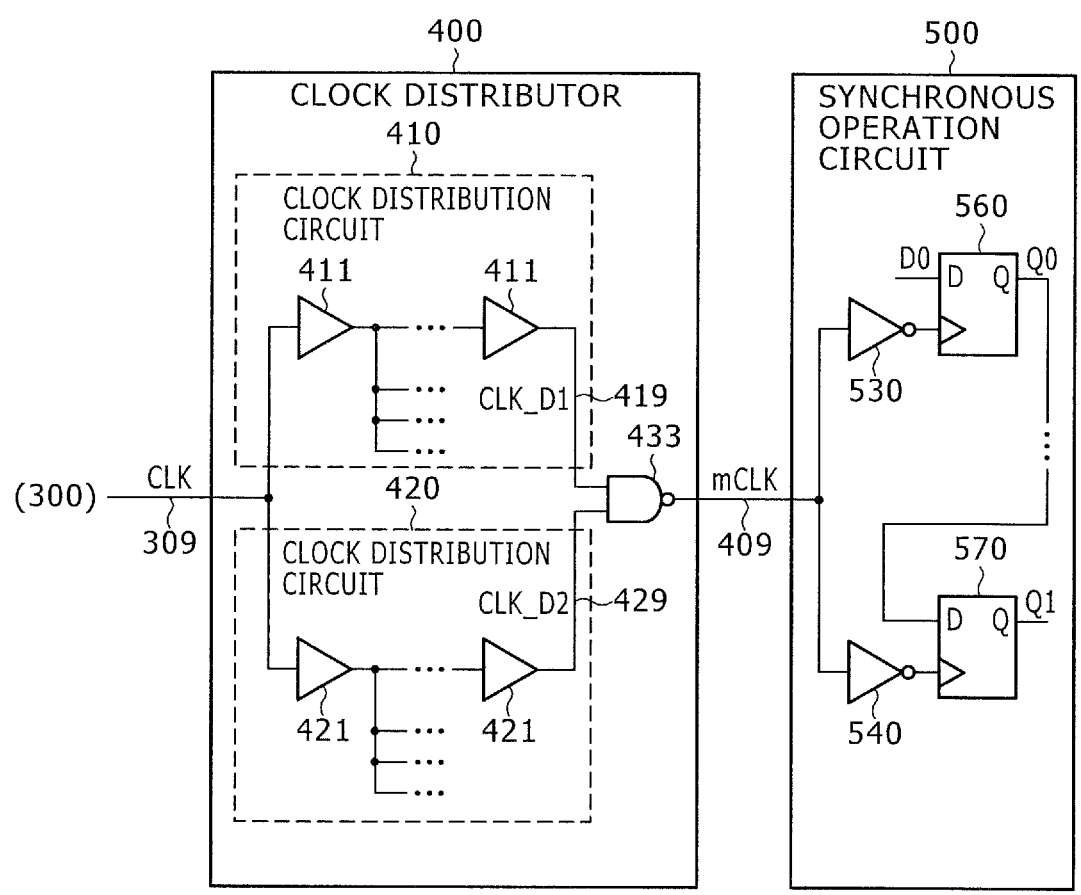
FIG. 9 is a circuit diagram showing one configuration example of the clock distributor and the synchronous operation circuit in a fourth modification example of the first embodiment.

FIG. 9 is a circuit diagram showing one configuration example of the clock distributor 400 and the synchronous operation circuit 500 in a fourth modification example of the first embodiment. This fourth modification example is also based on the supposition that the synchronous operation circuit 500 operates by the falling edge similarly to the third modification example. The configuration of the clock distributor 400 in the fourth modification example is different from that in the first embodiment in that it includes a NAND (negative logical product) gate 433 instead of the OR gate 430. The configuration of the synchronous operation circuit 500 in the fourth modification example is different from that in the first embodiment in that it includes the flip-flops 560 and 570 instead of the flip-flops 510 and 520 and further includes the inverters 530 and 540.

The NAND gate 433 outputs the negative logical product of the delayed clock signals CLK_D1 and CLK_D2 as the minimally-delayed clock signal mCLK to the synchronous operation circuit 500. The inverter 530 inverts the minimally-delayed clock signal mCLK and outputs the inverted signal to the flip-flop 560. The inverter 540 inverts the minimally-delayed clock signal mCLK and outputs the inverted signal to the flip-flop 570. The flip-flops 560 and 570 capture and hold data in synchronization with the falling edge of the minimally-delayed clock signal mCLK.

As above, according to the fourth modification example, clock skew can be reduced in the configuration in which inverters are provided for the clock input terminals of the flip-flops 560 and 570 and the synchronous operation circuit 500 operates in synchronization with the falling edge of the clock signal.

Fifth Modification Example

Figure 10:
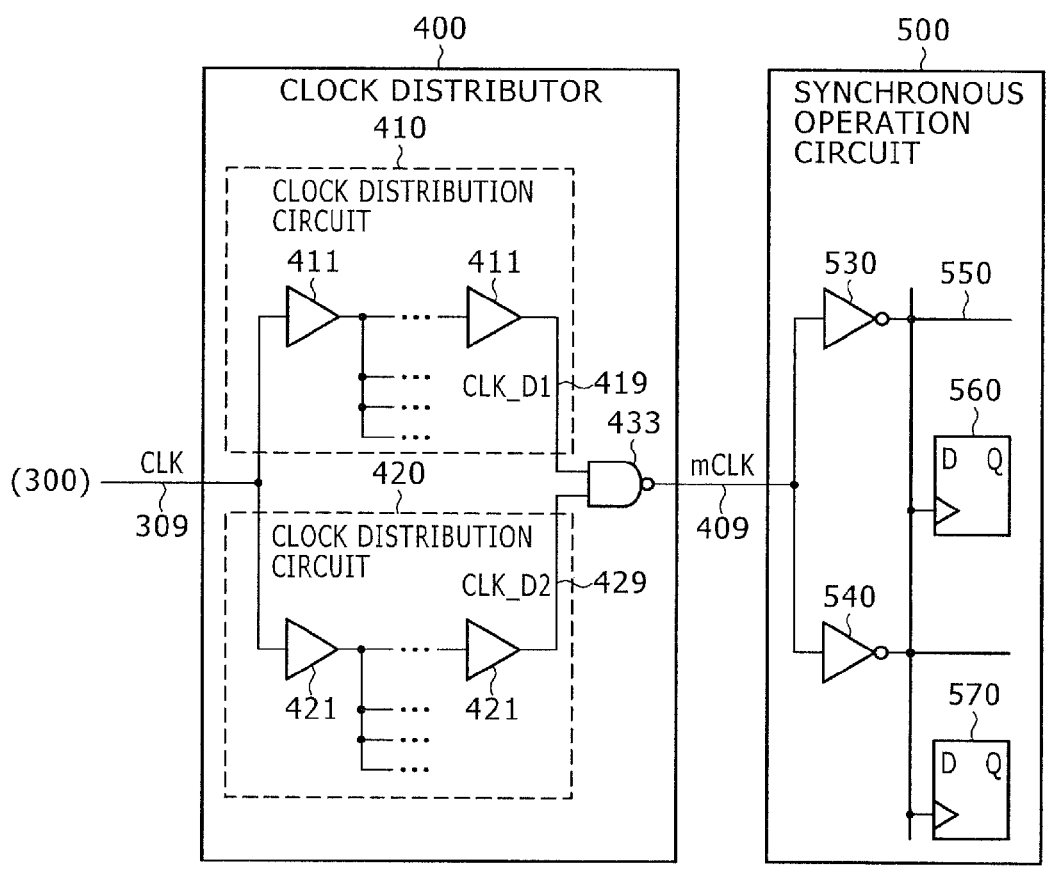
FIG. 10 is a circuit diagram showing one configuration example of the clock distributor and the synchronous operation circuit in a fifth modification example of the first embodiment.

FIG. 10 is a circuit diagram showing one configuration example of the clock distributor 400 and the synchronous operation circuit 500 in a fifth modification example of the first embodiment. This fifth modification example is also based on the supposition that the synchronous operation circuit 500 operates by the falling edge similarly to the third modification example. The configuration of the clock distributor 400 in the fifth modification example is different from that in the first embodiment in that it includes the NAND gate 433 instead of the OR gate 430. The configuration of the synchronous operation circuit 500 in the fifth modification example is different from that in the first embodiment in that it includes the flip-flops 560 and 570 instead of the flip-flops 510 and 520. Furthermore, the configuration of the synchronous operation circuit 500 in the fifth modification example is different from that in the first embodiment in that it further includes the inverters 530 and 540 and the mesh wiring 550.

The configuration of the NAND gate 433 is the same as that in the fourth modification example. The configuration of the inverters 530 and 540 and the mesh wiring 550 is the same as that in the second modification example. The configuration of the flip-flops 560 and 570 is the same as that in the fourth modification example.

As above, according to the fifth modification example, clock skew can be reduced in the configuration in which the clock input terminals of the flip-flops 560 and 570 are connected to mesh wiring and the synchronous operation circuit 500 operates in synchronization with the falling edge of the clock signal.

2. Second Embodiment

Configuration Example of Integrated Circuit

Figure 11:
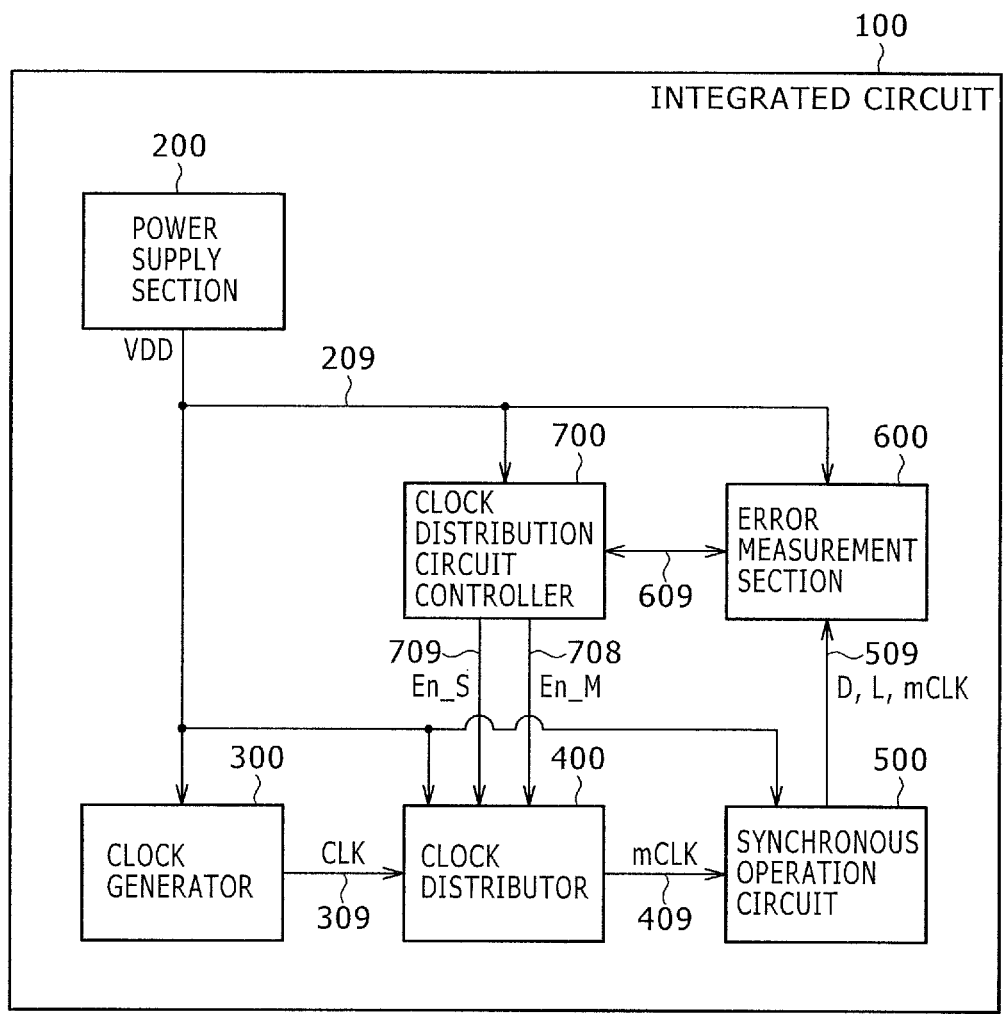
FIG. 11 is a block diagram showing one configuration example of an integrated circuit in a second embodiment.

FIG. 11 is a block diagram showing one configuration example of an integrated circuit 100 in a second embodiment. The integrated circuit 100 in this second embodiment includes a power supply section 200, a clock generator 300, a clock distributor 400, a synchronous operation circuit 500, an error measurement section 600, and a clock distribution circuit controller 700.

The power supply section 200 supplies a supply voltage VDD to each of the clock generator 300, the clock distributor 400, the synchronous operation circuit 500, the error measurement section 600, and the clock distribution circuit controller 700 via a signal line 209.

The clock generator 300 generates a clock signal CLK having a predetermined frequency by using e.g. a PLL. The clock signal CLK is generated as a signal for indicating predetermined timing to the synchronous operation circuit 500. The clock generator 300 outputs the generated clock signal CLK to the clock distributor 400 via a signal line 309.

The clock distributor 400 distributes the clock signal CLK to the synchronous operation circuit 500. The clock distributor 400 generates a minimally-delayed clock signal mCLK from the clock signal CLK. The clock distributor 400 outputs the minimally-delayed clock signal mCLK to the synchronous operation circuit 500 via a signal line 409. The synchronous operation circuit 500 is a circuit that operates in synchronization with the minimally-delayed clock signal mCLK.

The error measurement section 600 detects a timing error generated in the synchronous operation circuit 500 and measures the detection frequency thereof. The detection frequency of the timing error is measured by counting the number of errors in a certain measurement cycle for example. The error measurement section 600 counts the number of timing errors in accordance with control by the clock distribution circuit controller 700 and outputs the count value to the clock distribution circuit controller 700 via a signal line 609. The error measurement section 600 is one example of the measurement section set forth in the claims.

The clock distribution circuit controller 700 controls the clock distributor 400 based on the detection frequency of the timing error. Specifically, when the supply voltage VDD from the power supply section 200 becomes equal to or lower than a predetermined voltage, the clock distribution circuit controller 700 controls the error measurement section 600 to make it start measurement of the number of timing errors.

Furthermore, the clock distribution circuit controller 700 generates enable signals En_M and En_S based on the detection frequency of the detected timing errors. Details of the enable signals En_M and En_S will be described later. The clock distribution circuit controller 700 outputs the enable signals En_M and En_S to the clock distributor 400 via signal lines 708 and 709. The clock distribution circuit controller 700 is one example of the timing signal distribution circuit controller set forth in the claims.

[Configuration Example of Clock Distributor]

Figure 12:
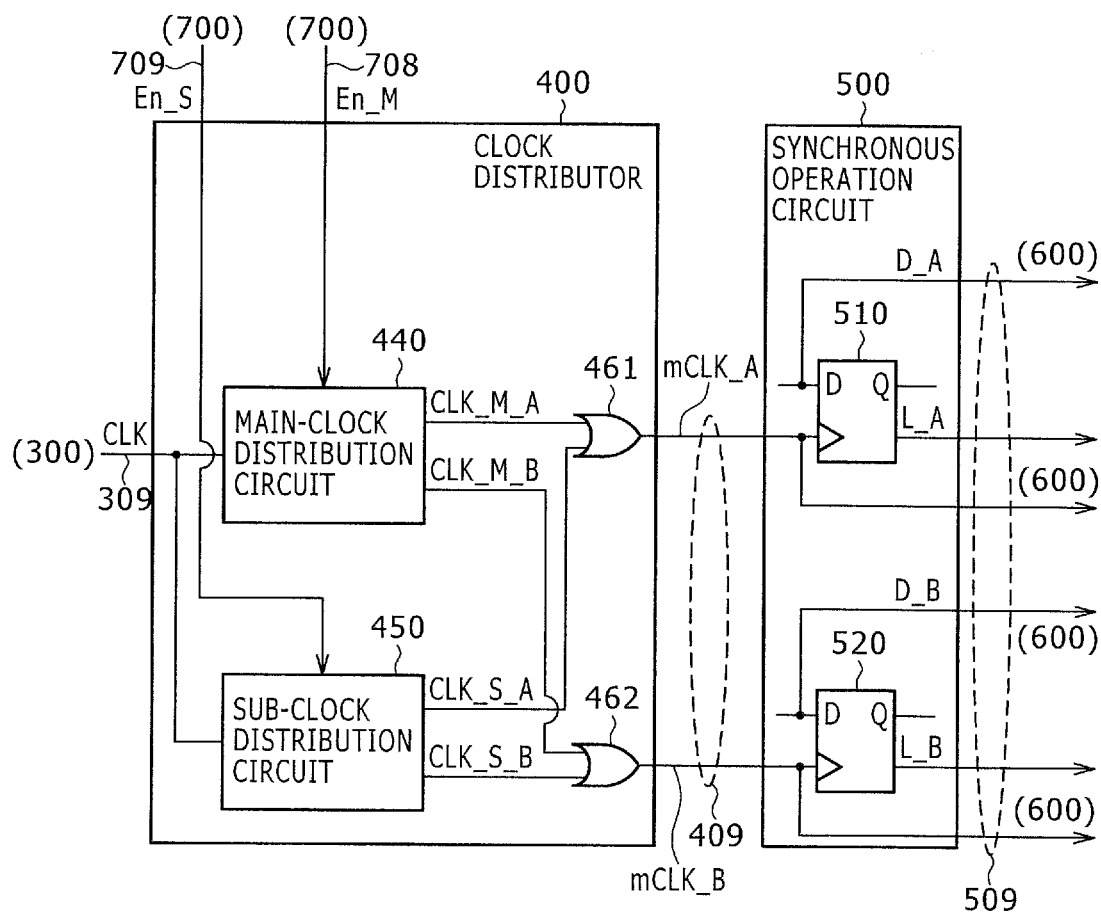
FIG. 12 is a circuit diagram showing one configuration example of a clock distributor and a synchronous operation circuit in the second embodiment.

FIG. 12 is a circuit diagram showing one configuration example of the clock distributor 400 and the synchronous operation circuit 500 in the second embodiment. The clock distributor 400 of the second embodiment includes a main-clock distribution circuit 440, a sub-clock distribution circuit 450, and OR gates 461 and 462. The synchronous operation circuit 500 of the second embodiment includes flip-flops 510 and 520.

The main-clock distribution circuit 440 branches the clock signal CLK in accordance with the enable signal En_M to generate plural clock signals and distribute these signals. Hereinafter, the respective clock signals branched in the main-clock distribution circuit 440 will be referred to as the "main-clock signal." The main-clock distribution circuit 440 includes plural paths and two of them are defined as paths M_A and M_B. Furthermore, the main-clock signal distributed via the path M_A is defined as CLK_M_A and the main-clock signal distributed via the path M_B is defined as CLK_M_B. The main-clock distribution circuit 440 is one example of the main-timing signal distribution circuit set forth in the claims.

The sub-clock distribution circuit 450 branches the clock signal CLK in accordance with the enable signal En_S to generate plural clock signals and distribute these signals. Hereinafter, the respective clock signals branched in the sub-clock distribution circuit 450 will be referred to as the "sub-clock signal." The sub-clock distribution circuit 450 includes plural paths and two of them are defined as paths S_A and S_B. Furthermore, the sub-clock signal distributed via the path S_A is defined as CLK_S_A and the sub-clock signal distributed via the path S_B is defined as CLK_S_B. The sub-clock distribution circuit 450 is one example of the sub-timing signal distribution circuit set forth in the claims.

The main-clock distribution circuit 440 is always activated by the enable signal En_M in the on-state when the synchronous operation circuit 500 is operated. The sub-clock distribution circuit 450 is inactivated by the enable signal En_S in the off-state in the initial state. The sub-clock distribution circuit 450 is activated when the detection frequency of the timing error becomes higher than a predetermined value in the synchronous operation circuit 500. The enable signal En_S includes En_S_Root, En_S_A, and En_S_B. The path S_A in the sub-clock distribution circuit 450 is activated by setting the enable signals En_S_Root and En_S_A to the on-state. The path S_B in the sub-clock distribution circuit 450 is activated by setting the enable signals En_S_Root and En_S_B to the on-state.

The OR gates 461 and 462 generate the logical sum of the respective input values. The OR gate 461 has two input terminals and the main-clock signal CLK_M_A and the sub-clock signal CLK_S_A are input to these input terminals. The OR gate 461 outputs the logical sum of these signals as a minimally-delayed clock signal mCLK_A to the synchronous operation circuit 500. The OR gate 462 has two input terminals and the main-clock signal CLK_M_B and the sub-clock signal CLK_S_B are input to these input terminals. The OR gate 462 outputs the logical sum of these signals as a minimally-delayed clock signal mCLK_B to the synchronous operation circuit 500. In this manner, the OR gates 461 and 462 each output the logical sum of the main-timing signal and the sub-timing signal. Thus, the rising edge of the signal with the smaller delay, of the rising edges of these signals, is output. In other words, of the main-timing signal and the sub-timing signal, the signal distributed earlier is output.

Each of the OR gates 461 and 462 is one example of the timing signal generator set forth in the claims. The terminal to which the main-clock signal is input in the OR gates 461 and 462 is one example of the main-input terminal set forth in the claims. The terminal to which the sub-clock signal is input in the OR gates 461 and 462 is one example of the sub-input terminal set forth in the claims.

The flip-flop 510 captures and holds data in synchronization with the minimally-delayed clock signal mCLK_A. An input signal D_A input to the flip-flop 510 and a latch output signal L_A from the flip-flop 510 are output to the error measurement section 600 via a signal line 509. The latch output signal L_A is an output signal of the master-side latch in the master-slave flip-flop 510. The minimally-delayed clock signal mCLK_A is also output to the error measurement section 600 via the signal line 509. The flip-flop 520 captures and holds data in synchronization with the minimally-delayed clock signal mCLK_B. An input signal D_B input to the flip-flop 520 and a latch output signal L_B from the flip-flop 520 are output to the error measurement section 600 via the signal line 509. The latch output signal L_B is an output signal of the master-side latch in the master-slave flip-flop 520. The minimally-delayed clock signal mCLK_B is also output to the error measurement section 600 via the signal line 509.

Figure 13:
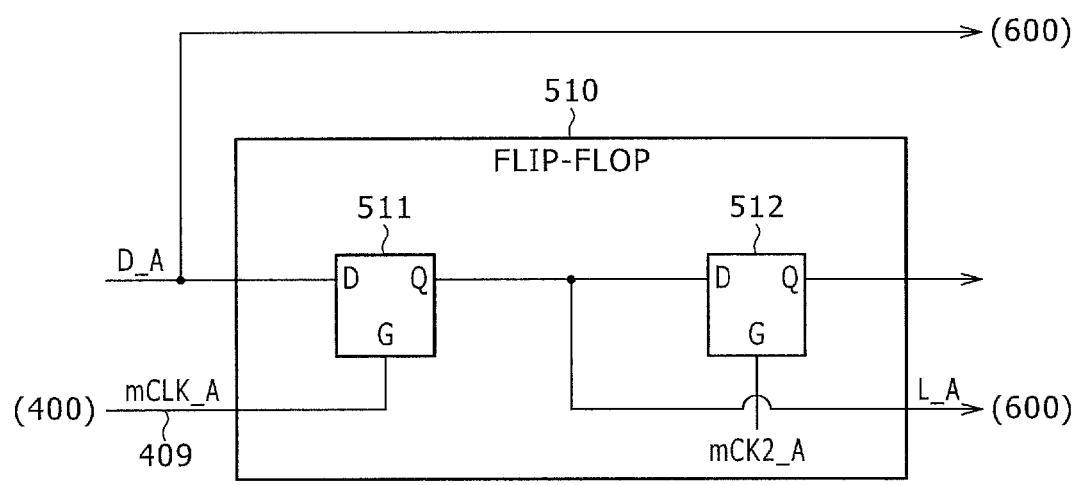
FIG. 13 is a circuit diagram showing one configuration example of a flip-flop in the second embodiment.

FIG. 13 is a circuit diagram showing one configuration example of the flip-flop 510 in the second embodiment. The flip-flop 510 is a master-slave latch and is composed of a master-side latch 511 and a slave-side latch 512. The configuration of the flip-flop 520 is also the same as that of the flip-flop 510.

The latch 511 holds the input signal in synchronization with the minimally-delayed clock signal mCLK_A. The latch 511 has an input terminal D, an output terminal Q, and a gate enable terminal G. The input signal D_A is input to the input terminal and the minimally-delayed clock signal mCLK_A is input to the gate enable terminal G. The output terminal Q is connected to the input terminal of the latch 512. The latch 511 through-outputs the input signal D_A when the minimally-delayed clock signal mCLK_A is in the on-state. When the minimally-delayed clock signal mCLK_A becomes the off-state, the latch 511 holds the input signal D_A at the falling edge and outputs it. This output of the latch 511 is output as the latch output signal L_A to the error measurement section 600 and the latch 512.

The latch 512 holds the latch output signal L_A in synchronization with a clock signal mCK2_A obtained by inverting the minimally-delayed clock signal mCLK_A. The configuration of the latch 512 is the same as that of the latch 511. The output of the latch 512 is output as the output signal of the flip-flop 510.

Figure 14:
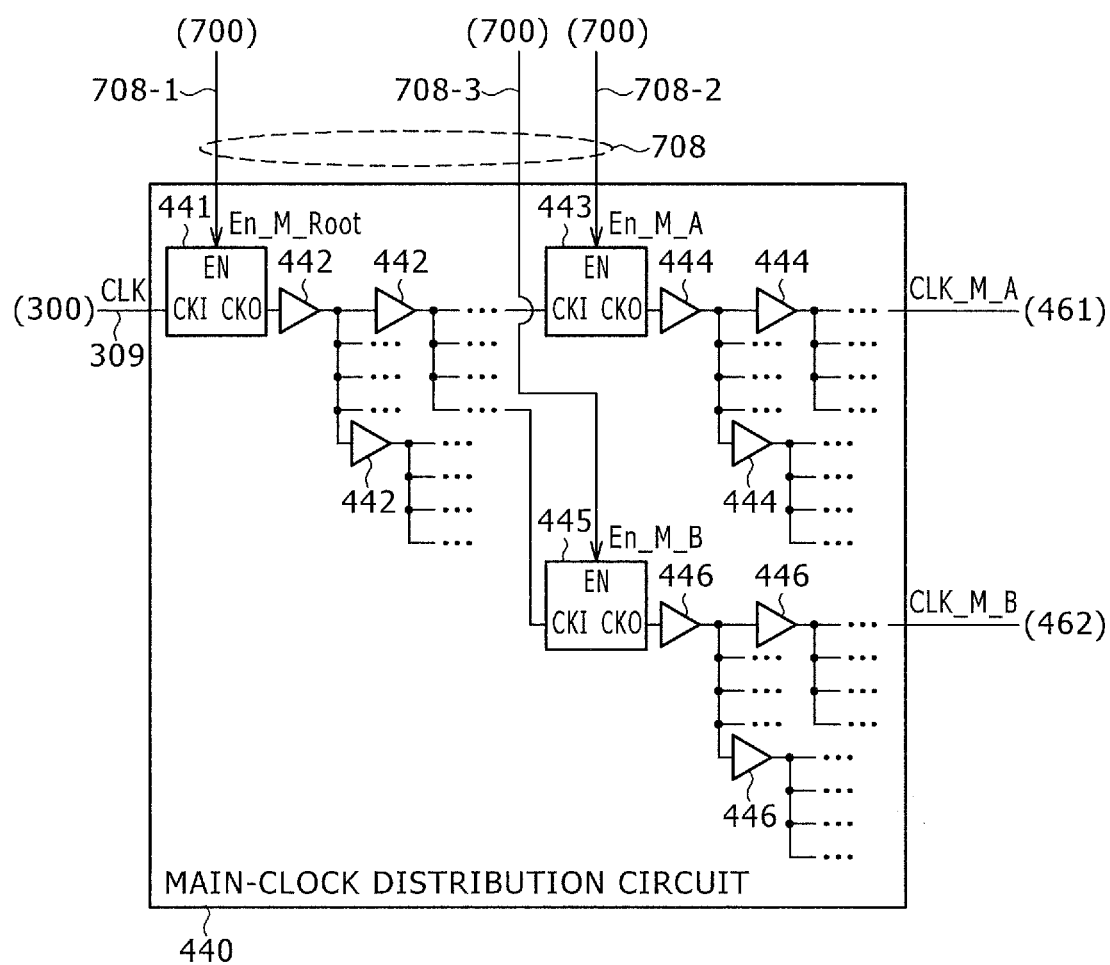
FIG. 14 is a circuit diagram showing one configuration example of a main-clock distribution circuit in the second embodiment.

FIG. 14 is a circuit diagram showing one configuration example of the main-clock distribution circuit 440 in the second embodiment. The main-clock distribution circuit 440 includes PLLs 441, 443, and 445 and buffers 442, 444, and 446.

The PLLs 441, 443, and 445 generate a clock signal having the same frequency as that of an input clock signal. The PLLs 441, 443, and 445 have an input terminal CKI, an output terminal CKO, and an enable terminal EN. The PLLs 441, 443, and 445 output the generated clock signal when the enable signal in the on-state is input and stop the output when the enable signal in the off-state is input for example. The main-clock distribution circuit 440 receives the enable signal En_M including En_M_Root, En_M_A, and En_M_B from the clock distribution circuit controller 700. En_M_Root, En_M_A, and En_M_B are enable signals for controlling the PLLs 441, 443, and 445, respectively. The signal line 708 includes signal lines 708-1, 708-2, and 708-3 and the enable signal En_M_Root is input to the PLL 441 via the signal line 708-1. The enable signal En_M_A is input to the PLL 443 via the signal line 708-2 and the enable signal En_M_B is input to the PLL 445 via the signal line 708-3.

The PLL 441 is a circuit disposed at a position near the root of the clock tree and the clock signal CLK from the clock generator 300 is input to the input terminal CKI of the PLL 441. The clock signal output by the PLL 441 is branched to plural clock signals via the buffers 442. Any two of the branched clock signals are input to the input terminals CKI of the PLLs 443 and 445.

The clock signal CLK output by the PLL 443 is branched to plural clock signals via the buffers 444. Any of the branched clock signals is output to the OR gate 461. This signal is used as the main-clock signal CLK_M_A. The clock signal CLK output by the PLL 445 is branched to plural clock signals via the buffers 446. Any of the branched clock signals is output to the OR gate 462. This signal is used as the main-clock signal CLK_M_B. The path from the output node of the PLL 441 to the output node of the main-clock signal CLK_M_A is defined as the path M_A and the path from the output node of the PLL 441 to the output node of the main-clock signal CLK_M_B is defined as the path M_B.

Figure 15:
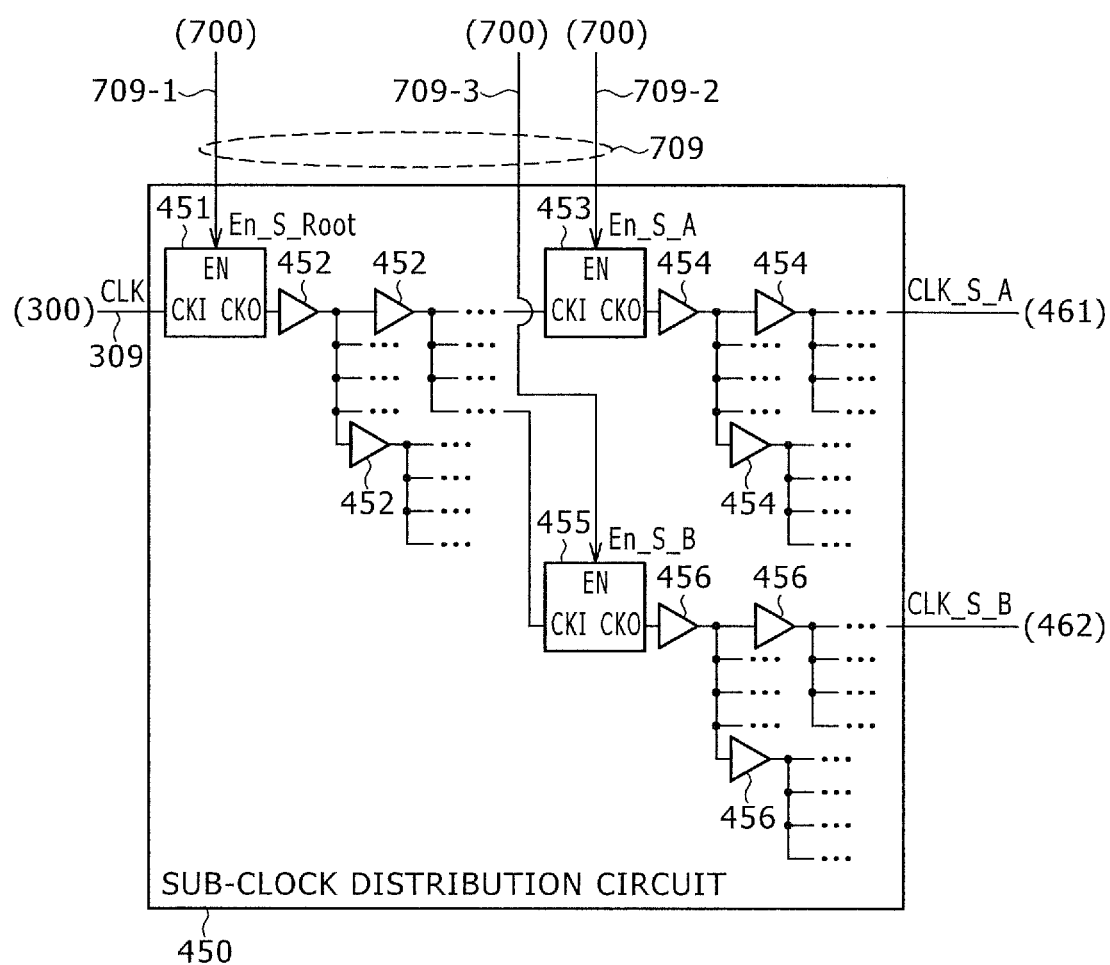
FIG. 15 is a circuit diagram showing one configuration example of a sub-clock distribution circuit in the second embodiment.

FIG. 15 is a circuit diagram showing one configuration example of the sub-clock distribution circuit 450 in the second embodiment. The sub-clock distribution circuit 450 includes PLLs 451, 453, and 455 and buffers 452, 454, and 456.

The configuration of the PLLs 451, 453, and 455 is the same as that of the PLL 441. The sub-clock distribution circuit 450 receives the enable signal En_S including En_S_Root, En_S_A, and En_S_B from the clock distribution circuit controller 700. En_S_Root, En_S_A, and En_S_B are enable signals for controlling the PLLs 451, 453, and 455, respectively. The signal line 709 includes signal lines 709-1, 709-2, and 709-3 and the enable signal En_S_Root is input to the PLL 451 via the signal line 709-1. The enable signal En_S_A is input to the PLL 453 via the signal line 709-2 and the enable signal En_S_B is input to the PLL 455 via the signal line 709-3.

The PLL 451 is a circuit disposed at a position near the root of the clock tree and the clock signal CLK from the clock generator 300 is input to the input terminal CKI of the PLL 451. The clock signal output by the PLL 451 is branched to plural clock signals via the buffers 452. Any two of the branched clock signals are input to the input terminals CKI of the PLLs 453 and 455.

The clock signal CLK output by the PLL 453 is branched to plural clock signals via the buffers 454. Any of the branched clock signals is output to the OR gate 461. This signal is used as the sub-clock signal CLK_S_A. The clock signal CLK output by the PLL 455 is branched to plural clock signals via the buffers 456. Any of the branched clock signals is output to the OR gate 462. This signal is used as the sub-clock signal CLK_S_B. The path from the output node of the PLL 451 to the output node of the sub-clock signal CLK_S_A is defined as the path S_A and the path from the output node of the PLL 451 to the output node of the sub-clock signal CLK_S_B is defined as the path S_B.

It is preferable that the main-timing signal and the sub-timing signal be distributed to the OR gate 461 via the same number of stages. That is, it is preferable that the numbers of stages of the buffer on the path M_A and the path S_A be equal to each other. By equalizing the numbers of stages of the buffer, variation in the difference in the delay time between the main-timing signal and the sub-timing signal becomes smaller. As a result, variation in the delay of the minimally-delayed timing signal mCLK also becomes smaller. As long as the delay times of the main-timing signal and the sub-timing signal are equivalent to each other, the numbers of stages of the buffer on the path M_A and the path S_A may be somewhat different from each other. This applies also to the paths M_B and S_B.

Providing the PLLs at the root and branch points of the sub-clock distribution circuit 450 in this manner allows the integrated circuit 100 to selectively inactivate or activate plural paths. Specifically, when the PLL 451 at the root part becomes invalid, all paths are inactivated. When the PLLs 451 and 453 become valid, the path S_A is activated and the sub-clock signal CLK_S_A is output. When the PLLs 451 and 455 become valid, the path S_B is activated and the sub-clock signal CLK_S_B is output.

[Configuration Example of Error Measurement Section]

Figure 16:
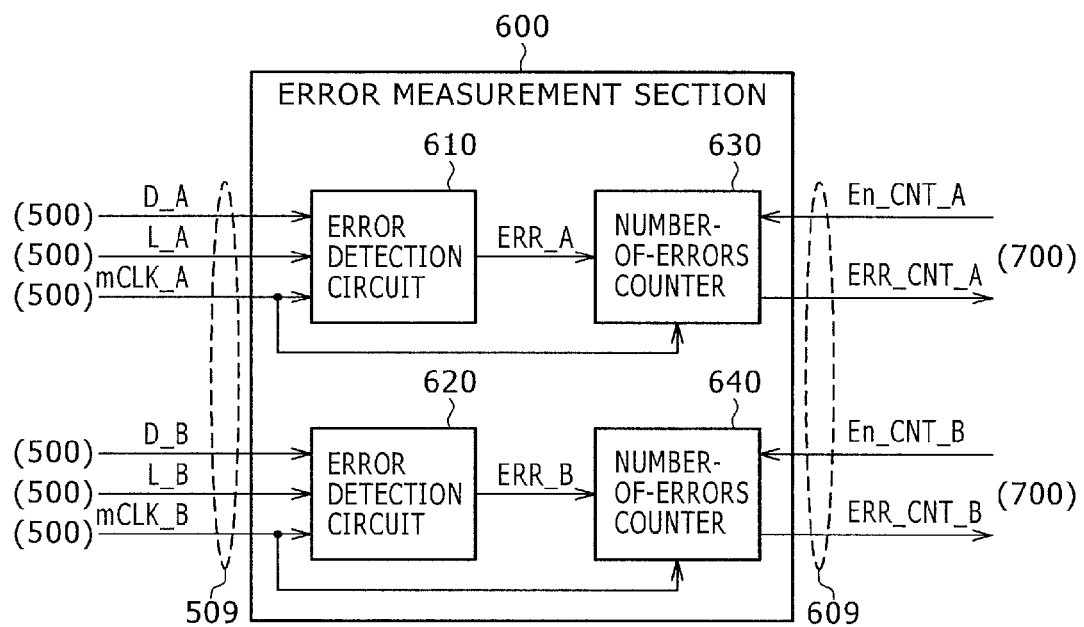
FIG. 16 is a block diagram showing one configuration example of an error measurement section in the second embodiment.

FIG. 16 is a circuit diagram showing one configuration example of the error measurement section 600 in the second embodiment. The error measurement section 600 includes error detection circuits 610 and 620 and number-of-errors counters 630 and 640.

The error detection circuit 610 detects the timing error generated in the flip-flop 510. The error detection circuit 610 outputs an error detection signal ERR_A indicating the detection result of the timing error to the number-of-errors counter 630. The error detection circuit 620 detects the timing error generated in the flip-flop 520. The error detection circuit 620 outputs an error detection signal ERR_B indicating the detection result of the timing error to the number-of-errors counter 640. For example, a value of "1" is set in the error detection signals ERR_A and ERR_B when a timing error is detected, and a value of "0" is set when it is not detected.

The number-of-errors counter 630 counts the number of timing errors detected about the flip-flop 510 in synchronization with the minimally-delayed clock signal mCLK_A. The number-of-errors counter 630 receives an enable signal En_CNT_A from the clock distribution circuit controller 700 via the signal line 609. When the enable signal En_CNT_A becomes the on-state, the number-of-errors counter 630 initializes the count value and starts count of the timing error in synchronization with the minimally-delayed clock signal mCLK_A. The number-of-errors counter 630 outputs a count value ERR_CNT_A to the clock distribution circuit controller 700 via the signal line 609 and initializes the count value when a predetermined measurement cycle has elapsed.

The number-of-errors counter 640 counts the number of timing errors detected about the flip-flop 520 in synchronization with the minimally-delayed clock signal mCLK_B. The number-of-errors counter 640 receives an enable signal En_CNT_B from the clock distribution circuit controller 700 via the signal line 609. When the enable signal En_CNT_B becomes the on-state, the number-of-errors counter 640 initializes the count value and starts count of the timing error in synchronization with the minimally-delayed clock signal mCLK_B. The number-of-errors counter 640 outputs a count value ERR_CNT_B to the clock distribution circuit controller 700 and initializes the count value when a predetermined measurement cycle has elapsed.

Figure 17:
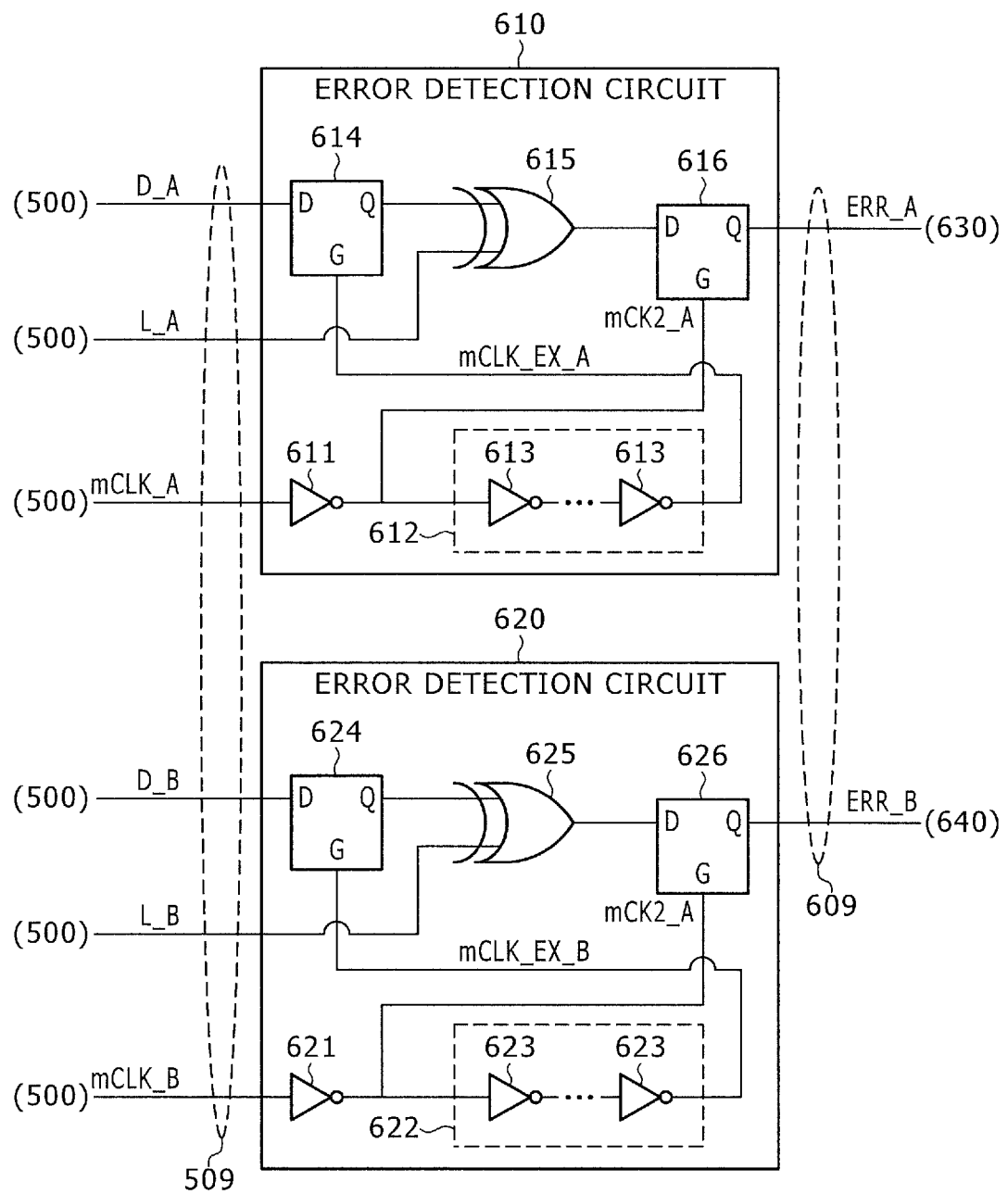
FIG. 17 is a circuit diagram showing one configuration example of error detection circuits in the second embodiment.

FIG. 17 is a circuit diagram showing one configuration example of the error detection circuits 610 and 620 in the second embodiment. The error detection circuit 610 includes an inverter 611, a delay section 612, a latch 614, an XOR (exclusive logical sum) gate 615, and a latch 616.

The inverter 611 inverts the minimally-delayed clock signal mCLK_A. The inverter 611 outputs the inverted minimally-delayed clock signal mCLK_A as an enable signal mCK2_A to the delay section 612 and the latch 616.

The delay section 612 includes inverters 613 of an odd number of stages and delays the minimally-delayed clock signal mCLK_A by these inverters 613. The number of inverters 613 is so decided that the delay time by the delay section 612 is equivalent to the hold time of the flip-flop 510 for example. The delay section 612 outputs, to the latch 614, the signal obtained by delaying the minimally-delayed clock signal mCLK_A as an enable signal mCLK_EX_A. It is also possible to provide the inverter 611 and the delay section 612 not in the error detection circuit 610 but in the clock distributor 400.

The latches 614 and 616 transmit or hold data in accordance with an enable signal. The latches 614 and 616 each have an input terminal D, an output terminal Q, and a gate enable terminal G. An enable signal is input to the gate enable terminal G. When the enable signal is in the on-state, the latches 614 and 616 through-output the signal input to the input terminal D to the output terminal Q. When the enable signal is in the off-state, the latches 614 and 616 hold and output the value of the signal input to the input terminal D when the enable signal is in the on-state.

The input signal D_A from the synchronous operation circuit 500 is input to the input terminal D of the latch 614. The output terminal Q of the latch 614 is connected to an input terminal of the XOR gate 615. The enable signal mCLK_EX_A is input to the gate enable terminal G of the latch 614.

The XOR gate 615 outputs the exclusive logical sum of the signal output by the latch 614 and the latch output signal L_A from the synchronous operation circuit 500 to the latch 616.

The output terminal of the XOR gate 615 is connected to the input terminal D of the latch 616. The output terminal Q of the latch 616 is connected to the number-of-errors counter 630. The enable signal mCK2_A is input to the gate enable terminal G of the latch 616.

The error detection circuit 620 includes an inverter 621, a delay section 622, a latch 624, an XOR gate 625, and a latch 626.

The inverter 621 inverts the minimally-delayed clock signal mCLK_B. The inverter 621 outputs the inverted minimally-delayed clock signal mCLK_B as an enable signal mCK2_B to the delay section 622 and the latch 626.

The delay section 622 includes inverters 623 of an odd number of stages and delays the minimally-delayed clock signal mCLK_B by these inverters 623. The delay section 622 outputs, to the latch 624, the signal obtained by delaying the minimally-delayed clock signal mCLK_B as an enable signal mCLK_EX_B.

The configuration of the latches 624 and 626 is the same as that of the latch 614. The input signal D_B from the synchronous operation circuit 500 is input to the input terminal D of the latch 624. The output terminal Q of the latch 624 is connected to an input terminal of the XOR gate 625. The enable signal mCLK_EX_B is input to the gate enable terminal G of the latch 624.

The XOR gate 625 outputs the exclusive logical sum of the signal output by the latch 624 and the latch output signal L_B from the synchronous operation circuit 500 to the latch 626.

The output terminal of the XOR gate 625 is connected to the input terminal D of the latch 626. The output terminal Q of the latch 626 is connected to the number-of-errors counter 640. The enable signal mCK2_B is input to the gate enable terminal G of the latch 626.

In this configuration, the latch output signal L_A has the value equivalent to the input signal D_A held by the latch 511 in FIG. 13 at the falling edge of the minimally-delayed clock signal mCLK_A. The latch 614 in FIG. 17 holds the input signal D0 at the timing delayed by the hold time from the falling edge of the minimally-delayed clock signal mCLK_A. The XOR gate 615 outputs a timing error if the values of these signals do not correspond with each other. Therefore, the error is detected if the input signal D_A changes in the period from the falling edge of the minimally-delayed clock signal mCLK_A until the elapse of the hold time (i.e. hold violation error occurs).

A consideration will be made about the case in which the input signal D_A changes in the period from the start of the setup time of the latch 511 to the falling edge of the minimally-delayed clock signal mCLK_A (i.e. setup violation error occurs). In this case, the value after the change is not held in the latch 511. As a result, a timing error is detected also when a setup violation error occurs.

That is, a timing error is detected in the error detection circuit 610 when the input signal D_A changes in the period including the setup time and the hold time, with the boundary therebetween at the falling edge of the minimally-delayed clock signal mCLK_A. Also in the error detection circuit 620, a timing error is detected when the input signal D_B changes in the period including the setup time and the hold time, with the boundary therebetween at the falling edge of the minimally-delayed clock signal mCLK_B.

When variation in the delay of the main-clock signal, which indicates timing to the flip-flop, is larger, the timing error is generated in this flip-flop more readily. Therefore, the error measurement section 600 can measure the variation in the delay of the main-clock signal by counting the number of errors in the measurement cycle (i.e. the occurrence frequency of error).

[Configuration Example of Clock Distribution Circuit Controller]

Figure 18:
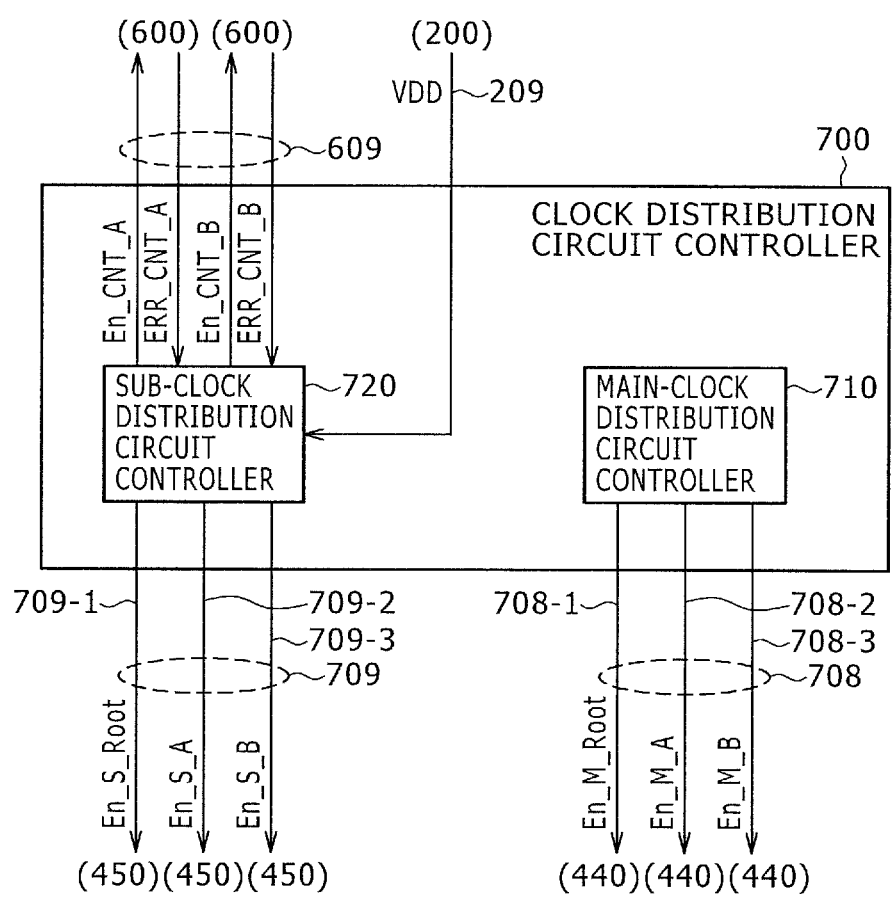
FIG. 18 is a block diagram showing one configuration example of a clock distribution circuit controller in the second embodiment.

FIG. 18 is a block diagram showing one configuration example of the clock distribution circuit controller 700 in the second embodiment. The clock distribution circuit controller 700 includes a main-clock distribution circuit controller 710 and a sub-clock distribution circuit controller 720.

The main-clock distribution circuit controller 710 controls the main-clock distribution circuit 440. The main-clock distribution circuit controller 710 generates and outputs the enable signals En_M_Root, En_M_A, and En_M_B in the on-state when the synchronous operation circuit 500 is operated.

The sub-clock distribution circuit controller 720 controls the sub-clock distribution circuit 450. Specifically, the sub-clock distribution circuit controller 720 refers to the supply voltage VDD from the power supply section 200, and generates and outputs the enable signals En_S_Root, En_S_A, and En_S_B in the off-state when the supply voltage VDD is higher than a predetermined voltage. On the other hand, a consideration will be made about the case in which the supply voltage VDD is equal to or lower than the predetermined voltage. In this case, the sub-clock distribution circuit controller 720 turns the enable signals En_CNT_A and En_CNT_B to the on-state while keeping the enable signals En_S_Root, En_S_A, and En_S_B at the off-state. As a result, count of the timing error is started.

Then, the sub-clock distribution circuit controller 720 receives the count values ERR_CNT_A and ERR_CNT_B from the error measurement section 600 and controls the sub-clock distribution circuit 450 based on these count values. Specifically, the sub-clock distribution circuit controller 720 instructs the sub-clock distribution circuit 450 to distribute the sub-timing signal to the OR gate (461 or 462) connected to the path whose count value is equal to or larger than a predetermined value. The instruction is made by turning the necessary signals, of the enable signals En_S_Root, En_S_A, and En_S_B, to the on-state. Specifically, when the count value ERR_CNT_A is equal to or larger than the predetermined value, the sub-clock distribution circuit controller 720 turns the enable signals En_S_Root and En_S_A to the on-state. Thereby, the path S_A is activated and the sub-clock signal is distributed to the OR gate 461. When the count value ERR_CNT_B is equal to or larger than the predetermined value, the sub-clock distribution circuit controller 720 turns the enable signals En_S_Root and En_S_B to the on-state. Thereby, the path S_B is activated and the sub-clock signal is distributed to the OR gate 462.

[Operation Example of Clock Distribution Circuit Controller]

Figure 19:
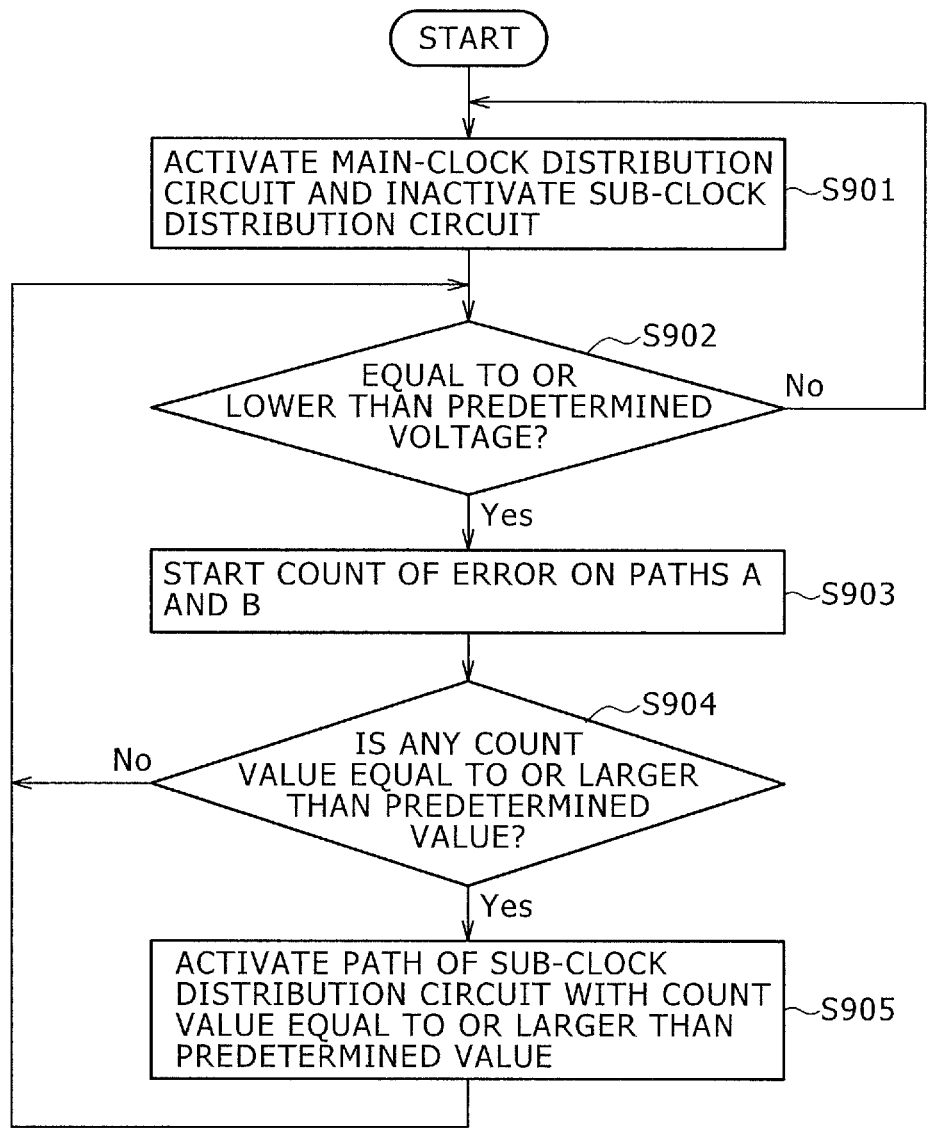
FIG. 19 is a flowchart showing one example of the operation of the clock distribution circuit controller in the second embodiment.

FIG. 19 is a flowchart showing one example of the operation of the clock distribution circuit controller 700 in the second embodiment. This operation is started when the synchronous operation circuit 500 is operated.

The clock distribution circuit controller 700 sets the enable signal En_M to the on-state to activate the main-clock distribution circuit 440 and sets the enable signal En_S to the off-state to inactivate the sub-clock distribution circuit 450 (step S901). The clock distribution circuit controller 700 determines whether or not the supply voltage VDD is equal to or lower than a predetermined voltage (step S902).

If the supply voltage VDD is not equal to or lower than the predetermined voltage (step S902: No), the clock distribution circuit controller 700 returns to the step S901. If the supply voltage VDD is equal to or lower than the predetermined voltage (step S902: Yes), the clock distribution circuit controller 700 makes the error measurement section 600 start count of the timing error on each of the paths M_A and M_B (step S903).

The clock distribution circuit controller 700 determines whether or not any count value is equal to or larger than a predetermined value (step S904). If all count values are smaller than the predetermined value (step S904: No), the clock distribution circuit controller 700 returns to the step S902. If any count value is equal to or larger than the predetermined value (step S904: Yes), the clock distribution circuit controller 700 activates the path (S_A or S_B) of the sub-clock distribution circuit 450 with the count value equal to or larger than the predetermined value (step S905). After the step S905, the clock distribution circuit controller 700 ends the operation for controlling the clock distributor 400.

As above, according to the second embodiment, the main-clock distribution circuit 440 branches the clock signal to plural main-timing signals and distributes them. Meanwhile, the sub-clock distribution circuit 450 branches the clock signal to plural sub-timing signals and distributes them in accordance with the enable signal. The OR gates 461 and 462 each output the signal distributed earlier, of the main-timing signal and the sub-timing signal, as the minimally-delayed timing signal mCLK. The synchronous operation circuit 500 operates in synchronization with the minimally-delayed timing signal mCLK. The error measurement section 600 measures the detection frequency of the timing error. Meanwhile, the clock distribution circuit controller 700 instructs the sub-clock distribution circuit 450 to distribute the clock signal by the enable signal when the detection frequency of the timing error is equal to or higher than a predetermined value. Thereby, the sub-clock signal is distributed by the sub-clock distribution circuit 450 when the detection frequency of the timing error is equal to or higher than the predetermined value. When the sub-clock signal is distributed, the OR gates 461 and 462 each output the signal distributed earlier and thus variation in clock skew is alleviated. Furthermore, because the sub-clock distribution circuit 450 is activated only when the detection frequency of the timing error is high, increase in the amount of power consumption is suppressed compared with a configuration in which the buffer size is increased. Moreover, even when the values of the respective clock signals CLK are different from each other, a short-circuit current is not generated differently from mesh wiring and therefore increase in the amount of power consumption is suppressed compared with mesh wiring.

Although the main-clock distribution circuit 440 and the sub-clock distribution circuit 450 have the configuration including two paths, the number of paths may be only one. Alternatively, three or more paths may be provided.

Furthermore, although the integrated circuit 100 measures the detection frequency of the timing error, it may measure a value other than the detection frequency of the timing error as long as it indicates variation in the delay of the clock signal. For example, the integrated circuit 100 may be so configured as to measure variation itself in the delay of the clock signal.

In addition, although the synchronous operation circuit 500 includes one flip-flop for the path M_A, the circuit configuration of the synchronous operation circuit 500 is not limited to this configuration. For example, it may include two or more flip-flops for the path M_A. This applies also to the path M_B.

Moreover, although the integrated circuit 100 has a configuration in which the minimally-delayed timing signal mCLK is generated by using the OR gates 461 and 462, the minimally-delayed timing signal mCLK may be generated by using a logic gate other than the OR gate. For example, if the synchronous operation circuit 500 operates in synchronization with the falling edge, the integrated circuit 100 may generate the minimally-delayed timing signal mCLK by an AND gate instead of the OR gate.

First Modification Example

Figure 20:
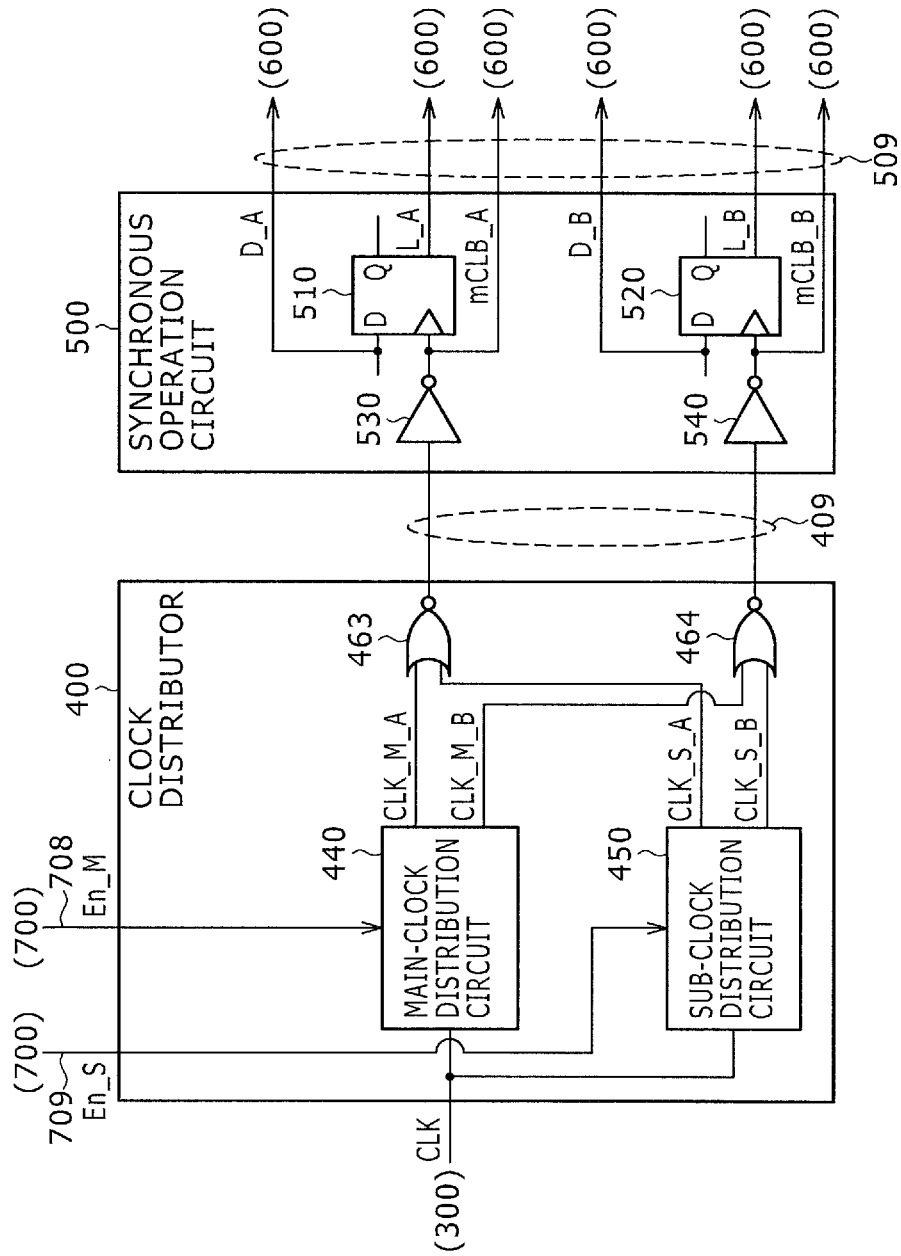
FIG. 20 is a circuit diagram showing one configuration example of the clock distributor and the synchronous operation circuit in a first modification example of the second embodiment.

FIG. 20 is a circuit diagram showing one configuration example of the clock distributor 400 and the synchronous operation circuit 500 in a first modification example of the second embodiment. The configuration of the clock distributor 400 in this first modification example is different from that in the second embodiment in that it includes NOR gates 463 and 464 instead of the OR gates 461 and 462. The configuration of the synchronous operation circuit 500 in the first modification example is different from that in the second embodiment in that it further includes inverters 530 and 540.

The NOR gate 463 outputs the negative logical sum of the main-clock signal CLK_M_A and the sub-clock signal CLK_S_A as the minimally-delayed clock signal mCLK_A to the inverter 530. The NOR gate 464 outputs the negative logical sum of the main-clock signal CLK_M_B and the sub-clock signal CLK_S_B as the minimally-delayed clock signal mCLK_B to the inverter 540. The inverter 530 inverts the minimally-delayed clock signal mCLK_A and outputs the inverted signal to the flip-flop 510. The inverter 540 inverts the minimally-delayed clock signal mCLK_B and outputs the inverted signal to the flip-flop 520.

As above, according to the first modification example, variation in clock skew can be reduced in the configuration in which inverters are provided for the clock input terminals of the flip-flops 510 and 520.

Second Modification Example

Figure 21:
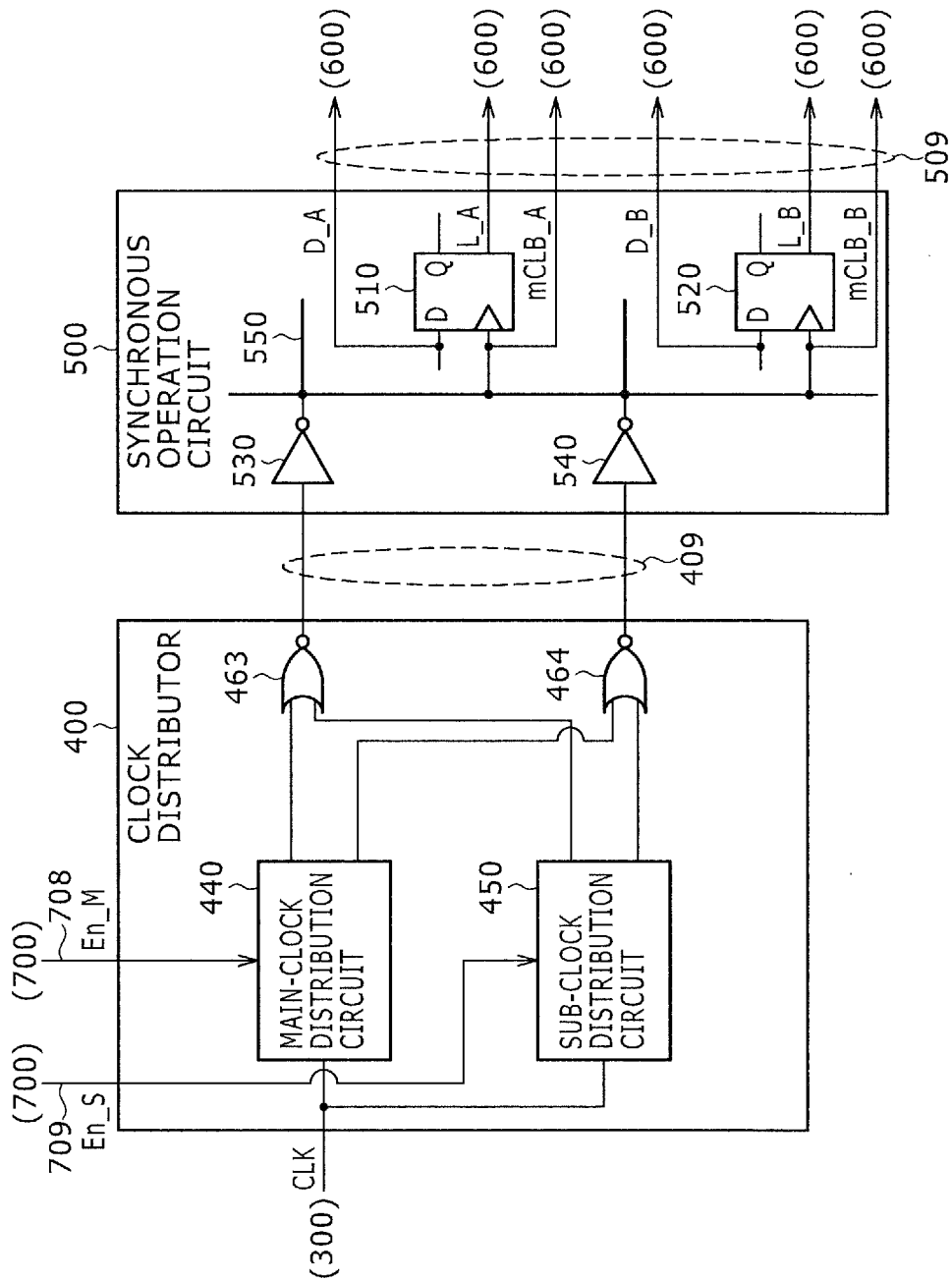
FIG. 21 is a circuit diagram showing one configuration example of the clock distributor and the synchronous operation circuit in a second modification example of the second embodiment.

FIG. 21 is a circuit diagram showing one configuration example of the clock distributor 400 and the synchronous operation circuit 500 in a second modification example of the second embodiment. The configuration of the clock distributor 400 in this second modification example is different from that in the second embodiment in that it includes the NOR gates 463 and 464 instead of the OR gates 461 and 462. The configuration of the synchronous operation circuit 500 in the second modification example is different from that in the second embodiment in that it further includes the inverters 530 and 540 and mesh wiring 550.

The configuration of the NOR gates 463 and 464 is the same as that in the first modification example. The inverters 530 and 540 invert the minimally-delayed clock signals mCLK_A and mCLK_B and output the inverted signals to the mesh wiring 550. The mesh wiring 550 distributes the minimally-delayed clock signal mCLK to plural areas disposed in a lattice manner. The flip-flops 510 and 520 and so forth are disposed in these areas.

As above, according to the second modification example, variation in clock skew can be reduced in the configuration in which connection to the clock input terminals of the flip-flops 510 and 520 is established by the mesh wiring 550.

Third Modification Example

Figure 22:
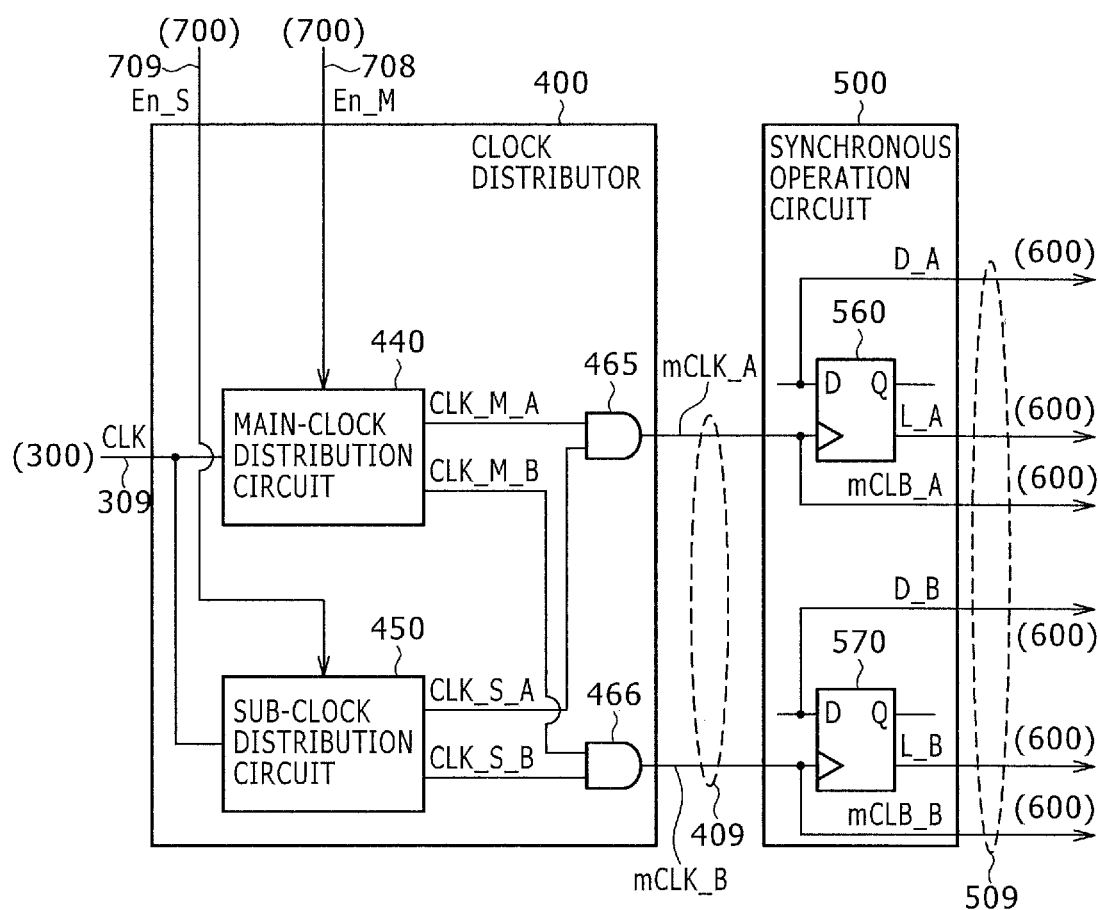
FIG. 22 is a circuit diagram showing one configuration example of the clock distributor and the synchronous operation circuit in a third modification example of the second embodiment.

FIG. 22 is a circuit diagram showing one configuration example of the clock distributor 400 and the synchronous operation circuit 500 in a third modification example of the second embodiment. The above-described second embodiment is based on the supposition that the synchronous operation circuit 500 operates by the rising edge of the clock signal. This third modification example is based on the supposition that the synchronous operation circuit 500 operates by the falling edge. Specifically, the configuration of the clock distributor 400 in the third modification example is different from that in the second embodiment in that it includes AND (logical product) gates 465 and 466 instead of the OR gates 461 and 462. The configuration of the synchronous operation circuit 500 in the third modification example is different from that in the second embodiment in that it includes flip-flops 560 and 570 instead of the flip-flops 510 and 520.

The AND gate 465 outputs the logical product of the main-clock signal CLK_M_A and the sub-clock signal CLK_S_A as the minimally-delayed clock signal mCLK_A to the flip-flop 560. The AND gate 466 outputs the logical product of the main-clock signal CLK_M_B and the sub-clock signal CLK_S_B as the minimally-delayed clock signal mCLK_B to the flip-flop 570. The flip-flops 560 and 570 capture and hold data in synchronization with the falling edge of the minimally-delayed clock signals mCLK_A and mCLK_B.

As above, according to the third modification example, variation in clock skew can be reduced in the configuration in which the synchronous operation circuit 500 operates in synchronization with the falling edge of the clock signal.

Fourth Modification Example

Figure 23:
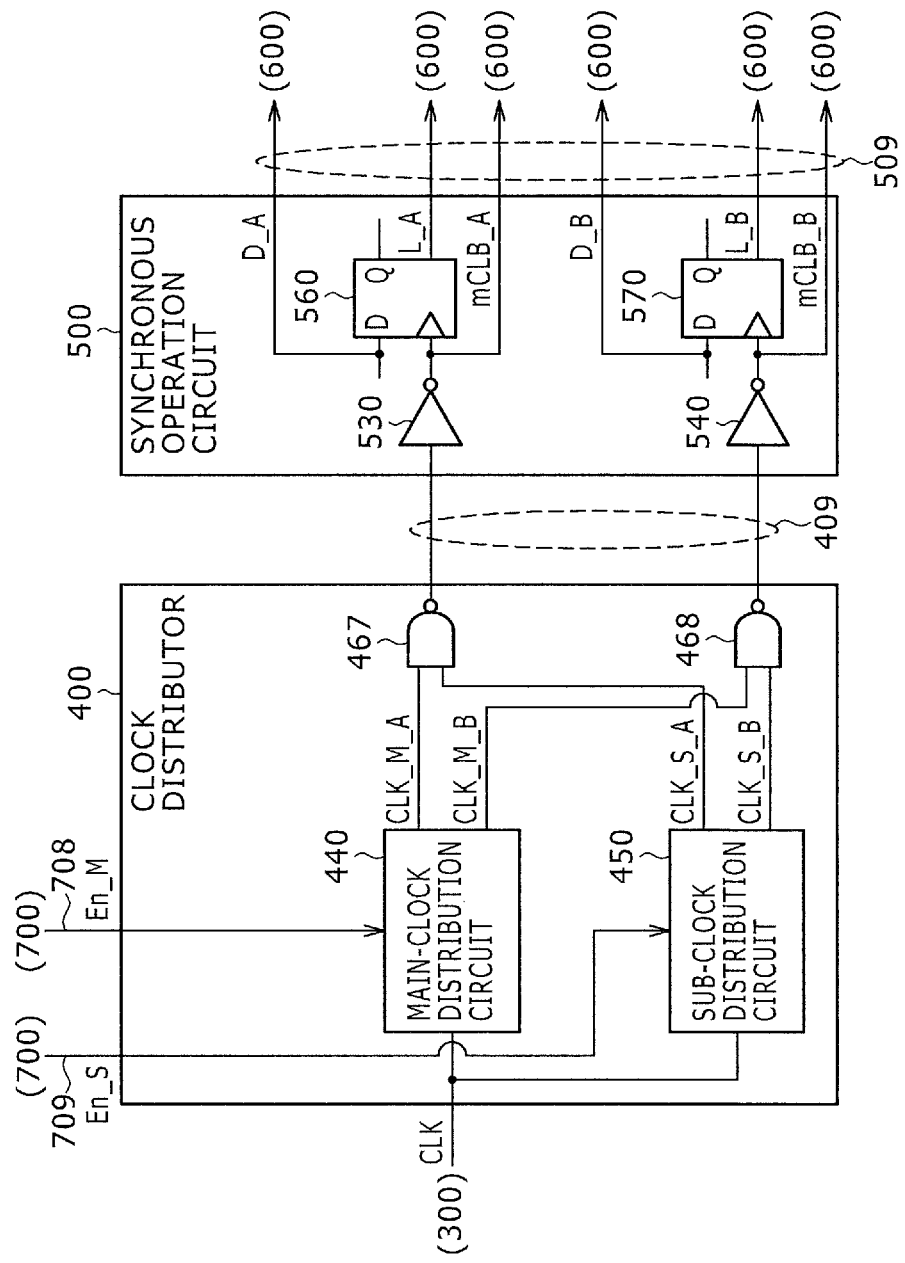
FIG. 23 is a circuit diagram showing one configuration example of the clock distributor and the synchronous operation circuit in a fourth modification example of the second embodiment.

FIG. 23 is a circuit diagram showing one configuration example of the clock distributor 400 and the synchronous operation circuit 500 in a fourth modification example of the second embodiment. This fourth modification example is also based on the supposition that the synchronous operation circuit 500 operates by the falling edge similarly to the third modification example. The configuration of the clock distributor 400 in the fourth modification example is different from that in the second embodiment in that it includes NAND (negative logical product) gates 467 and 468 instead of the OR gates 461 and 462. The configuration of the synchronous operation circuit 500 in the fourth modification example is different from that in the second embodiment in that it includes the flip-flops 560 and 570 instead of the flip-flops 510 and 520 and further includes the inverters 530 and 540.

The NAND gate 467 outputs the negative logical product of the main-clock signal CLK_M_A and the sub-clock signal CLK_S_A as the minimally-delayed clock signal mCLK_A to the inverter 530. The NAND gate 468 outputs the negative logical product of the main-clock signal CLK_M_B and the sub-clock signal CLK_S_B as the minimally-delayed clock signal mCLK_B to the inverter 540. The inverter 530 inverts the minimally-delayed clock signal mCLK_A and outputs the inverted signal to the flip-flop 560. The inverter 540 inverts the minimally-delayed clock signal mCLK_B and outputs the inverted signal to the flip-flop 570. The flip-flops 560 and 570 capture and hold data in synchronization with the falling edge of the minimally-delayed clock signals mCLK_A and mCLK_B.

As above, according to the fourth modification example, variation in clock skew can be reduced in the configuration in which inverters are provided for the clock input terminals of the flip-flops 560 and 570 and the synchronous operation circuit 500 operates in synchronization with the falling edge of the clock signal.

Fifth Modification Example

Figure 24:
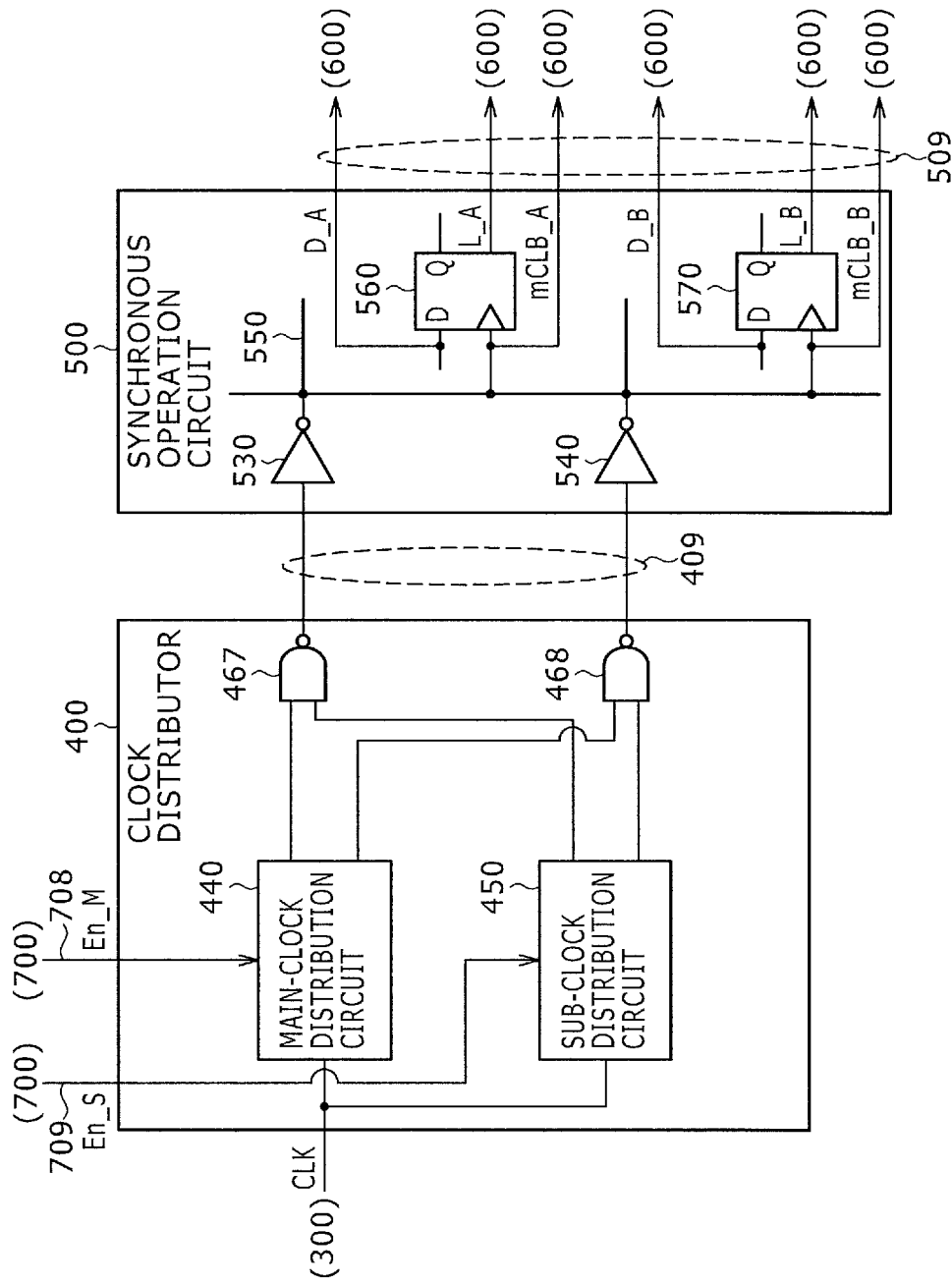
FIG. 24 is a circuit diagram showing one configuration example of the clock distributor and the synchronous operation circuit in a fifth modification example of the second embodiment.

FIG. 24 is a circuit diagram showing one configuration example of the clock distributor 400 and the synchronous operation circuit 500 in a fifth modification example of the second embodiment. This fifth modification example is also based on the supposition that the synchronous operation circuit 500 operates by the falling edge similarly to the third modification example. The configuration of the clock distributor 400 in the fifth modification example is different from that in the second embodiment in that it includes the NAND gates 467 and 468 instead of the OR gates 461 and 462. The configuration of the synchronous operation circuit 500 in the fifth modification example is different from that in the second embodiment in that it includes the flip-flops 560 and 570 instead of the flip-flops 510 and 520. Furthermore, the configuration of the synchronous operation circuit 500 in the fifth modification example is different from that in the second embodiment in that it further includes the inverters 530 and 540 and the mesh wiring 550.

The configuration of the NAND gates 467 and 468 is the same as that in the fourth modification example of the second embodiment. The configuration of the inverters 530 and 540 and the mesh wiring 550 is the same as that in the second modification example of the second embodiment. The configuration of the flip-flops 560 and 570 is the same as that in the fourth modification example of the second embodiment.

As above, according to the fifth modification example, variation in clock skew can be reduced in the configuration in which the clock input terminals of the flip-flops 560 and 570 are connected to mesh wiring and the synchronous operation circuit 500 operates in synchronization with the falling edge of the clock signal.

3. Third Embodiment

Configuration Example of Integrated Circuit

Figure 25:
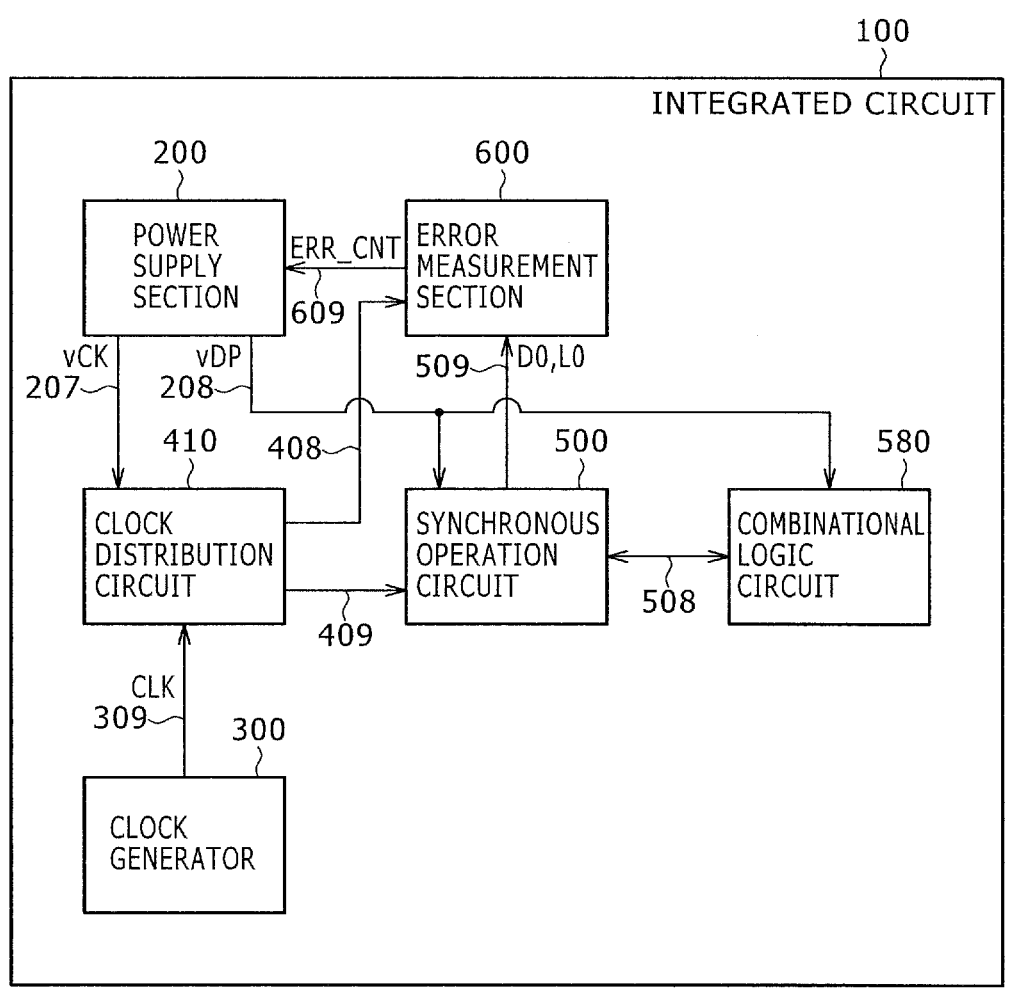
FIG. 25 is a block diagram showing one configuration example of an integrated circuit in a third embodiment.

FIG. 25 is a block diagram showing one configuration example of an integrated circuit 100 in a third embodiment. The integrated circuit 100 in this third embodiment includes a power supply section 200, a clock generator 300, a clock distribution circuit 410, a synchronous operation circuit 500, a combinational logic circuit 580, and an error measurement section 600.

The power supply section 200 supplies power to the clock distribution circuit 410, the synchronous operation circuit 500, and the combinational logic circuit 580. Specifically, the power supply section 200 drops a supply voltage VDD. The dropped voltage is supplied as a clock distribution circuit drive voltage vCK to the clock distribution circuit 410 via a signal line 207. Furthermore, the power supply section 200 supplies a voltage lower than the clock distribution circuit drive voltage vCK as a logic circuit drive voltage vDP to the combinational logic circuit 580 and the synchronous operation circuit 500 via a signal line 208.

The clock generator 300 generates a clock signal CLK having a predetermined frequency by using e.g. a PLL. The clock signal CLK is generated as a signal for indicating predetermined timing to the synchronous operation circuit 500 and the error measurement section 600. The clock generator 300 outputs the generated clock signal CLK to the clock distribution circuit 410 via a signal line 309.

The clock distribution circuit 410 distributes the clock signal CLK to each of the circuits in the integrated circuit 100 including the synchronous operation circuit 500. The clock distribution circuit 410 distributes the clock signal CLK to the synchronous operation circuit 500 via a signal line 409 and distributes it to the error measurement section 600 via a signal line 408. The clock signal CLK distributed to the error measurement section 600 is for indicating the timing of count of the number of errors. The clock distribution circuit 410 is one example of the timing signal distribution circuit set forth in the claims.

The synchronous operation circuit 500 is a circuit that operates in synchronization with the clock signal CLK. The combinational logic circuit 580 performs predetermined logical operation based on the operation result of the synchronous operation circuit 500. The combinational logic circuit 580 is one example of the logic circuit set forth in the claims.

The error measurement section 600 detects a timing error generated in the synchronous operation circuit 500 and measures the detection frequency thereof. The detection frequency of the timing error is measured by counting the number of errors in a certain measurement cycle for example. The error measurement section 600 outputs a count value ERR_CNT of the timing error to the power supply section 200 via a signal line 609.

Figure 26:
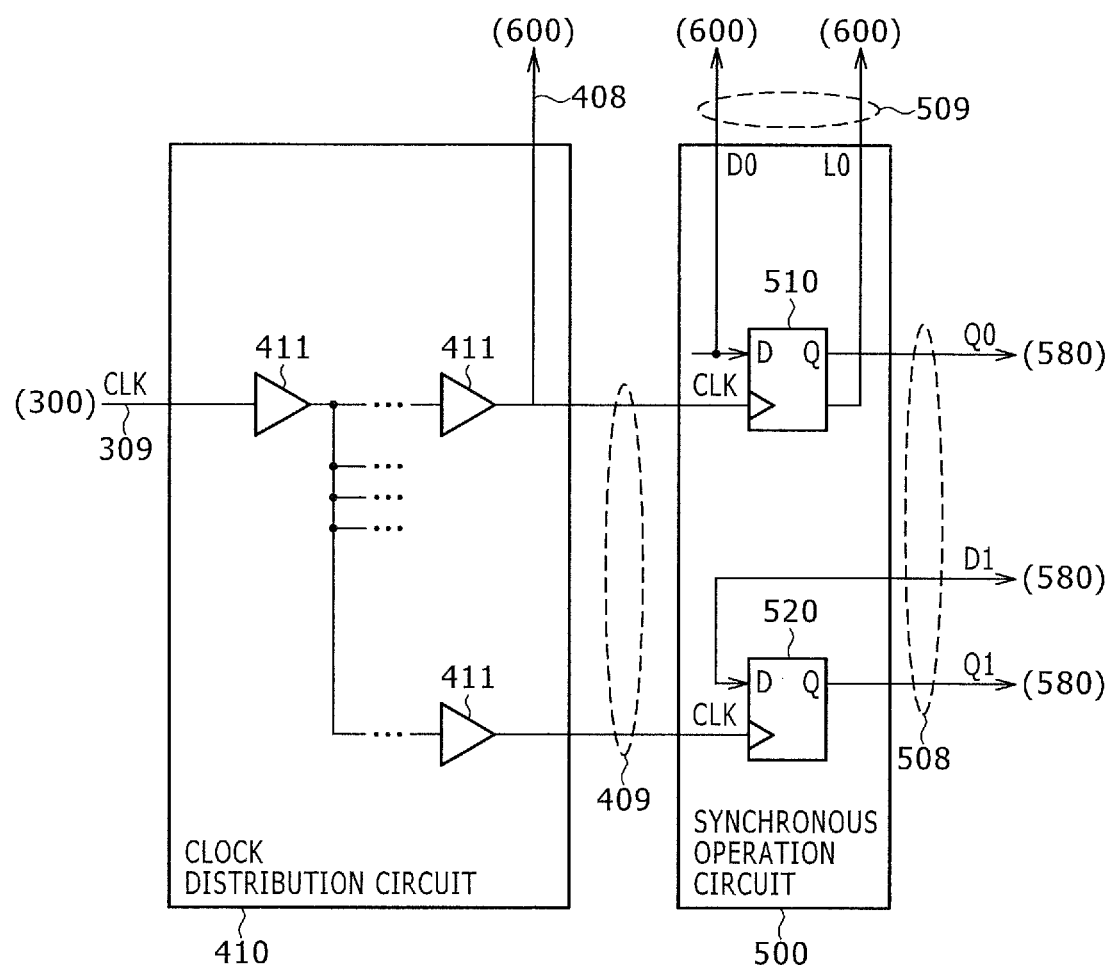
FIG. 26 is a circuit diagram showing one configuration example of a clock distribution circuit and a synchronous operation circuit in the third embodiment.

FIG. 26 is a circuit diagram showing one configuration example of the clock distribution circuit 410 and the synchronous operation circuit 500 in the third embodiment. The clock distribution circuit 410 includes buffers 411 of a predetermined number of stages and distributes the clock signal CLK to the synchronous operation circuit 500 via these buffers 411. The synchronous operation circuit 500 includes flip-flops 510 and 520. The flip-flops 510 and 520 capture and hold data in synchronization with the distributed clock signal CLK. An input signal D0 input to the flip-flop 510 and a latch output signal L0 from the flip-flop 510 are output to the error measurement section 600 via a signal line 509.

The synchronous operation circuit 500 outputs the data that is necessary in the combinational logic circuit 580 or receives data generated in the combinational logic circuit 580. For example, the flip-flop 510 outputs the held signal as an output signal Q0 to the combinational logic circuit 580. The flip-flop 520 receives and holds an input signal D1 from the combinational logic circuit 580, and outputs the held signal as an output signal Q1 to the combinational logic circuit 580.

Figure 27:
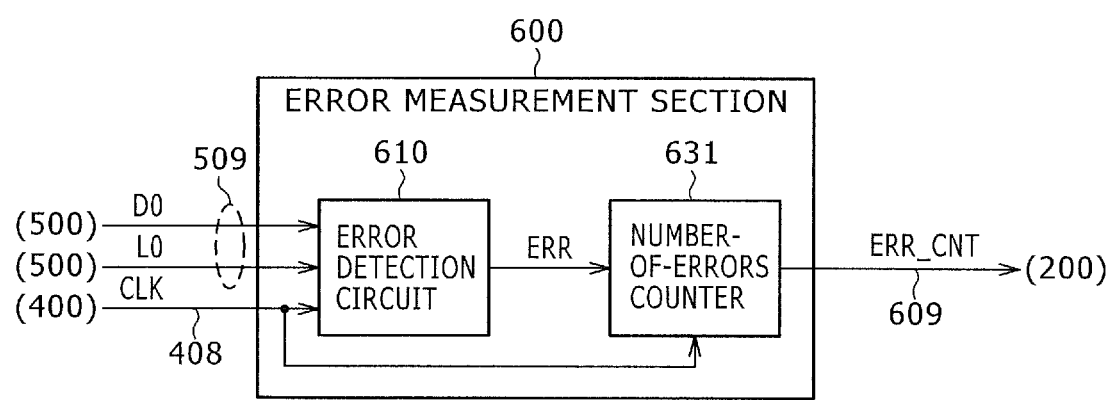
FIG. 27 is a block diagram showing one configuration example of an error measurement section in the third embodiment.

FIG. 27 is a block diagram showing one configuration example of the error measurement section 600 in the third embodiment. The error measurement section 600 includes an error detection circuit 610 and a number-of-errors counter 631. The configuration of the error detection circuit 610 is the same as that of the error detection circuit 610 in the second embodiment. The number-of-errors counter 631 counts the number of errors detected in the error detection circuit 610 in a predetermined measurement cycle in synchronization with the clock signal CLK. The number-of-errors counter 631 outputs the count value ERR_CNT to the power supply section 200.

Figure 28:
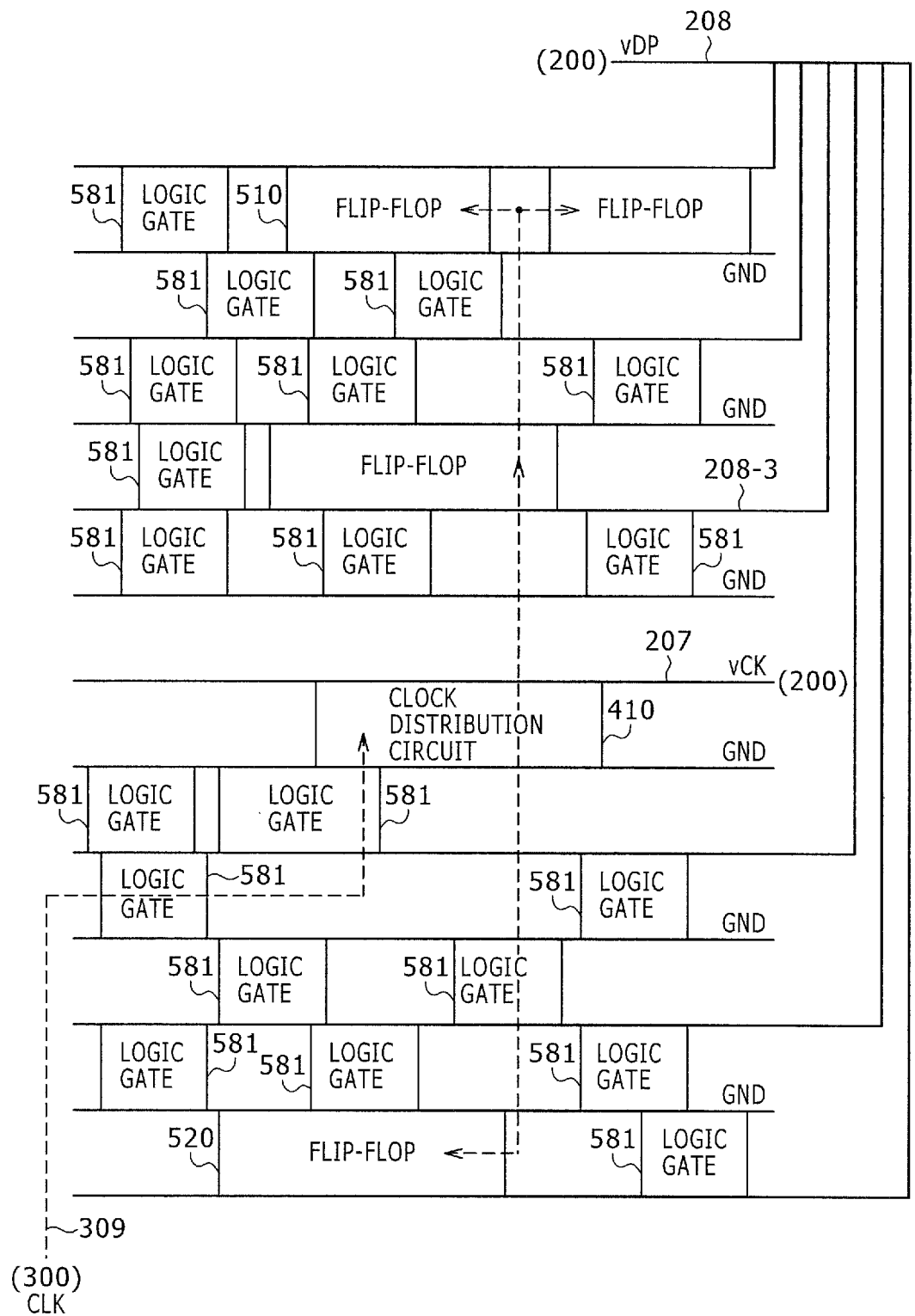
FIG. 28 is a diagram showing an implementation example of the clock distribution circuit, the synchronous operation circuit, and a combinational logic circuit in the third embodiment.

FIG. 28 is a diagram showing an implementation example of the clock distribution circuit 410, the synchronous operation circuit 500, and the combinational logic circuit 580 in the third embodiment. The dotted line in the diagram indicates wiring for distributing the clock signal CLK. Plural signal lines including the signal lines 207 and 208 are wired in the integrated circuit 100 and circuits are connected to these signal lines. The circuits are so disposed that the clock distribution circuit 410, the synchronous operation circuit 500, and the combinational logic circuit 580 are supplied with voltages different from each other. Specifically, the clock distribution circuit 410 is connected to the signal line 207. The circuits are so disposed that the flip-flops 510 and 520 and a logic gate 581 in the combinational logic circuit 580 are not connected to this signal line 207. To the signal line 208, the flip-flops 510 and 520 and the logic gate 581 are connected. The circuits are so disposed that the clock distribution circuit 410 is not connected to this signal line 208. By disposing the circuits in this manner, the clock distribution circuit drive voltage vCK is supplied to the clock distribution circuit 410 via the signal line 207 and the logic circuit drive voltage vDP is supplied to the synchronous operation circuit 500 and the combinational logic circuit 580 via the signal line 208.

[Configuration Example of Power Supply Section]

Figure 29:
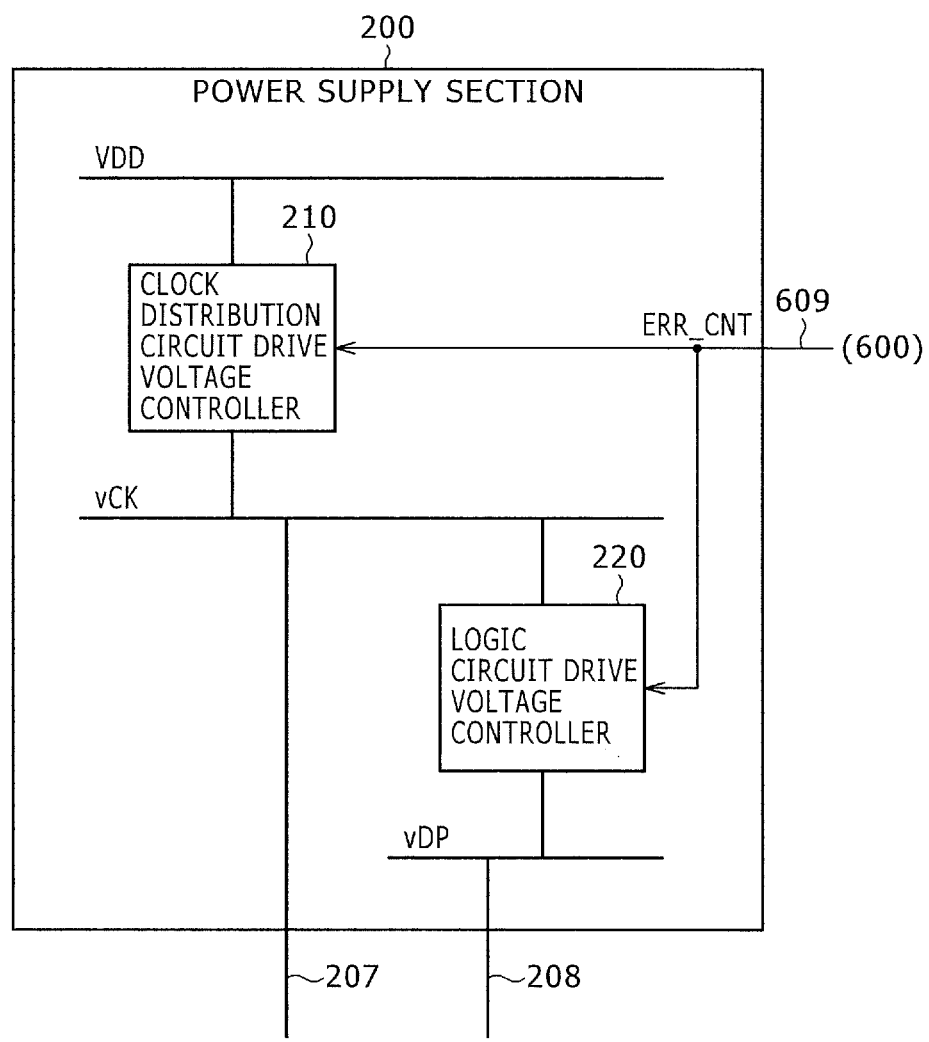
FIG. 29 is a block diagram showing one configuration example of a power supply section in the third embodiment.

FIG. 29 is a block diagram showing one configuration example of the power supply section 200 in the third embodiment. The power supply section 200 includes a clock distribution circuit drive voltage controller 210 and a logic circuit drive voltage controller 220. The clock distribution circuit drive voltage controller 210 drops the supply voltage VDD and supplies the dropped voltage as the clock distribution circuit drive voltage vCK to the clock distribution circuit 410. The logic circuit drive voltage controller 220 drops the clock distribution circuit drive voltage vCK and supplies the dropped voltage as the logic circuit drive voltage vDP to the synchronous operation circuit 500 and the combinational logic circuit 580. The clock distribution circuit drive voltage controller 210 is one example of the timing signal distribution circuit drive voltage controller set forth in the claims.

Figure 30:
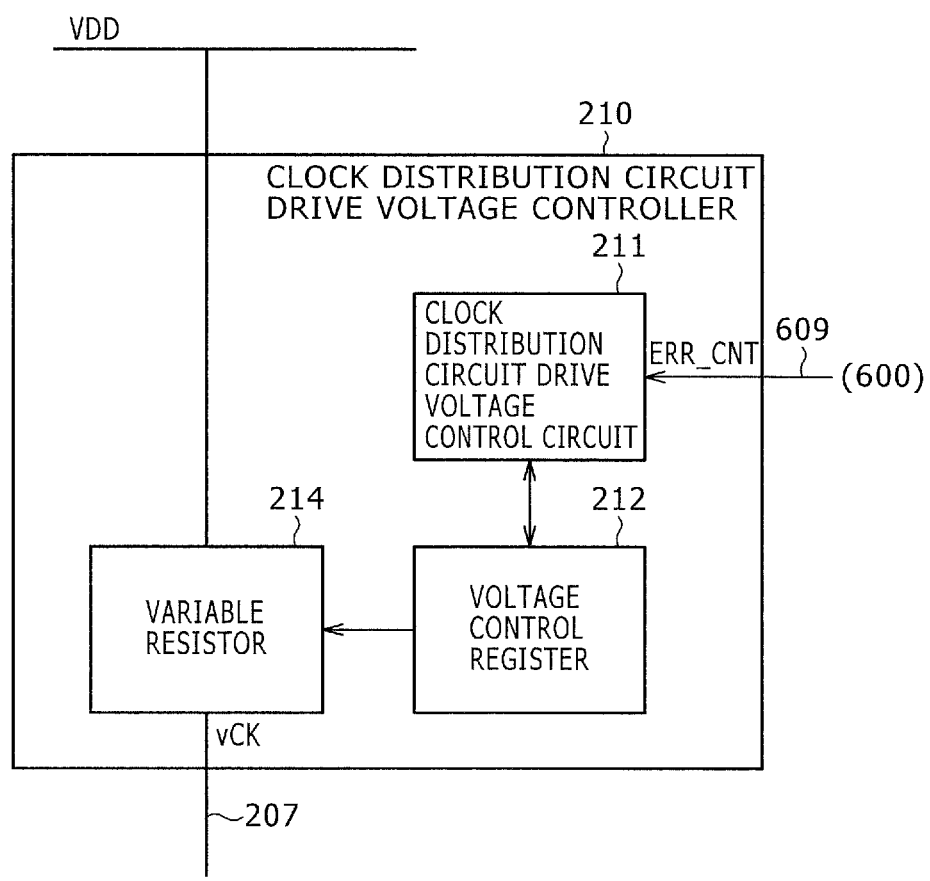
FIG. 30 is a block diagram showing one configuration example of a clock distribution circuit drive voltage controller in the third embodiment.

FIG. 30 is a block diagram showing one configuration example of the clock distribution circuit drive voltage controller 210 in the third embodiment. The clock distribution circuit drive voltage controller 210 includes a clock distribution circuit drive voltage control circuit 211, a voltage control register 212, and a variable resistor 214. One terminal of the variable resistor 214 is connected to the power supply that provides the supply voltage VDD and the other terminal is connected to the power supply line 207. The clock distribution circuit drive voltage control circuit 211 drops the supply voltage VDD by updating the value of the voltage control register 212 and supplies the dropped voltage as the clock distribution circuit drive voltage vCK. When the count value ERR_CNT of the error is smaller than a threshold Th, the clock distribution circuit drive voltage control circuit 211 drops the clock distribution circuit drive voltage vCK to a set value Vsc. When the count value ERR_CNT of the error is equal to or larger than the threshold Th, the clock distribution circuit drive voltage control circuit 211 boosts the clock distribution circuit drive voltage vCK to a set value Vec. Vec is set to a value higher than Vsc.

The voltage control register 212 holds a value for controlling the resistivity of the variable resistor 214. The variable resistor 214 is a resistor whose resistance value changes depending on change in the value held in the voltage control register 212. The supplied clock distribution circuit drive voltage vCK changes due to the change in the resistance value of the variable resistor 214.

FIG. 31 is a diagram showing one example of the operation of the clock distribution circuit drive voltage control circuit 211 in the third embodiment. When the count value ERR_CNT of the error is smaller than the threshold Th, the clock distribution circuit drive voltage control circuit 211 refers to the value of the voltage control register 212 and acquires the present value of the clock distribution circuit drive voltage vCK. Then, the clock distribution circuit drive voltage control circuit 211 determines whether or not this clock distribution circuit drive voltage vCK is higher than the set value Vsc. If the clock distribution circuit drive voltage vCK is higher than the set value Vsc, the clock distribution circuit drive voltage control circuit 211 drops the clock distribution circuit drive voltage vCK to the set value Vsc. When the count value ERR_CNT of the error is equal to or larger than the threshold Th, the clock distribution circuit drive voltage control circuit 211 urgently boosts the clock distribution circuit drive voltage vCK to the set value Vec.

Figure 32:
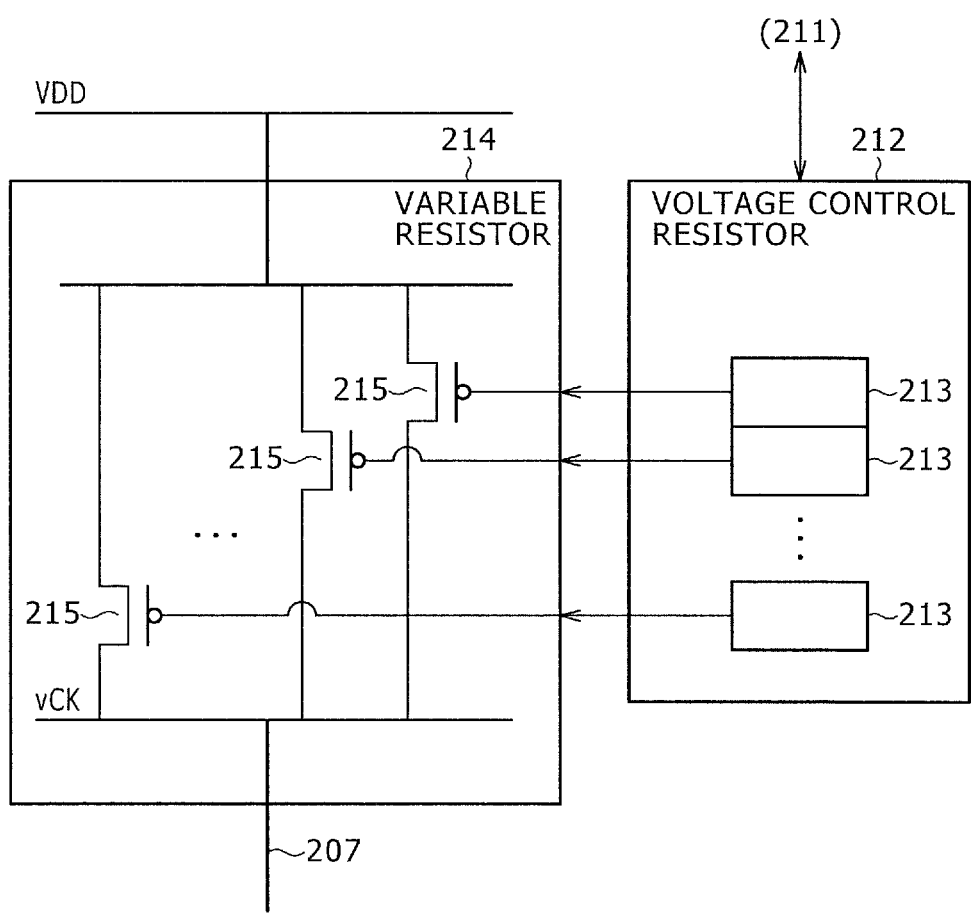
FIG. 32 is a circuit diagram showing one configuration example of a voltage control register and a variable resistor in the third embodiment.

FIG. 32 is a circuit diagram showing one configuration example of the voltage control register 212 and the variable resistor 214 in the third embodiment. The voltage control register 212 includes n (n is an integer equal to or larger than 1) flip-flops 213. The variable resistor 214 includes n pMOS transistors 215 connected in parallel. The flip-flop 213 holds data of 1 bit. The initial value of the data held by each flip-flop 213 is e.g. "0" and the value of the data is updated by the clock distribution circuit drive voltage control circuit 211. The output terminal of the flip-flop 213 is connected to the gate terminal of the pMOS transistor 215 with one-to-one correspondence.

The pMOS transistor 215 allows current flow between the source and the drain depending on the value of the signal input to the gate terminal. The pMOS transistor 215 has the gate terminal, the source terminal, and the drain terminal. The gate terminal is connected to the output terminal of the flip-flop 213. The source terminal is connected to the power supply that provides the supply voltage VDD and the drain terminal is connected to the signal line 207. The pMOS transistor 215 is in the on-state and allows current flow between the source terminal and the drain terminal when the held value of the flip-flop 213 input to the gate terminal is "0," and is in the off-state when the held value is "1." Here, the resistance between the gate terminal and drain terminal of one pMOS transistor in the on-state is defined as $R_0$. If the number of pMOS transistors 215 in the on-state is defined as m (m is an integer equal to or larger than 1), the combined resistance R of the variable resistor 214 is represented as $R_0/m$. That is, when the number of values "0" is larger in the voltage control register 212, the number of pMOS transistors 215 in the on-state is larger and the combined resistance R is lower. Thus, the clock distribution circuit drive voltage vCK is higher. The variable resistor 214 is not limited to the configuration in which the pMOS transistors 215 are connected in parallel as long as it has a configuration capable of controlling the resistance value.

Figure 33:
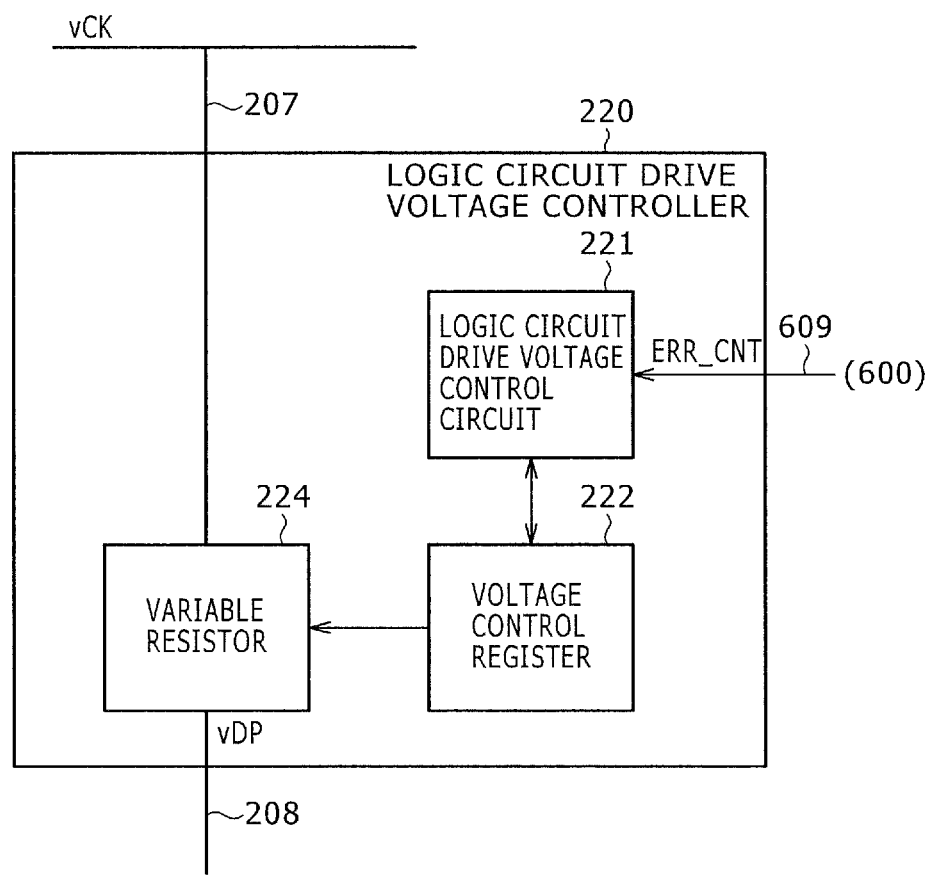
FIG. 33 is a block diagram showing one configuration example of a logic circuit drive voltage controller in the third embodiment.

FIG. 33 is a block diagram showing one configuration example of the logic circuit drive voltage controller 220 in the third embodiment. The logic circuit drive voltage controller 220 includes a logic circuit drive voltage control circuit 221, a voltage control register 222, and a variable resistor 224. One terminal of the variable resistor 224 is connected to the signal line 207 and the other terminal is connected to the signal line 208. The logic circuit drive voltage control circuit 221 drops the clock distribution circuit drive voltage vCK by updating the value of the voltage control register 222 and supplies the dropped voltage as the logic circuit drive voltage vDP. When the count value ERR_CNT of the error is smaller than the threshold Th, the logic circuit drive voltage control circuit 221 drops the logic circuit drive voltage vDP to a set value Vsd. When the count value ERR_CNT of the error is equal to or larger than the threshold Th, the logic circuit drive voltage control circuit 221 boosts the logic circuit drive voltage vDP to a set value Ved. Ved is set to a value higher than Vsd.

FIG. 34 is a diagram showing one example of the operation of the logic circuit drive voltage control circuit 221 in the third embodiment. When the count value ERR_CNT of the error is smaller than the threshold Th, the logic circuit drive voltage control circuit 221 refers to the value of the voltage control register 222 and acquires the present value of the logic circuit drive voltage vDP. Then, the logic circuit drive voltage control circuit 221 determines whether or not this logic circuit drive voltage vDP is higher than the set value Vsd. If the logic circuit drive voltage vDP is higher than the set value Vsd, the logic circuit drive voltage control circuit 221 drops the logic circuit drive voltage vDP to the set value Vsd. When the count value ERR_CNT of the error is equal to or larger than the threshold Th, the logic circuit drive voltage control circuit 221 urgently boosts the logic circuit drive voltage vDP to the set value Ved.

[Operation Example of Power Supply Section]

Figure 35:
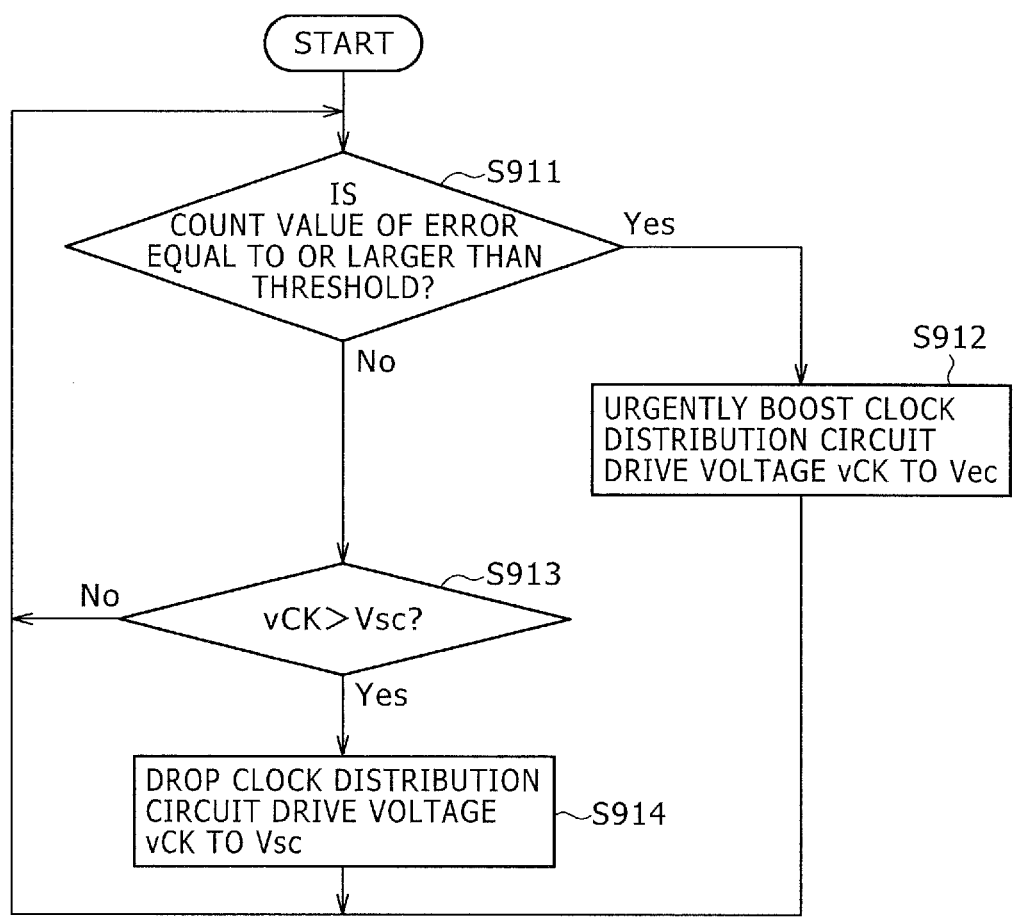
FIG. 35 is a flowchart showing one example of the operation of the clock distribution circuit drive voltage controller in the third embodiment.

FIG. 35 is a flowchart showing one example of the operation of the clock distribution circuit drive voltage control circuit 211 in the third embodiment. The clock distribution circuit drive voltage control circuit 211 determines whether or not the count value ERR_CNT of the error is equal to or larger than the threshold Th (step S911). If the count value ERR_CNT is equal to or larger than the threshold Th (step S911: Yes), the clock distribution circuit drive voltage control circuit 211 urgently boosts the clock distribution circuit drive voltage vCK to the set value Vec (step S912). After the step S912, the clock distribution circuit drive voltage control circuit 211 returns to the step S911.

If the count value ERR_CNT is smaller than the threshold Th (step S911: No), the clock distribution circuit drive voltage control circuit 211 determines whether or not the clock distribution circuit drive voltage vCK is higher than the set value Vsc (step S913). If the clock distribution circuit drive voltage vCK is higher than the set value Vsc (step S913: Yes), the clock distribution circuit drive voltage control circuit 211 drops the clock distribution circuit drive voltage vCK to the set value Vsc (step S914). If the clock distribution circuit drive voltage vCK is equal to or lower than the set value Vsc (step S913: No) or after the step S914, the clock distribution circuit drive voltage control circuit 211 returns to the step S911.

Figure 36:
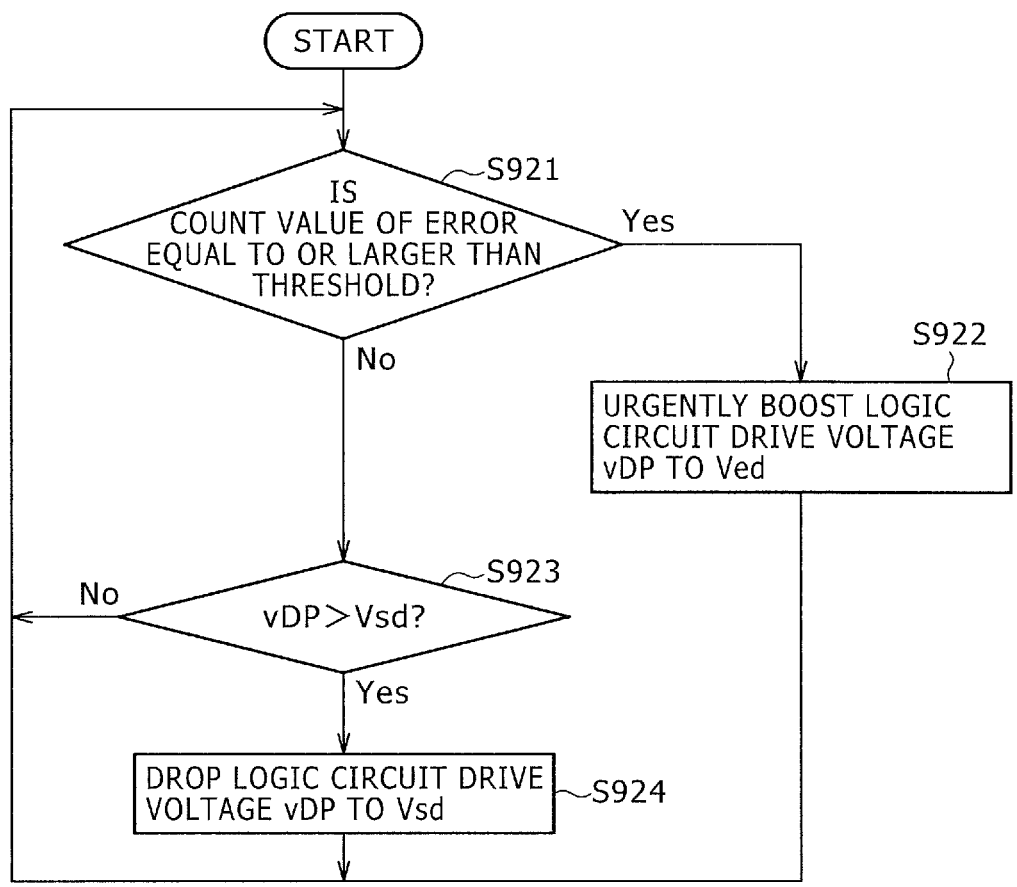
FIG. 36 is a flowchart showing one example of the operation of the logic circuit drive voltage controller in the third embodiment.

FIG. 36 is a flowchart showing one example of the operation of the logic circuit drive voltage control circuit 221 in the third embodiment. The logic circuit drive voltage control circuit 221 determines whether or not the count value ERR_CNT of the error is equal to or larger than the threshold Th (step S921). If the count value ERR_CNT is equal to or larger than the threshold Th (step S921: Yes), the logic circuit drive voltage control circuit 221 urgently boosts the logic circuit drive voltage vDP to the set value Ved (step S922). After the step S922, the logic circuit drive voltage control circuit 221 returns to the step S921.

If the count value ERR_CNT is smaller than the threshold Th (step S921: No), the logic circuit drive voltage control circuit 221 determines whether or not the logic circuit drive voltage vDP is higher than the set value Vsd (step S923). If the logic circuit drive voltage vDP is higher than the set value Vsd (step S923: Yes), the logic circuit drive voltage control circuit 221 drops the logic circuit drive voltage vDP to the set value Vsd (step S924). If the logic circuit drive voltage vDP is equal to or lower than the set value Vsd (step S923: No) or after the step S924, the logic circuit drive voltage control circuit 221 returns to the step S921.

Figure 37:
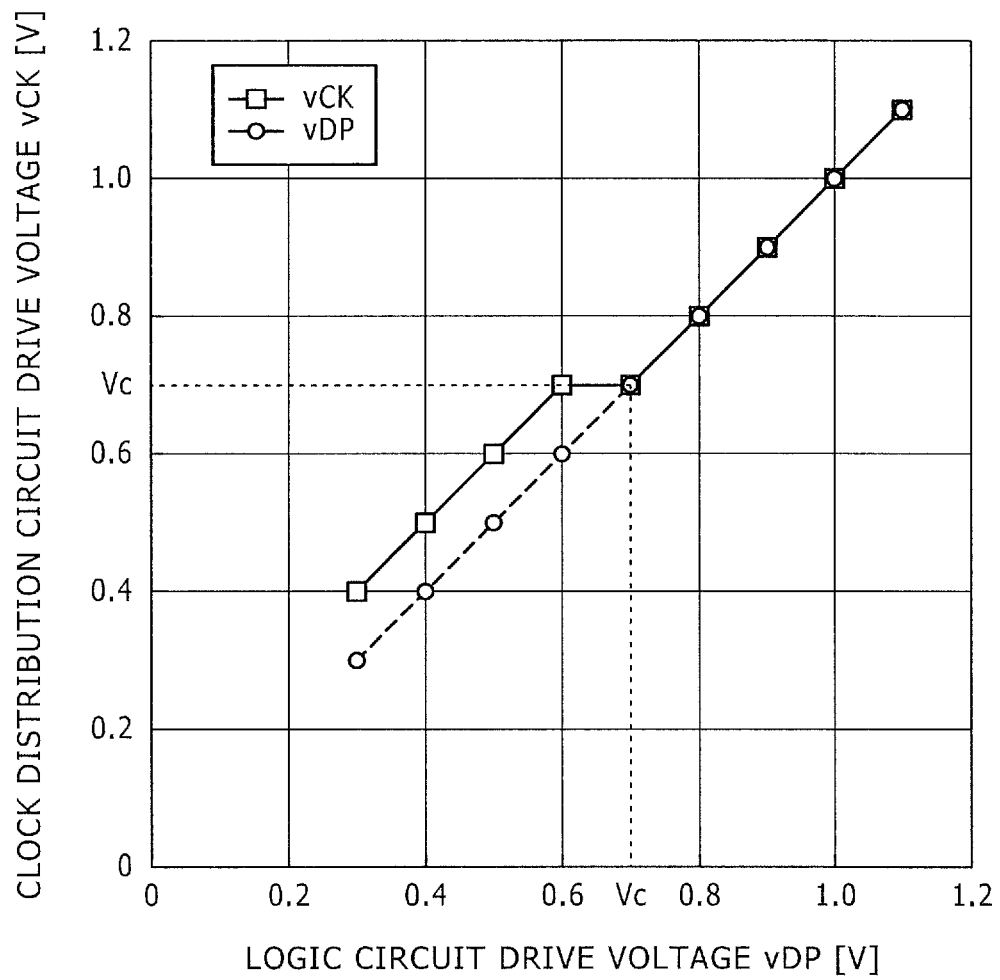
FIG. 37 is a graph showing a first setting example of a clock distribution circuit drive voltage and a logic circuit drive voltage in the third embodiment.

FIG. 37 is a graph showing a first setting example of the clock distribution circuit drive voltage vCK and the logic circuit drive voltage vDP in the third embodiment. The ordinate of the graph indicates the set value of the clock distribution circuit drive voltage vCK and the abscissa indicates the set value of the logic circuit drive voltage vDP. In this first setting example, when the logic circuit drive voltage vDP is lower than Vc (e.g. 0.7 V), a voltage higher than the logic circuit drive voltage vDP is set as the clock distribution circuit drive voltage vCK. In the leg of the voltage vDP lower than this Vc, the voltages are so set that the difference in the voltage value between the logic circuit drive voltage vDP and the clock distribution circuit drive voltage vCK is constant. In the leg of the voltage vDP equal to or higher than Vc, the voltage values of the clock distribution circuit drive voltage vCK and the logic circuit drive voltage vDP are set identical to each other.

Figure 38:
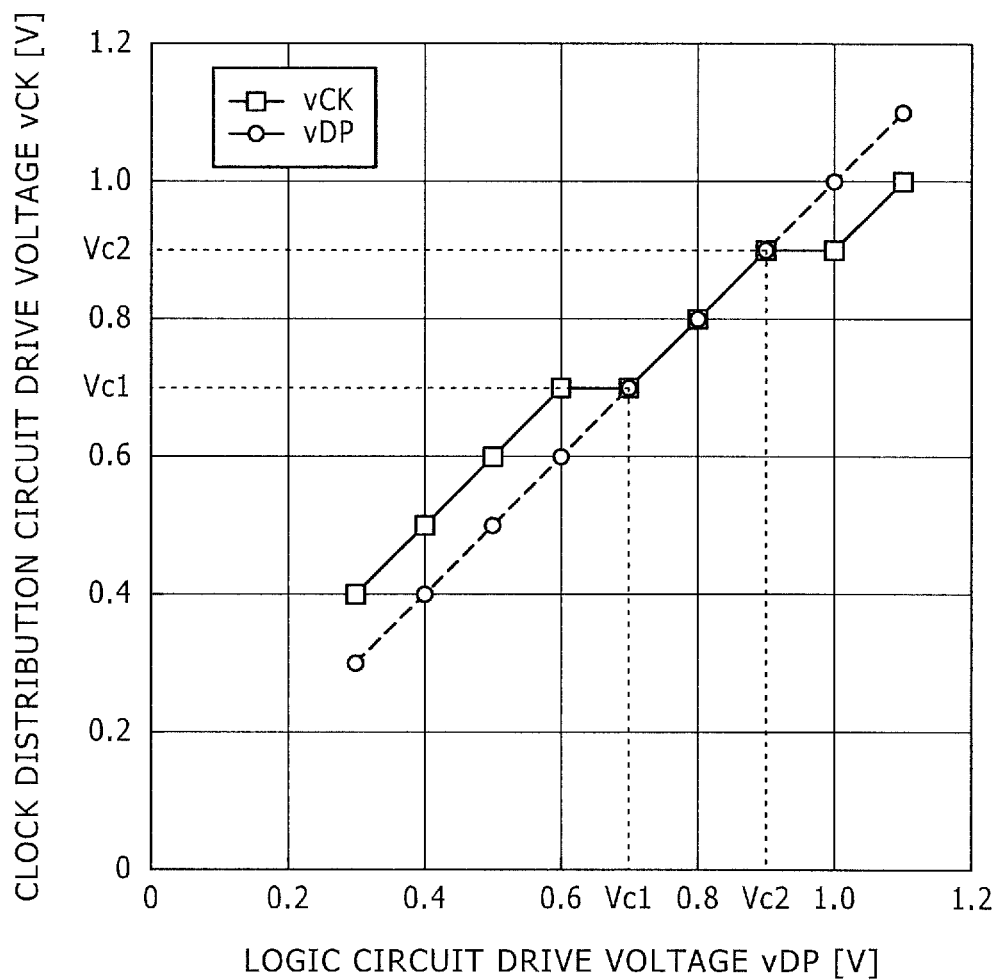
FIG. 38 is a graph showing a second setting example of the clock distribution circuit drive voltage and the logic circuit drive voltage in the third embodiment.

Voltages other than the set values exemplified in FIG. 37 may be set in the power supply section 200. For example, FIG. 38 is a graph showing a second setting example of the clock distribution circuit drive voltage vCK and the logic circuit drive voltage vDP. In this second setting example, when the logic circuit drive voltage vDP is lower than Vc1 (e.g. 0.7 V), a voltage higher than the logic circuit drive voltage vDP is set as the clock distribution circuit drive voltage vCK similarly to the first setting example. In the leg in which the logic circuit drive voltage vDP is from Vc1 inclusive to Vc2 (>Vc1) inclusive, the voltage values of the clock distribution circuit drive voltage vCK and the logic circuit drive voltage vDP are set identical to each other. In the leg in which the logic circuit drive voltage vDP is higher than Vc2, a voltage lower than the logic circuit drive voltage vDP is set as the clock distribution circuit drive voltage vCK. According to this second setting example, the amount of power consumption can be reduced also when the voltage is sufficiently high.

Figure 39:
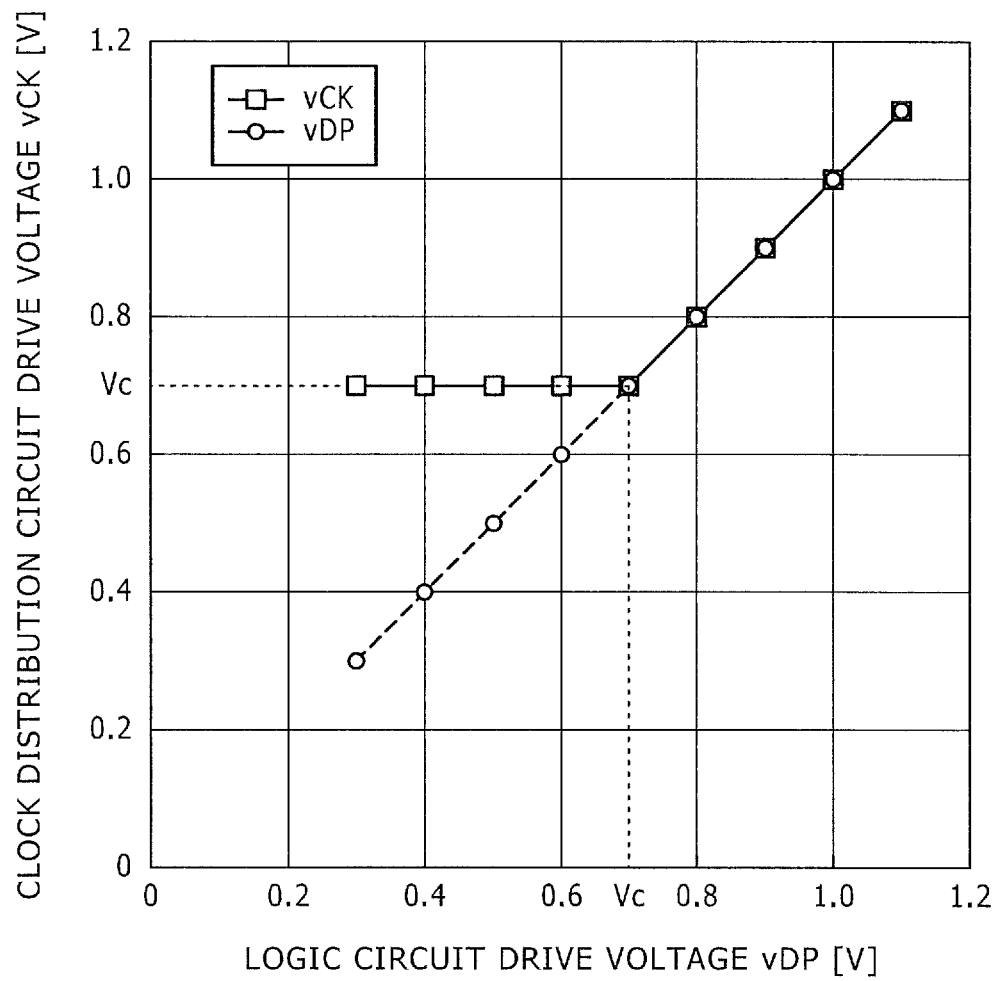
FIG. 39 is a graph showing a third setting example of the clock distribution circuit drive voltage and the logic circuit drive voltage in the third embodiment.

For example, FIG. 39 is a graph showing a third setting example of the clock distribution circuit drive voltage vCK and the logic circuit drive voltage vDP. In this third setting example, in the leg in which the logic circuit drive voltage vDP is lower than Vc, a constant voltage value (e.g. Vc) is set as the clock distribution circuit drive voltage vCK. According to this third setting example, the integrated circuit 100 can reduce the amount of power consumption while carrying out control so that the clock distribution circuit drive voltage vCK may be prevented from becoming lower than the minimum operating voltage.

As above, according to the third embodiment, the logic circuit drive voltage vDP lower than the clock distribution circuit drive voltage vCK is supplied to the combinational logic circuit 580 by the power supply section 200 in the low-voltage region. This facilitates reduction in the amount of power consumption compared with a configuration in which the voltage of the same value is supplied to the clock distribution circuit 410 and the combinational logic circuit 580. As described above, skew in the clock distribution circuit 410 exponentially increases along with the lowering of the voltage. However, the influence of the skew is smaller in the combinational logic circuit 580 compared with the clock distribution circuit 410. Therefore, the minimum operating voltage of the combinational logic circuit 580 may be set lower than that of the clock distribution circuit 410. Accordingly, by setting the logic circuit drive voltage vDP lower than the clock distribution circuit drive voltage vCK, the amount of power consumption of the whole of the integrated circuit 100 can be easily reduced.

The integrated circuit 100 of the third embodiment may include the clock distributor 400 of the first embodiment instead of the clock distribution circuit 410 and distribute the minimally-delayed clock signal mCLK to the synchronous operation circuit 500. This further reduces clock skew. Similarly, the integrated circuit 100 of the third embodiment may include the clock distribution circuit controller 700 and the clock distributor 400 of the second embodiment instead of the clock distribution circuit 410 and distribute the minimally-delayed clock signal mCLK to the synchronous operation circuit 500.

First Modification Example

Figure 40:
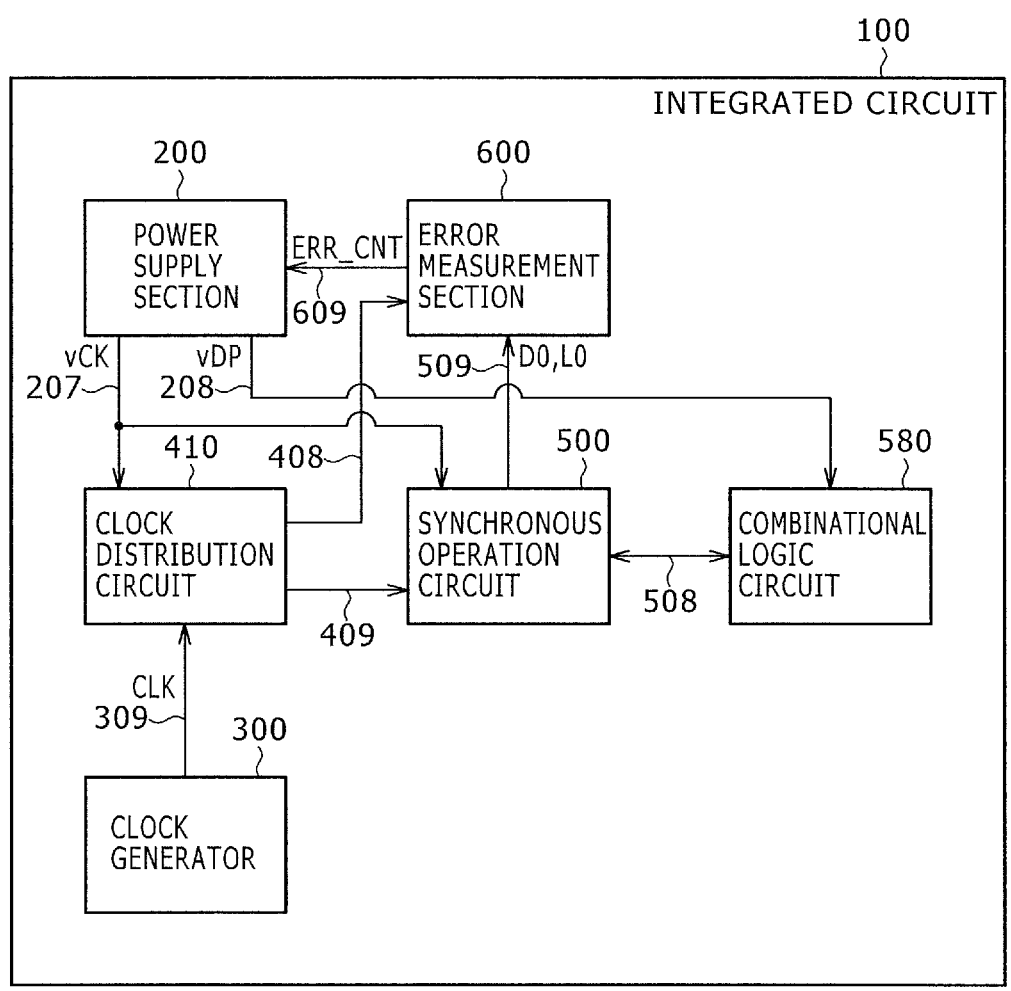
FIG. 40 is a block diagram showing one configuration example of the integrated circuit in a first modification example of the third embodiment.

FIG. 40 is a block diagram showing one configuration example of the integrated circuit 100 in a first modification example of the third embodiment. In the above-described third embodiment, the power supply section 200 supplies the logic circuit drive voltage vDP to the synchronous operation circuit 500. However, another voltage may be supplied to the synchronous operation circuit 500. For example, the power supply section 200 may supply the clock distribution circuit drive voltage vCK to the synchronous operation circuit 500. The power supply section 200 in the first modification example is different from that in the third embodiment in that it supplies the clock distribution circuit drive voltage vCK to the synchronous operation circuit 500 via the signal line 207.

According to the first modification example, the amount of power consumption can be reduced in the configuration in which the clock distribution circuit drive voltage vCK is supplied to the synchronous operation circuit 500.

Second Modification Example

Figure 41:
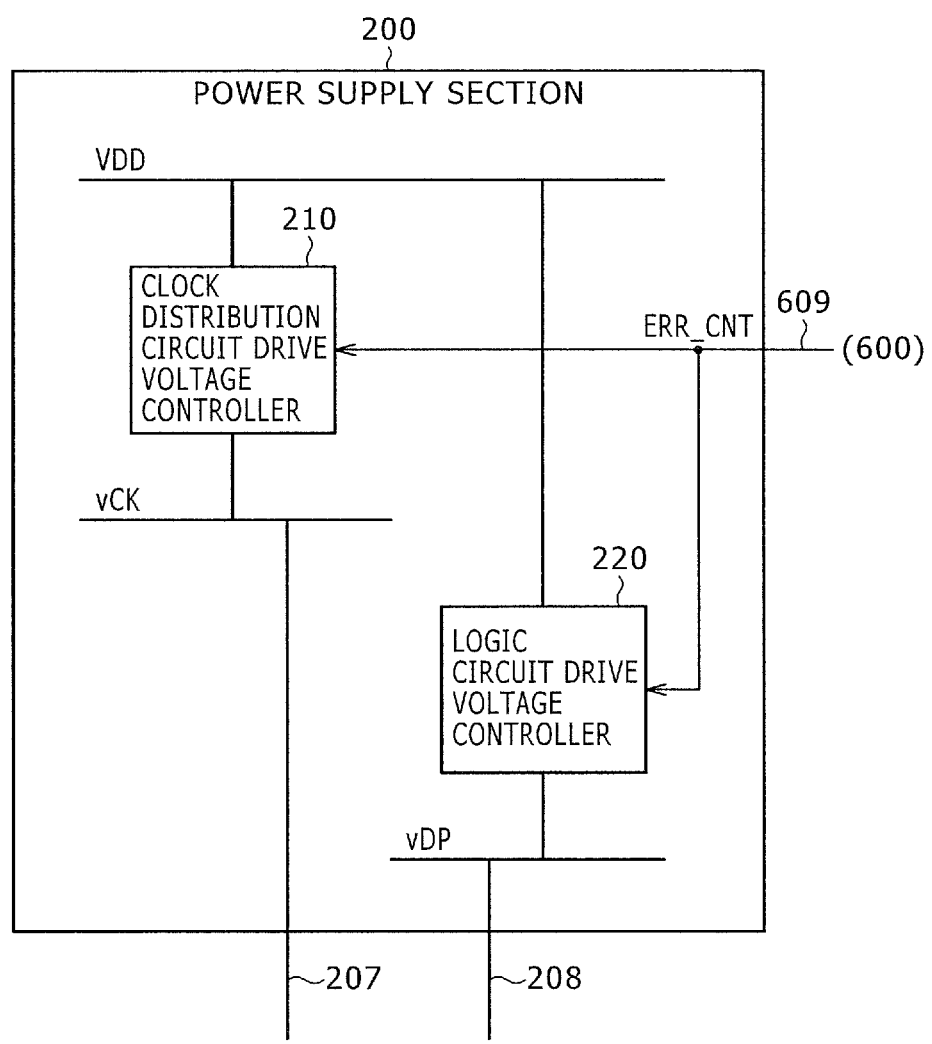
FIG. 41 is a block diagram showing one configuration example of the power supply section in a second modification example of the third embodiment.

FIG. 41 is a block diagram showing one configuration example of the power supply section 200 in a second modification example of the third embodiment. In the above-described third embodiment, the clock distribution circuit drive voltage controller 210 and the logic circuit drive voltage controller 220 are connected in series to the power supply. However, they may be connected in parallel. The power supply section 200 in the second modification example is different from that in the third embodiment in that the clock distribution circuit drive voltage controller 210 and the logic circuit drive voltage controller 220 are connected in parallel to the power supply. In the second modification example, the set value Vsd of the logic circuit drive voltage vDP is set to a value smaller than the set value Vsc of the clock distribution circuit drive voltage vCK.

According to the second modification example, the amount of power consumption can be reduced in the configuration in which the clock distribution circuit drive voltage controller 210 and the logic circuit drive voltage controller 220 are connected in parallel.

Third Modification Example

Figure 42:
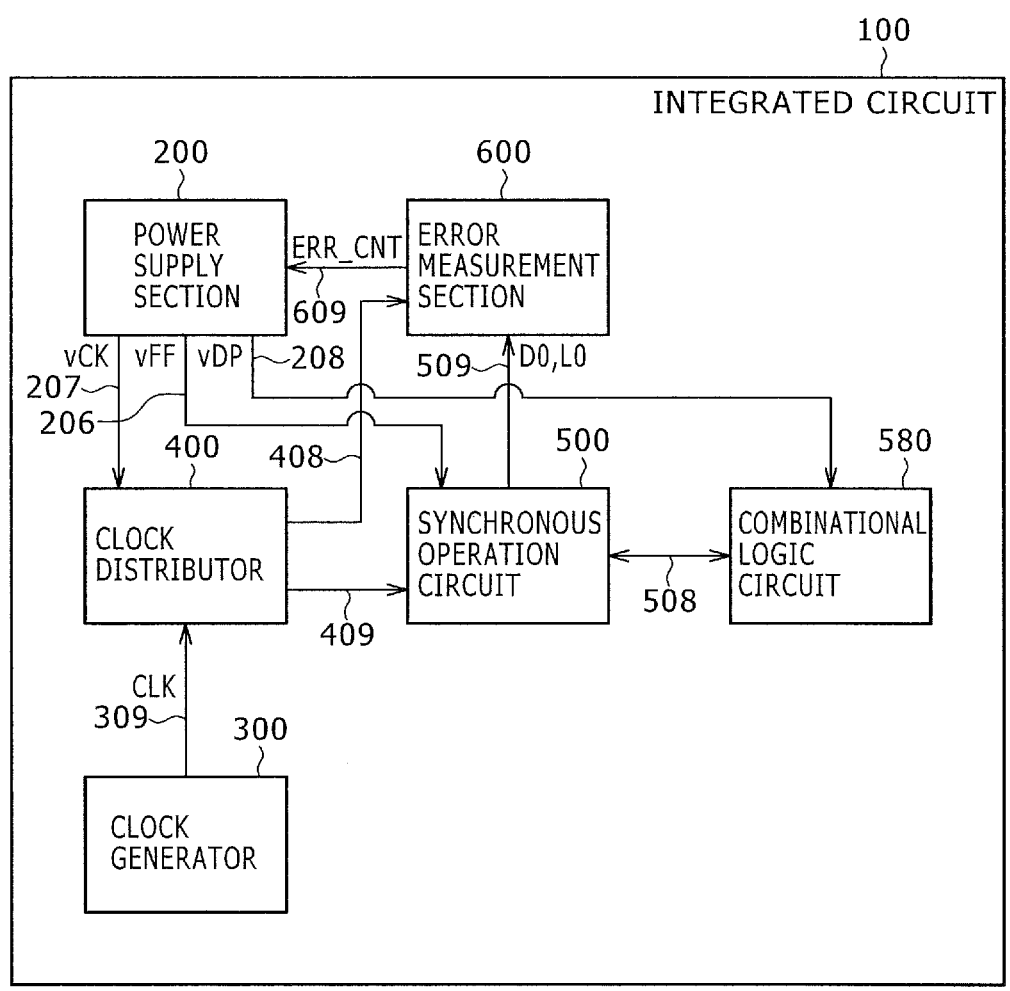
FIG. 42 is a block diagram showing one configuration example of the integrated circuit in a third modification example of the third embodiment.

FIG. 42 is a block diagram showing one configuration example of the integrated circuit 100 in a third modification example of the third embodiment. The power supply section 200 may supply a voltage different from both of the clock distribution circuit drive voltage vCK and the logic circuit drive voltage vDP to the synchronous operation circuit 500. The power supply section 200 in the third modification example is different from that in the third embodiment in that it supplies a synchronous operation circuit drive voltage vFF to the synchronous operation circuit 500 via a signal line 206.

According to the third modification example, the amount of power consumption can be reduced in the configuration in which the synchronous operation circuit drive voltage vFF different from both of vDP and vCK is supplied to the synchronous operation circuit 500.

Fourth Modification Example

Figure 43:
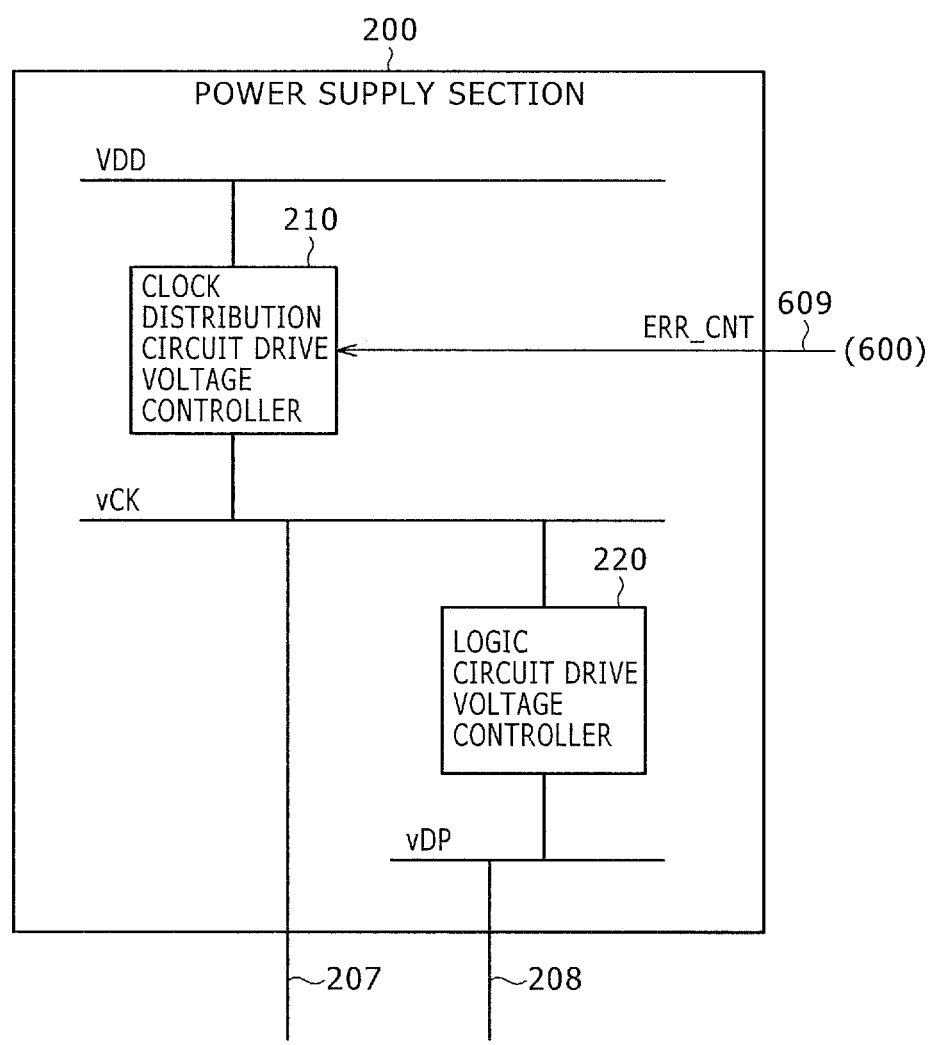
FIG. 43 is a block diagram showing one configuration example of the power supply section in a fourth modification example of the third embodiment.

FIG. 43 is a block diagram showing one configuration example of the power supply section 200 in a fourth modification example of the third embodiment. The power supply section 200 in this fourth modification example is different from that in the third embodiment in that only the clock distribution circuit drive voltage controller 210 performs urgent voltage boost. In the fourth modification example, the count value ERR_CNT of the error is input to only the clock distribution circuit drive voltage controller 210. The clock distribution circuit drive voltage controller 210 performs urgent voltage boost if the count value ERR_CNT is equal to or larger than the threshold Th, whereas the logic circuit drive voltage controller 220 does not perform urgent voltage boost.

According to the fourth modification example, the amount of power consumption in urgent voltage boost is reduced because the logic circuit drive voltage vDP is not urgently boosted.

4. Fourth Embodiment

Configuration Example of Integrated Circuit

Figure 44:
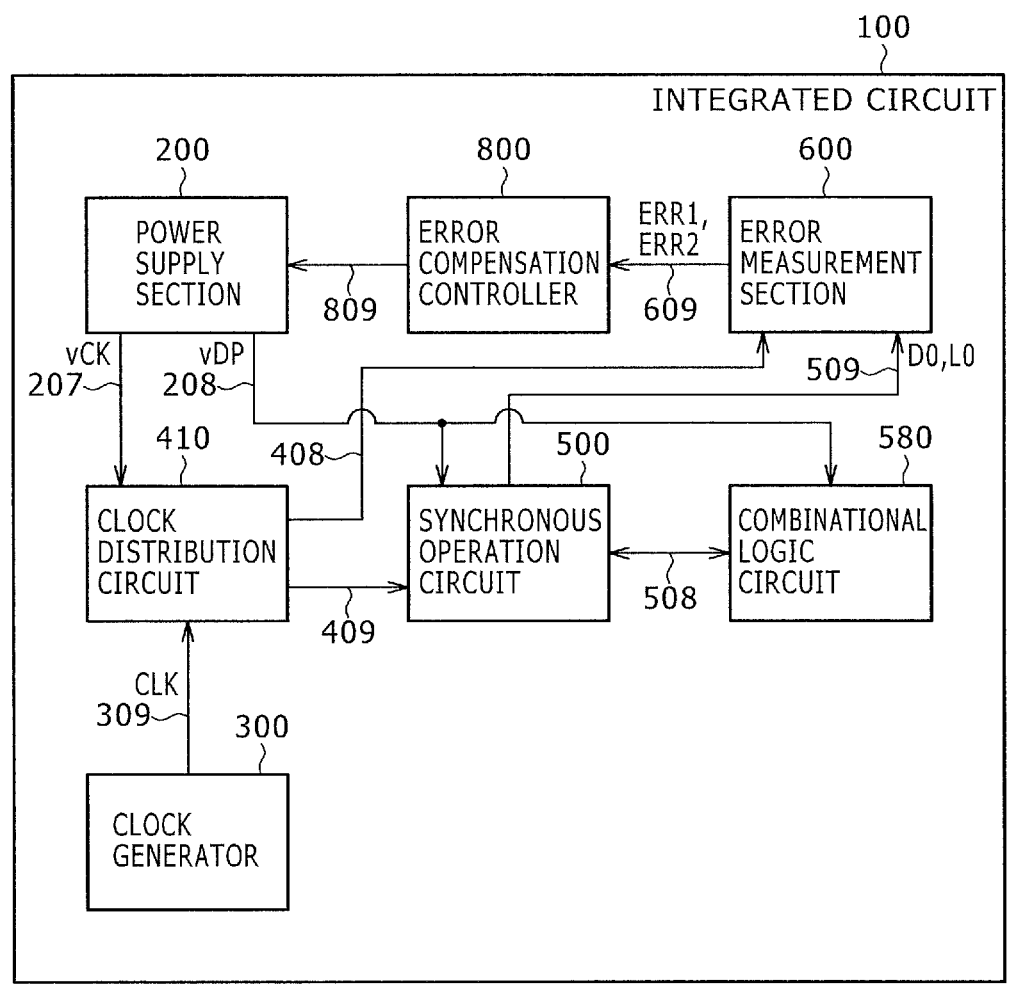
FIG. 44 is a block diagram showing one configuration example of an integrated circuit in a fourth embodiment.

FIG. 44 is a block diagram showing one configuration example of an integrated circuit 100 in a fourth embodiment. The integrated circuit 100 in this fourth embodiment includes a power supply section 200, a clock generator 300, a clock distribution circuit 410, a synchronous operation circuit 500, a combinational logic circuit 580, an error measurement section 600, and an error compensation controller 800.

The power supply section 200 supplies power to the clock distribution circuit 410, the synchronous operation circuit 500, and the combinational logic circuit 580. Specifically, the power supply section 200 supplies a clock distribution circuit drive voltage vCK having a predetermined voltage value to the clock distribution circuit 410 via a signal line 207. Furthermore, the power supply section 200 supplies a logic circuit drive voltage vDP having a predetermined voltage value to the synchronous operation circuit 500 and the combinational logic circuit 580 via a signal line 208.

The power supply section 200 controls the clock distribution circuit drive voltage vCK and the logic circuit drive voltage vDP depending on the analysis result by the error compensation controller 800. The analysis result includes e.g. a setup violation error, a hold violation error, and an alert of the hold violation error. The power supply section 200 urgently boosts the clock distribution circuit drive voltage vCK when the hold violation error is generated, and urgently boosts the clock distribution circuit drive voltage vCK and the logic circuit drive voltage vDP when the setup violation error is generated. Furthermore, the power supply section 200 boosts the clock distribution circuit drive voltage vCK to a voltage value lower than the voltage value in the urgent voltage boost when getting the alert of the hold violation error before the hold violation error is generated.

The clock generator 300 generates a clock signal CLK having a predetermined frequency by using e.g. a PLL. The clock signal CLK is generated as a signal for indicating predetermined timing to the synchronous operation circuit 500 and the error measurement section 600. The clock generator 300 outputs the generated clock signal CLK to the clock distribution circuit 410 via a signal line 309.

The clock distribution circuit 410 distributes the clock signal CLK to each of the circuits in the integrated circuit 100 including the synchronous operation circuit 500. The clock distribution circuit 410 distributes the clock signal CLK to the synchronous operation circuit 500 via a signal line 409 and distributes it to the error measurement section 600 via a signal line 408. The clock signal CLK distributed to the error measurement section 600 is for indicating the timing of count of the number of errors. The clock distribution circuit 410 is one example of the timing signal distribution circuit set forth in the claims.

The synchronous operation circuit 500 is a circuit that operates in synchronization with the clock signal CLK. The combinational logic circuit 580 performs predetermined logical operation based on the operation result of the synchronous operation circuit 500.

The error measurement section 600 generates error flags ERR1 and ERR2 based on a timing error generated in the synchronous operation circuit 500. Details of difference between the error flags ERR1 and ERR2 and a generation method thereof will be described later. The error measurement section 600 outputs the error flags ERR1 and ERR2 to the error compensation controller 800 via a signal line 609.

The error compensation controller 800 analyzes the timing error based on the history of the error flags ERR1 and ERR2. The error compensation controller 800 analyzes e.g. the kind of timing error. The kinds of timing error include the setup violation error, the hold violation error, and the alert of the hold violation error. The analysis method of the timing error will be described later. The error compensation controller 800 outputs the analysis result to the power supply section 200 via a signal line 809 and makes the power supply section 200 compensate for the error.

Figure 45:
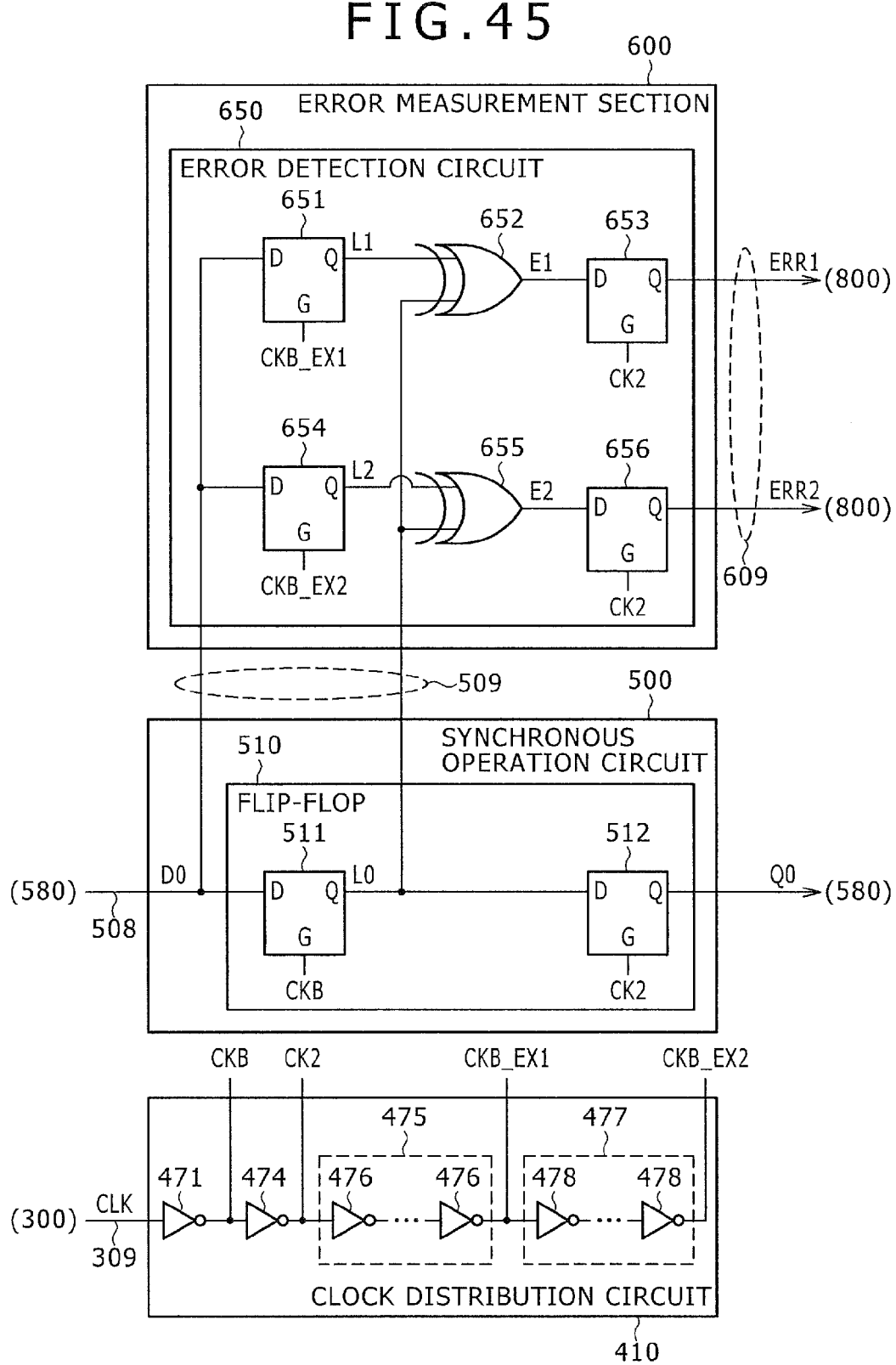
FIG. 45 is a circuit diagram showing one configuration example of an error measurement section, a synchronous operation circuit, and a clock distribution circuit in the fourth embodiment.

FIG. 45 is a circuit diagram showing one configuration example of the error measurement section 600, the synchronous operation circuit 500, and the clock distribution circuit 410 in the fourth embodiment. The error measurement section 600 includes an error detection circuit 650 and the synchronous operation circuit 500 includes a flip-flop 510. The clock distribution circuit 410 includes inverters 471 and 474 and delay sections 475 and 477.

The inverters 471 and 474 invert an input clock signal and output the inverted signal. The inverter 471 inverts the clock signal CLK from the clock generator 300 and outputs the inverted signal as an inverted clock signal CKB to the synchronous operation circuit 500 via the signal line 409. The inverter 474 further inverts the inverted clock signal CKB and outputs the inverted signal as a clock signal CK2 to the synchronous operation circuit 500 via the signal line 409. Furthermore, the inverter 474 outputs the clock signal CK2 to the error detection circuit 650 via the signal line 408.

The delay sections 475 and 477 delay the clock signal. The delay section 475 includes an odd number of inverters 476. The delay section 475 delays the clock signal CK2 by a predetermined time by these inverters 476 and outputs the resulting signal as a delayed clock signal CKB_EX1 to the error detection circuit 650 via the signal line 408. The number of inverters 476 is so decided that the delay time by the delay section 475 is equivalent to the hold time of the flip-flop 510 for example. The delay section 477 includes an even number of inverters 478. The delay section 477 further delays the delayed clock signal CKB_EX1 by these inverters 478 and outputs the resulting signal as a delayed clock signal CKB_EX2 to the error detection circuit 650 via the signal line 408.

The flip-flop 510 holds data of 1 bit in synchronization with the inverted clock signal CKB. The flip-flop 510 includes latches 511 and 512.

The latch 511 holds an input signal in synchronization with the inverted clock signal CKB. The latch 511 has an input terminal D, an output terminal Q, and a gate enable terminal G. An input signal D0 is input to the input terminal and the inverted clock signal CKB is input to the gate enable terminal G. The output terminal Q is connected to the input terminal of the latch 512. When the inverted clock signal CKB is in the on-state, the latch 511 through-outputs the input signal D0 as a latch output signal L0 to the error detection circuit 650 and the latch 512. When the inverted clock signal CKB becomes the off-state, the latch 511 holds the input signal D0 at the falling edge and outputs the held signal as the latch output signal L0 to the error detection circuit 650 and the latch 512.

The configuration of the latches 512, 651, 653, 654, and 656 is the same as that of the latch 511. The latch 512 holds the latch output signal L0 and outputs it as an output signal Q0 when the clock signal CK2 becomes the off-state. The latch 651 holds the input signal D0 and outputs it as a latch output signal L1 to the input terminal of an XOR gate 652 when the delayed clock signal CKB_EX1 becomes the off-state. The latch 653 holds an error signal E1 from the XOR gate 652 and outputs it as the error flag ERR1 to the error compensation controller 800 when the clock signal CK2 becomes the off-state. The latch 654 holds the input signal D0 and outputs it as a latch output signal L2 to the input terminal of an XOR gate 655 when the delayed clock signal CKB_EX2 becomes the off-state. The latch 656 holds an error signal E2 from the XOR gate 655 and outputs it as the error flag ERR2 to the error compensation controller 800 when the clock signal CK2 becomes the off-state.

The XOR gates 652 and 655 generate the exclusive logical sum of input signals. The XOR gate 652 outputs the exclusive logical sum of the latch output signals L1 and L0 from the latches 651 and 511 as the error signal E1 to the latch 653. The XOR gate 655 outputs the exclusive logical sum of the latch output signals L2 and L0 from the latches 654 and 511 as the error signal E2 to the latch 656.

The latch 511 is one example of the master latch set forth in the claims. The latch 651 and the XOR gate 652 are one example of the first error detector set forth in the claims. The latch 654 and the XOR gate 655 are one example of the second error detector set forth in the claims. The latch 651 is one example of the first latch set forth in the claims. The XOR gate 652 is one example of the first logic gate set forth in the claims. The latch 654 is one example of the second latch set forth in the claims. The XOR gate 655 is one example of the second logic gate set forth in the claims.

In the configuration exemplified in FIG. 45, the error signal E1 is output when the input signal D0 changes in the period from the monitoring start timing until the elapse of the setup time and the hold time similarly to the second embodiment.

Next, the latch 511 holds the input signal D0 at the falling edge of the inverted clock signal CKB. Meanwhile, the latch 654 holds the input signal D0 at the falling edge of the delayed clock signal CKB_EX2, which is obtained by further delaying the clock signal CKB_EX1. The XOR gate 655 detects a timing error unless these signals correspond with each other.

Hereinafter, the period from the falling edge of the delayed clock signal CKB_EX1 to the falling edge of the delayed clock signal CKB_EX2 will be referred to as the "error alert period." As described above, the XOR gate 655 outputs the result of comparison between the value of the input signal D0 at the falling edge of the inverted clock signal CKB and the input signal D0 at the falling edge of the delayed clock signal CKB_EX2 (i.e. end point of the error alert period). Therefore, the error signal E2 is output from the XOR gate 655 when the value of the input signal D0 changes in the period from the falling edge of the inverted clock signal CKB until the elapse of the hold time and the error alert period. Furthermore, also when the value of the input signal D0 changes in the period from the monitoring start timing to the falling edge of the inverted clock signal CKB, the value after the change is not held in the latch 511 and the error signal E2 is output.

That is, the error signal E2 is output when the input signal D0 changes in the period from the monitoring start timing until the elapse of the setup time, the hold time, and the error alert period.

If the inverted clock signal CKB rises up after the inverted clock signal CKB falls down and the error signals E1 and E2 are output, the hold of the latch 511 is removed and the input signal D0 and the latch output signal L0 become the same value. However, the latches 653 and 656 at the subsequent stages hold the values of the error signals E1 and E2 before the rising of the inverted clock signal CKB. Thus, the values of the error signals E1 and E2 before the falling are kept even after the inverted clock signal CKB rises up.

Figure 46:
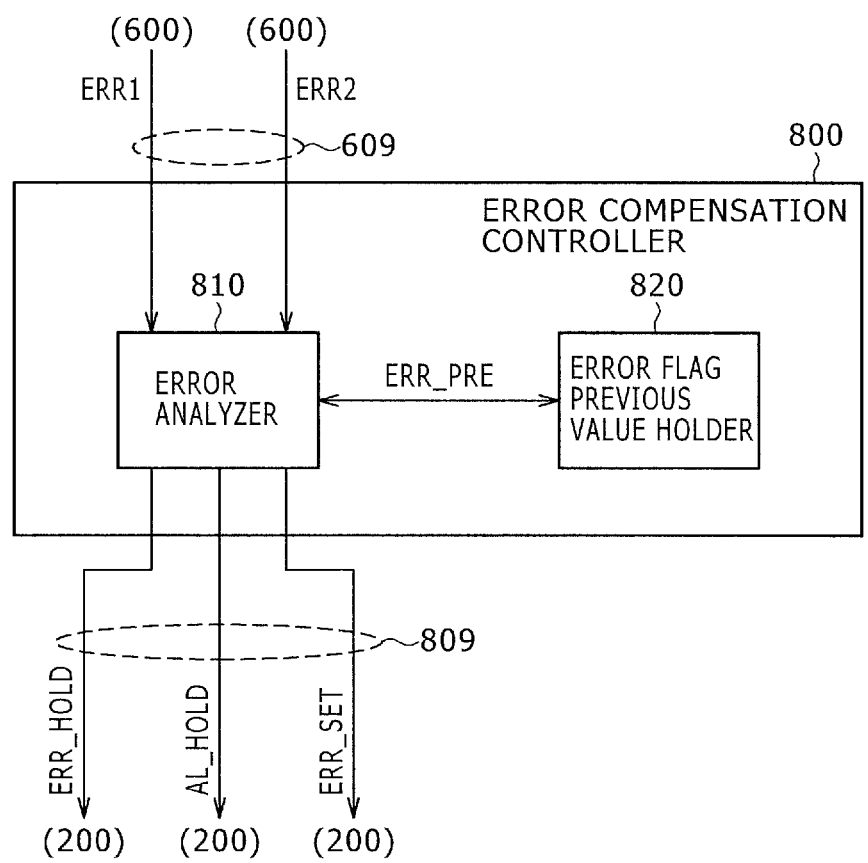
FIG. 46 is a block diagram showing one configuration example of an error compensation controller in the fourth embodiment.

FIG. 46 is a block diagram showing one configuration example of the error compensation controller 800 in the fourth embodiment. The error compensation controller 800 includes an error analyzer 810 and an error flag previous value holder 820.

The error analyzer 810 analyzes the timing error based on the previous value and the present value of the error flags ERR1 and ERR2. Specifically, the error analyzer 810 determines that the timing error is the hold violation error if only the error flag ERR2 is detected at the previous time and both the error flags ERR1 and ERR2 are detected at the present time. Then, the error analyzer 810 outputs a hold violation error flag ERR_HOLD in the on-state to the power supply section 200 and updates the held value of the error flag previous value holder 820.

The error analyzer 810 determines that the timing error is the setup violation error if neither the error flag ERR1 nor ERR2 is detected at the previous time and both the error flags ERR1 and ERR2 are detected at the present time. Then, the error analyzer 810 outputs a setup violation error flag ERR_SET in the on-state to the power supply section 200 and updates the held value of the error flag previous value holder 820.

The error analyzer 810 determines that the input signal D0 has changed in the error alert period if neither the error flag ERR1 nor ERR2 is detected at the previous time and only the error flag ERR2 is detected at the present time. Then, the error analyzer 810 outputs a hold violation alert flag AL_HOLD in the on-state to the power supply section 200 and updates the held value of the error flag previous value holder 820.

The error flag previous value holder 820 holds a previous value ERR_PRE of the error flags ERR1 and ERR2. The error flag previous value holder 820 is one example of the history holder set forth in the claims.

FIG. 47 is a diagram showing one example of the operation of the error analyzer 810 in the fourth embodiment. A consideration will be made about the case in which both the error flags ERR1 and ERR2 are "0." In this case, the error analyzer 810 sets all of the values of the hold violation alert flag AL_HOLD, the hold violation error flag ERR_HOLD, and the setup violation error flag ERR_SET to "0." Furthermore, the error analyzer 810 updates the error flag previous value ERR_PRE to "00."

If the error flag ERR1 is "0" and the error flag ERR2 is "1" and the error flag previous value is "00," the error analyzer 810 sets the hold violation alert flag AL_HOLD to "1." Furthermore, the error analyzer 810 sets both the values of the hold violation error flag ERR_HOLD and the setup violation error flag ERR_SET to "0." In addition, the error analyzer 810 updates the error flag previous value ERR_PRE to "01."

If the error flag ERR1 is "0" and the error flag ERR2 is "1" and the error flag previous value is "01" or "11," the error analyzer 810 sets all of the values of AL_HOLD, ERR_HOLD, and ERR_SET to "0." Furthermore, the error analyzer 810 updates the error flag previous value ERR_PRE to "01."

Because the period in which the error flag ERR1 is detected is included in the period in which the error flag ERR2 is detected, it is not possible that only the error flag ERR1 is "1."

If both the error flags ERR1 and ERR2 are "1" and the error flag previous value is "00," the error analyzer 810 sets the value of the setup violation error flag ERR_SET to "1." Furthermore, the error analyzer 810 sets both the values of the hold violation alert flag AL_HOLD and the hold violation error flag ERR_HOLD to "0." In addition, the error analyzer 810 updates the error flag previous value ERR_PRE to "11."

If both the error flags ERR1 and ERR2 are "1" and the error flag previous value is "01," the error analyzer 810 sets the value of the hold violation error flag ERR_HOLD to "1." Furthermore, the error analyzer 810 sets both the values of the hold violation alert flag AL_HOLD and the setup violation error flag ERR_SET to "0." In addition, the error analyzer 810 updates the error flag previous value ERR_PRE to "11."

A consideration will be made about the case in which the previous value of the error flag is "01" and the present value is "11" in the operation exemplified in FIG. 47. In this case, there is a high possibility that, although the update timing of the input signal D0 is in the error alert period at the previous time, the update timing is outside the error alert period and is in the period in which the error flag ERR1 is detected at the present time. If the magnitude of the difference in the update timing between the previous time and the present time does not drastically change, there is a high possibility that the input signal D0 is updated in a period close to the error alert period, i.e. in the period subsequent to the falling of the inverted clock signal CKB. Therefore, in this case, the error analyzer 810 determines that the hold violation error is generated.

If the previous value of the error flag is "00" and the present value is "11," there is a high possibility that the input signal D0 is updated in a period far from the error alert period, i.e. in the period previous to the falling edge of the inverted clock signal CKB. Therefore, in this case, the error analyzer 810 determines that the setup violation error is generated.

FIG. 48 is a diagram showing one example of the operation of the power supply section 200 in the fourth embodiment. A consideration will be made about the case in which all of the values of the hold violation alert flag AL_HOLD, the hold violation error flag ERR_HOLD, and the setup violation error flag ERR_SET are "0." In this case, the power supply section 200 controls the clock distribution circuit drive voltage vCK to the set value Vsc and controls the logic circuit drive voltage vDP to the set value Vsd. The power supply section 200 may set the set value Vsd of the logic circuit drive voltage vDP lower than the set value Vsc of the clock distribution circuit drive voltage vCK similarly to the third embodiment.

If only the setup violation error flag ERR_SET is "1," the power supply section 200 urgently boosts the clock distribution circuit drive voltage vCK to the set value Vec and urgently boosts the logic circuit drive voltage vDP to the set value Ved.

If only the hold violation error flag ERR_HOLD is "1," the power supply section 200 urgently boosts only the clock distribution circuit drive voltage vCK to the set value Vec.

If only the hold violation alert flag AL_HOLD is "1," the power supply section 200 boosts the clock distribution circuit drive voltage vCK to a set value Vac lower than Vec.

Figure 49:
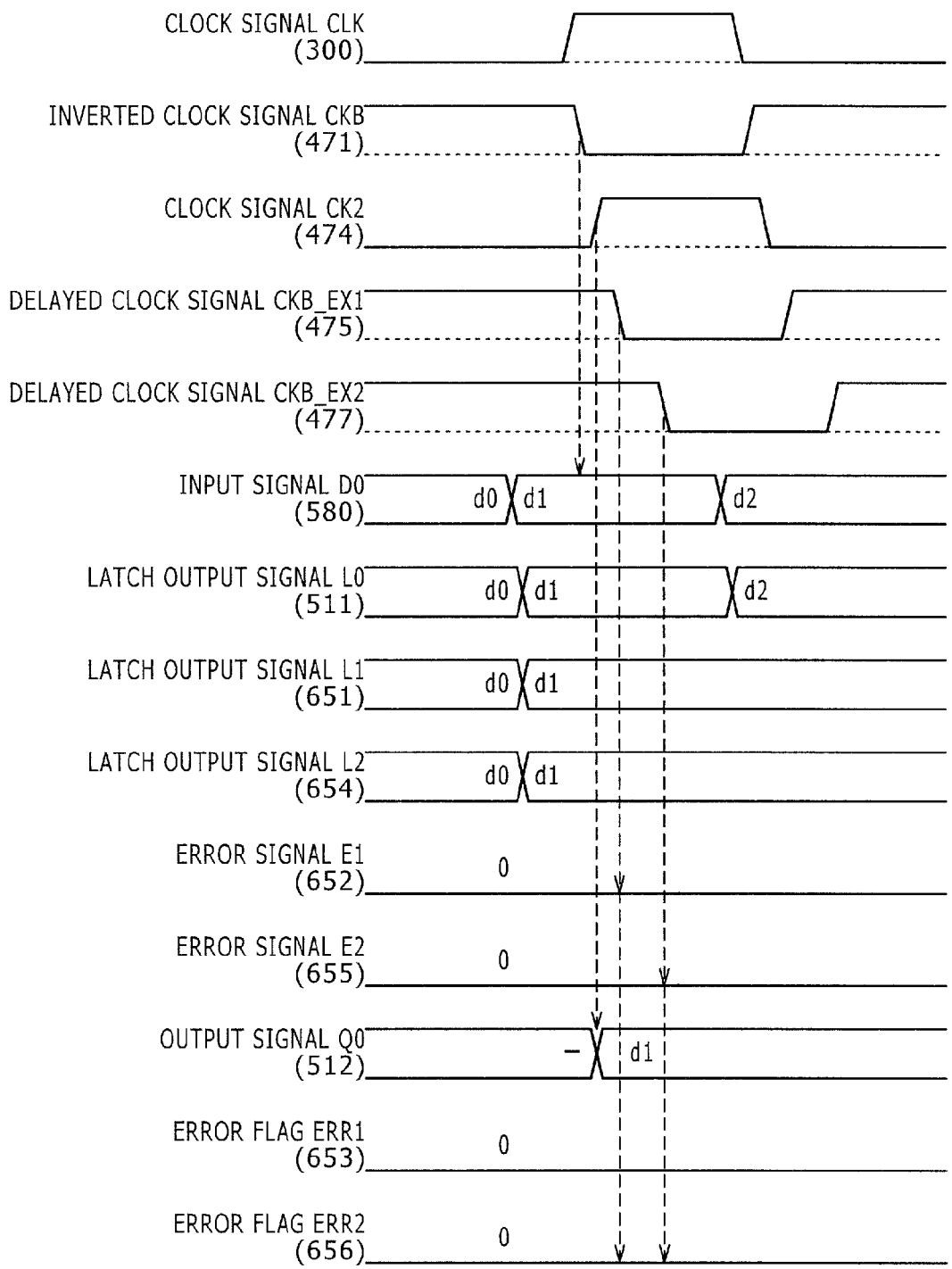
FIG. 49 is a timing chart showing one example of the operation of an error detection circuit when both error flags ERR1 and ERR2 are "0" in the fourth embodiment.

FIG. 49 is a timing chart showing one example of the operation of the error detection circuit 650 when both the error flags ERR1 and ERR2 are "0" in the fourth embodiment. Suppose that, in this example, the value of the input signal D0 does not change in the period from the monitoring start timing until the elapse of the setup time, the hold time, and the error alert period.

When a falling edge is generated in the inverted clock signal CKB in response to the rising of the clock signal CLK, the former-stage latch 511 holds the input signal D0 having a value of "d1" and outputs it as the latch output signal L0 at this timing.

When a rising edge is generated in the clock signal CK2 in response to the falling of the inverted clock signal CKB, the latter-stage latch 512 through-outputs the latch output signal L0 from the previous stage as the output signal Q0.

Then, when a falling edge is generated in the delayed clock signal CKB_EX1 behind the falling of the inverted clock signal CKB, the latch 651 holds the input signal D0 having a value of "d1" and outputs it as the latch output signal L1 at this timing. The XOR gate 652 outputs the error signal E1 having a value of "0" because both the values of the latch output signals L0 and L1 are "d1." The latch 653 holds the error signal E1 and outputs it as the error flag ERR1.

When a falling edge is generated in the delayed clock signal CKB_EX2 further behind the falling of the delayed clock signal CKB_EX1, the latch 654 holds the input signal D0 having a value of "d1" and outputs it as the latch output signal L2 at this timing. The XOR gate 655 outputs the error signal E2 having a value of "0" because both the values of the latch output signals L0 and L2 are "d1." The latch 656 holds the error signal E2 and outputs it as the error flag ERR2.

In this manner, both the error flags ERR1 and ERR2 are "0" if the value of the input signal D0 does not change in the period from the monitoring start timing until the elapse of the setup time, the hold time, and the error alert period.

Figure 50:
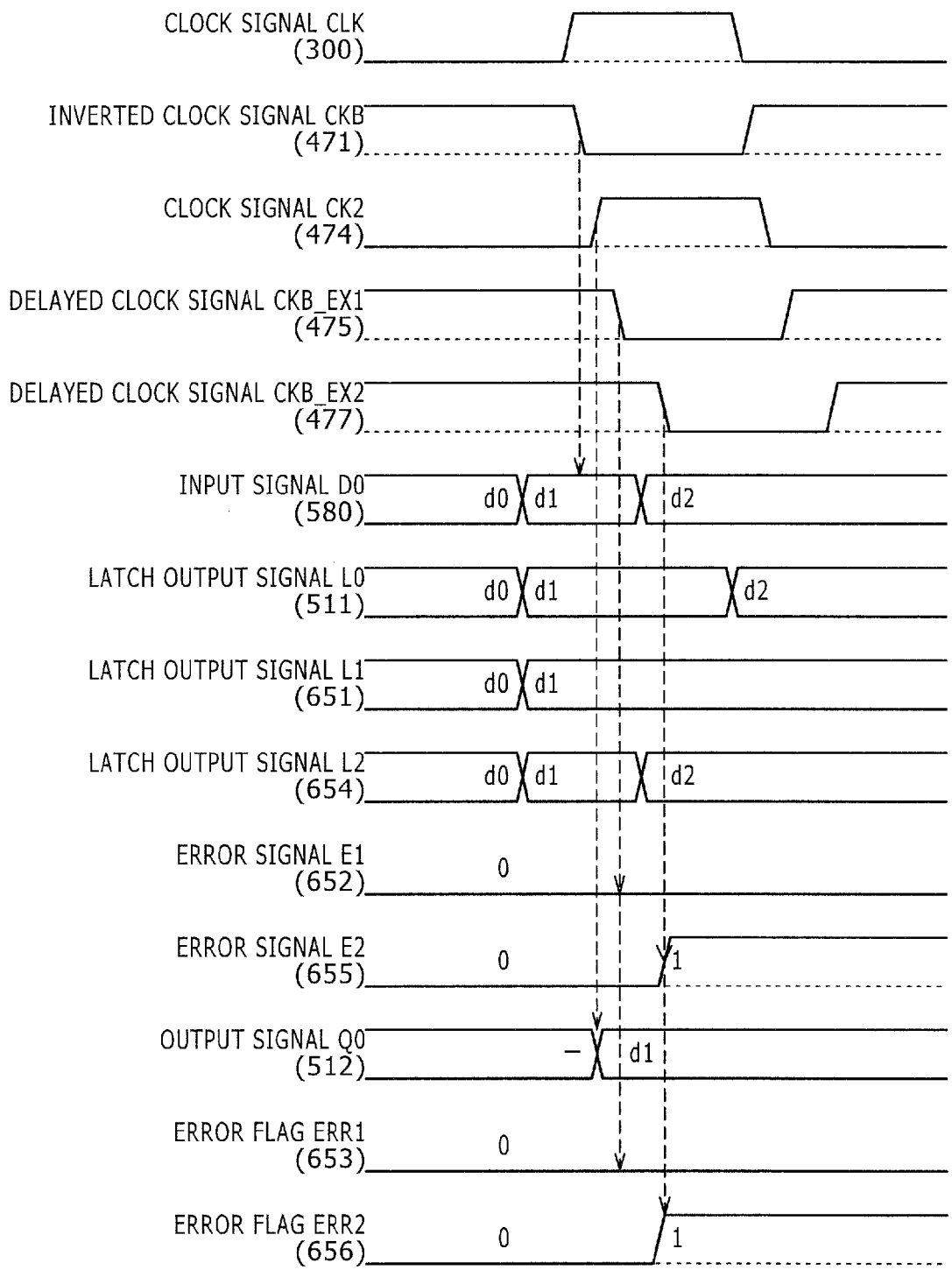
FIG. 50 is a timing chart showing one example of the operation of the error detection circuit when only the error flag ERR2 becomes "1" in the fourth embodiment.

FIG. 50 is a timing chart showing one example of the operation of the error detection circuit 650 when only the error flag ERR2 becomes "1" in the fourth embodiment. Suppose that, in this example, the value of the input signal D0 changes from "d1" to "d2" in the error alert period. The error alert period is the period from the falling edge of the delayed clock signal CKB_EX1 to the falling edge of the delayed clock signal CKB_EX2.

When a falling edge is generated in the inverted clock signal CKB in response to the rising of the clock signal CLK, the former-stage latch 511 holds the input signal D0 having a value of "d1" and outputs it as the latch output signal L0 at this timing.

Then, when a falling edge is generated in the delayed clock signal CKB_EX1 behind the falling of the inverted clock signal CKB, the latch 651 holds the input signal D0 having a value of "d1" and outputs it as the latch output signal L1 at this timing. The XOR gate 652 outputs the error signal E1 having a value of "0" because both the values of the latch output signals L0 and L1 are "d1." The latch 653 holds the error signal E1 and outputs it as the error flag ERR1.

When a falling edge is generated in the delayed clock signal CKB_EX2 further behind the delayed clock signal CKB_EX1, the latch 654 holds the input signal D0 having a value of "d2" and outputs the latch output signal L2 at this timing. The XOR gate 655 outputs the error signal E2 having a value of "1" because the value of the latch output signal L0 is "d1" and the value of the latch output signal L2 is "d2." The latch 656 holds the error signal E2 and outputs it as the error flag ERR2.

In this manner, only the error flag ERR2 becomes "1" if the value of the input signal D0 changes in the error alert period.

Figure 51:
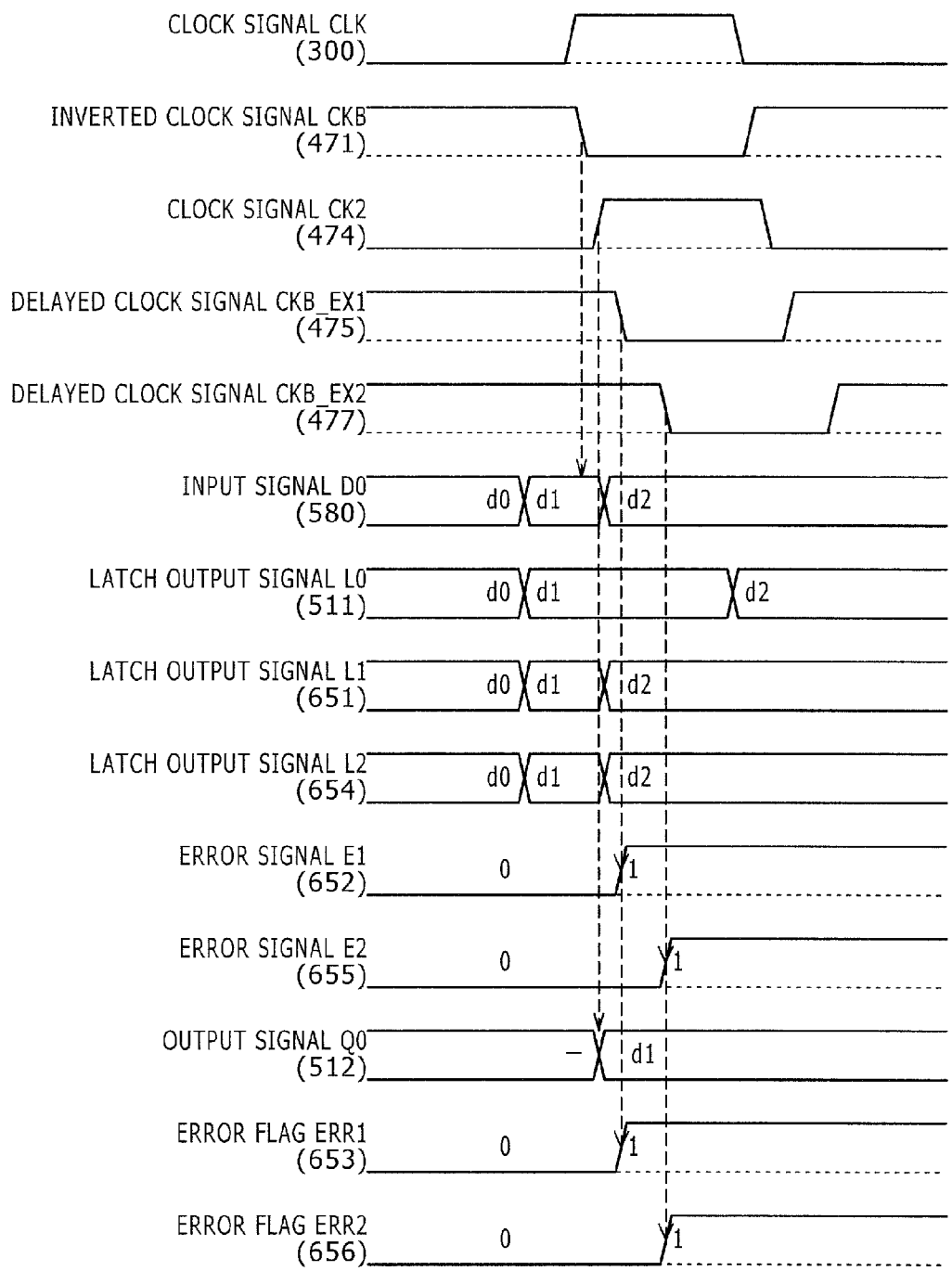
FIG. 51 is a timing chart showing one example of the operation of the error detection circuit when both the error flags ERR1 and ERR2 become "1" in the fourth embodiment.

FIG. 51 is a timing chart showing one example of the operation of the error detection circuit 650 when both the error flags ERR1 and ERR2 become "1" in the fourth embodiment. Suppose that, in this example, the value of the input signal D0 changes from "d1" to "d2" in the period from the monitoring start timing until the elapse of the setup time and the hold time. The timing when a falling edge is generated in the delayed clock signal CKB_EX1 is the timing of the elapse of the hold time.

When a falling edge is generated in the inverted clock signal CKB in response to the rising of the clock signal CLK, the former-stage latch 511 holds the input signal D0 having a value of "d1" and outputs it as the latch output signal L0 at this timing.

Then, when a falling edge is generated in the delayed clock signal CKB_EX1 behind the falling of the inverted clock signal CKB, the latch 651 holds the input signal D0 having a value of "d2" and outputs it as the latch output signal L1 at this timing. The XOR gate 652 outputs the error signal E1 having a value of "1" because the latch output signal L0 is "d1" and the value of the latch output signal L1 is "d2." The latch 653 holds the error signal E1 and outputs it as the error flag ERR1.

When a falling edge is generated in the delayed clock signal CKB_EX2 further behind the delayed clock signal CKB_EX1, the latch 654 holds the input signal D0 having a value of "d2" and outputs it as the latch output signal L2 at this timing. The XOR gate 655 outputs the error signal E2 having a value of "1" because the value of the latch output signal L0 is "d1" and the value of the latch output signal L2 is "d2." The latch 656 holds the error signal E2 and outputs it as the error flag ERR2.

In this manner, both the error flags ERR1 and ERR2 become "1" if the value of the input signal D0 changes in the period from the monitoring start timing until the elapse of the setup time and the hold time.

Figure 52:
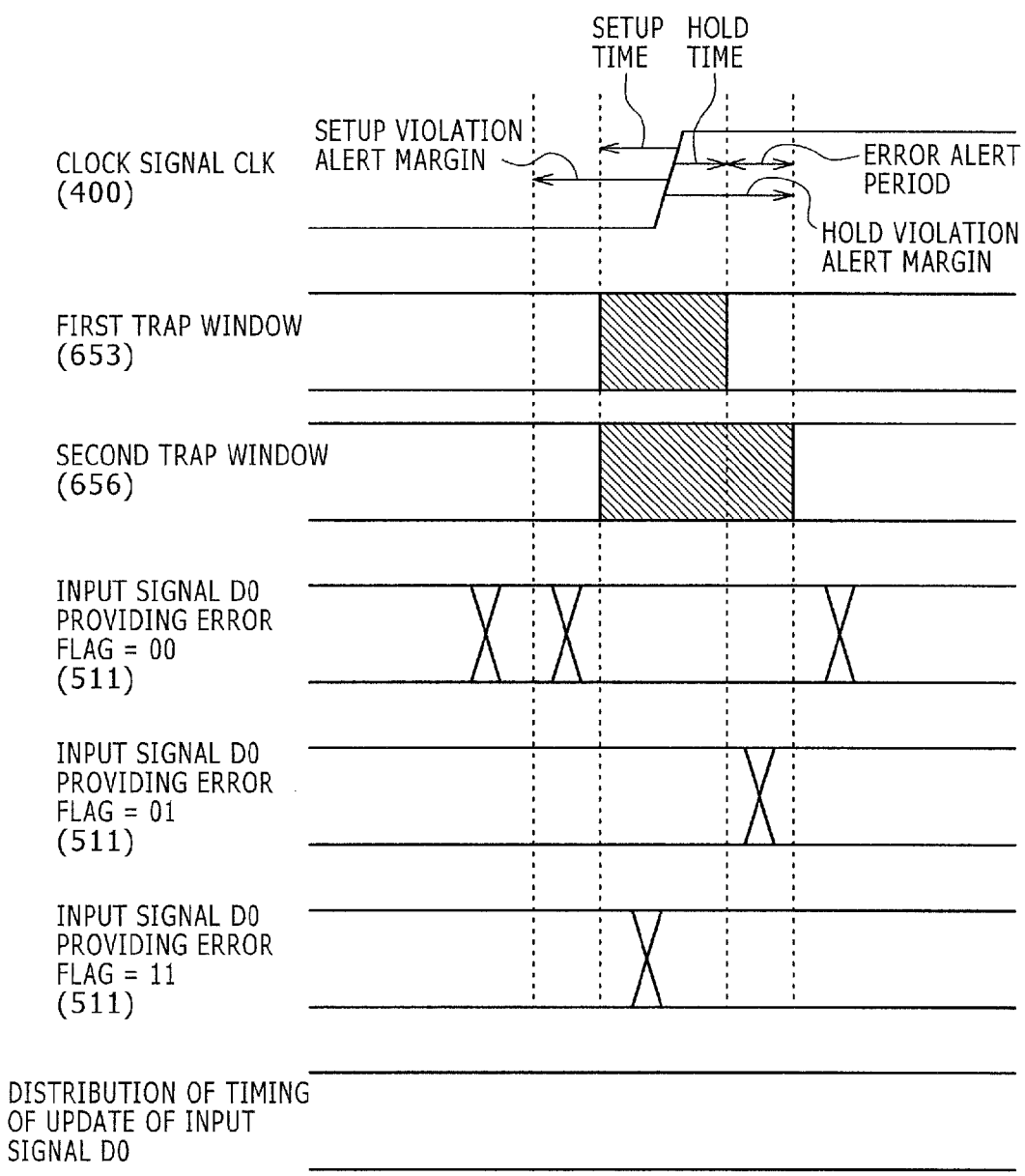
FIG. 52 is a diagram showing one example of trap windows of the error detection circuit and the update timing of data in the fourth embodiment.

FIG. 52 is a diagram showing one example of trap windows of the error detection circuit 650 and the update timing of data in the fourth embodiment. The trap window refers to the period in which the error detection circuit 650 detects the timing error.

A first trap window is the period in which the latch 653 detects the error flag ERR1. This period includes the setup time and the hold time, with the boundary therebetween at the rising edge of the clock signal CLK.

A second trap window is the period in which the latch 656 detects the error flag ERR2. This period includes the setup time and the hold violation alert margin, with the boundary therebetween at the rising edge of the clock signal CLK. The hold violation alert margin is the period obtained by adding the error alert period to the hold time.

If the input signal D0 is updated outside the range of this second trap window, both the error flags ERR1 and ERR2 are "0." If the input signal D0 is updated in the error alert period, the update timing thereof is in the second trap window but is not included in the first trap window. Thus, only the error flag ERR2 becomes "1." If the input signal D0 is updated in the first trap window, both the error flags ERR1 and ERR2 become "1."

As above, according to the fourth embodiment, the timing error (ERR1) is detected by the error detection circuit 650 if the input signal D0 changes in the first trap window. Furthermore, the timing error (ERR2) is detected by the error detection circuit 650 if the input signal D0 changes in the second trap window. The error analyzer 810 determines whether the input signal D0 has changed before or after the falling edge of the inverted clock signal CKB based on the history of these timing errors. This enables the integrated circuit 100 to identify the kind of timing error.

The integrated circuit 100 boosts the voltage when the setup violation error is detected. In addition, frequency control may be carried out. For example, the error detection circuit 650 outputs the setup violation error flag ERR_SET to not the power supply section 200 but the clock generator 300. When the setup violation error flag ERR_SET is "1," the clock generator 300 sets the frequency of the clock signal CLK lower than that when this flag is "0." On the other hand, when the hold violation error is detected, the clock generator 300 does not control the frequency and the power supply section 200 boosts the voltage. This is because the incidence rate of the hold violation error is not reduced although the frequency is lowered. In this case, the clock generator 300 is one example of the frequency controller set forth in the claims. Because the frequency can be changed earlier than the voltage, the integrated circuit 100 can rapidly compensate for the error by frequency control.

In the case of carrying out the above-described frequency control, the integrated circuit 100 may boost the logic circuit drive voltage vDP in addition to the clock distribution circuit drive voltage vCK when the hold violation error is detected.

The integrated circuit 100 may include the clock distributor 400 of the first embodiment instead of the clock distribution circuit 410 and distribute the minimally-delayed clock signal mCLK to the synchronous operation circuit 500. This further reduces clock skew. Similarly, the integrated circuit 100 may include the clock distribution circuit controller 700 and the clock distributor 400 of the second embodiment instead of the clock distribution circuit 410 and distribute the minimally-delayed clock signal mCLK to the synchronous operation circuit 500.

First Modification Example

Figure 53:
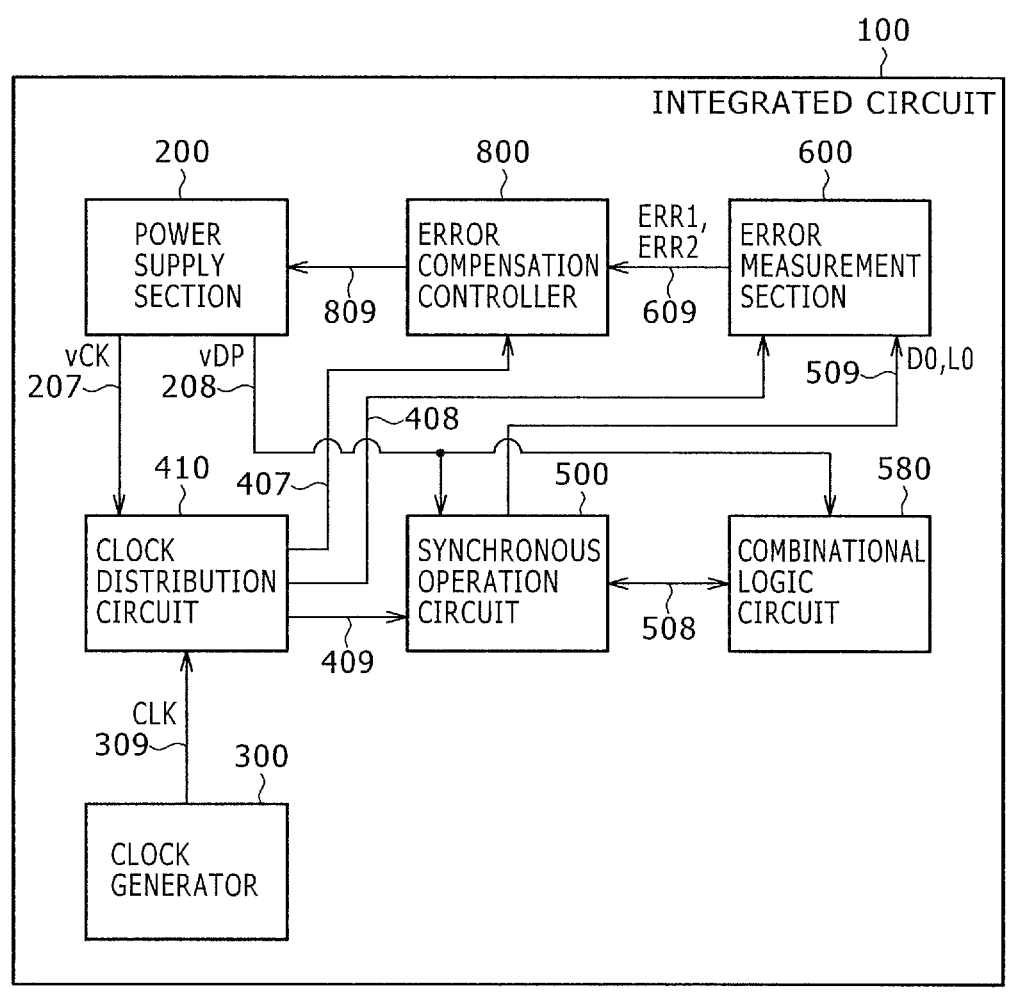
FIG. 53 is a block diagram showing one configuration example of the integrated circuit in a first modification example of the fourth embodiment.

FIG. 53 is a block diagram showing one configuration example of the integrated circuit 100 in a first modification example of the fourth embodiment. The clock distribution circuit 410 in this first modification example is different from that in the fourth embodiment in that the clock signal CLK is further distributed to the error compensation controller 800 via a signal line 407. The clock signal CLK distributed to the error compensation controller 800 is for indicating the timing of count of the number of errors.

Figure 54:
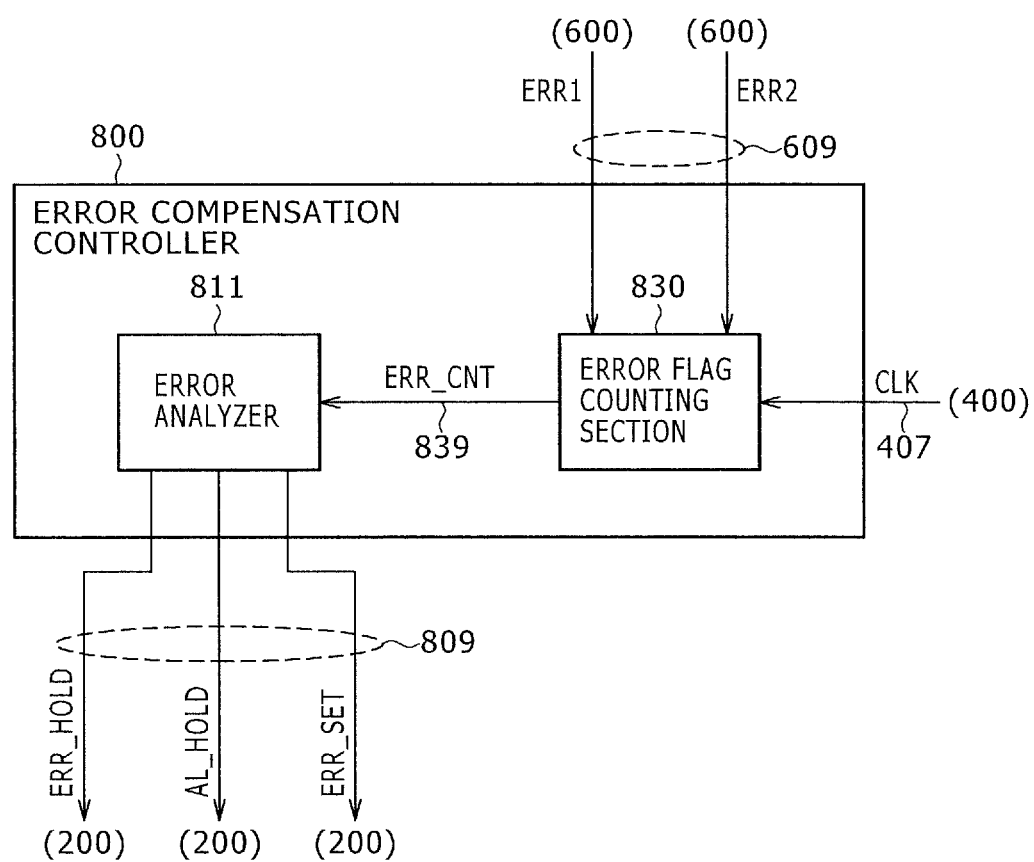
FIG. 54 is a block diagram showing one configuration example of the error compensation controller in the first modification example of the fourth embodiment.

FIG. 54 is a block diagram showing one example of the error compensation controller 800 in the first modification example of the fourth embodiment. The error compensation controller 800 of the first modification example includes an error analyzer 811 and an error flag counting section 830.

The error flag counting section 830 calculates ERR01_CNT and ERR11_CNT. ERR01_CNT is the number of times of the occurrence of the situation in which only the error flag ERR2 becomes "1" in a predetermined measurement cycle. ERR11_CNT is the number of times of the occurrence of the situation in which both the error flags ERR1 and ERR2 become "1" in the measurement cycle. The error flag counting section 830 outputs these count values to the error analyzer 811 via a signal line 839. The error flag counting section 830 is one example of the history holder set forth in the claims.

The error analyzer 811 analyzes the error based on the count values ERR01_CNT and ERR11_CNT. Specifically, the error analyzer 811 sets the hold violation alert flag AL_HOLD to the on-state if ERR11_CNT is smaller than a threshold (e.g. "1") and ERR01_CNT is larger than ERR11_CNT.

The error analyzer 811 sets the hold violation error flag ERR_HOLD to the on-state if ERR01_CNT is equal to or larger than the threshold and ERR01_CNT is larger than ERR11_CNT. The error analyzer 811 sets the setup violation error flag ERR_SET to the on-state if ERR01_CNT is equal to or smaller than ERR11_CNT.

Figure 55:
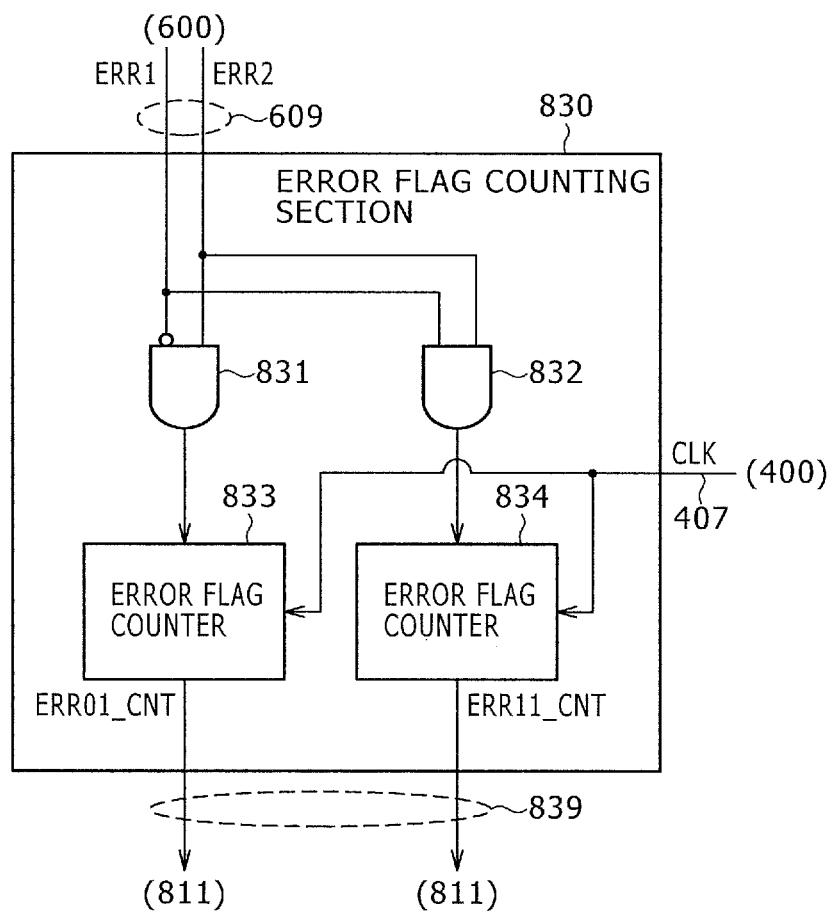
FIG. 55 is a block diagram showing one configuration example of an error flag counting section in the first modification example of the fourth embodiment.

FIG. 55 is a block diagram showing one configuration example of the error flag counting section 830 in the first modification example of the fourth embodiment. The error flag counting section 830 includes AND gates 831 and 832 and error flag counters 833 and 834.

The AND gates 831 and 832 generate the logical product of input values. The AND gate 831 outputs the logical product of the value obtained by inverting the error flag ERR1 and the error flag ERR2 to the error flag counter 833. The AND gate 832 outputs the logical product of the error flag ERR1 and the error flag ERR2 to the error flag counter 834.

The error flag counter 833 counts the number of times of the occurrence of the situation in which only the value of the error flag ERR2 becomes "1" in a predetermined measurement period. Specifically, the error flag counter 833 increments the count value if the output value of the AND gate 831 is "1" at timing indicated by the clock signal CLK (e.g. rising edge). The error flag counter 833 outputs the count value as ERR01_CNT to the error analyzer 811. Then, it initializes the count value to "0" when a certain clock cycle elapses.

The error flag counter 834 counts the number of times of the occurrence of the situation in which both the values of the error flag ERR1 and the error flag ERR2 become "1" in the predetermined measurement period. The configuration of the error flag counter 834 is the same as that of the error flag counter 833 except for that it monitors the output value of the AND gate 832. The error flag counter 834 outputs the count value as ERR11_CNT to the error analyzer 811.

FIG. 56 is a diagram showing one example of the operation of the error analyzer 811 in the first modification example of the fourth embodiment. A consideration will be made about the case in which ERR01_CNT=0 and ERR11_CNT=0. In this case, the error analyzer 811 sets all of the values of the hold violation alert flag AL_HOLD, the hold violation error flag ERR_HOLD, and the setup violation error flag ERR_SET to "0."

If ERR01_CNT>0 and ERR11_CNT=0, the error analyzer 811 sets the value of the hold violation alert flag AL_HOLD to "1." Furthermore, the error analyzer 811 sets both the values of the hold violation error flag ERR_HOLD and the setup violation error flag ERR_SET to "0."

If ERR01_CNT>ERR11_CNT and ERR11_CNT>0, the error analyzer 811 sets the value of the hold violation error flag ERR_HOLD to "1." Furthermore, the error analyzer 811 sets both the values of the hold violation alert flag AL_HOLD and the setup violation error flag ERR_SET to "0."

A consideration will be made about the case in which ERR11_CNT≥ERR01_CNT and ERR01_CNT>0 or the case in which ERR11_CNT>0 and ERR01_CNT=0. In this case, the error analyzer 811 sets the value of the setup violation error flag ERR_SET to "1." Furthermore, the error analyzer 811 sets both the values of the hold violation alert flag AL_HOLD and the hold violation error flag ERR_HOLD to "0."

The error analyzer 811 may detect the hold violation error when ERR01_CNT≥ERR11_CNT and ERR11_CNT>0. In this case, the error analyzer 811 detects the setup violation error when ERR11_CNT>ERR01_CNT and ERR11_CNT>0.

FIG. 57 is a diagram showing one example of trap windows of the error detection circuit 650 and the update timing of data in the first modification example of the fourth embodiment. Distributions Ds1 to Ds4 are one example of the distribution of the update timing of the input signal D0.

The distribution Ds1 is distribution none of which is included in the first trap window but part of which is included in the error alert period. In the case of this distribution Ds1, ERR01_CNT>0 and ERR11_CNT=0 are satisfied and the hold violation alert flag AL_HOLD is set to "1."

The distribution Ds2 is distribution whose peak is included in the error alert period and part of which is included in the first trap window. In the case of this distribution Ds2, ERR01_CNT>ERR11_CNT and ERR11_CNT>0 are satisfied and the hold violation error flag ERR_HOLD is set to "1."

The distribution Ds3 is distribution whose peak is included in the setup time in the first trap window. In the case of this distribution Ds3, ERR11_CNT≥ERR01_CNT and ERR01_CNT>0 are satisfied and the setup violation error flag ERR_SET is set to "1."

The distribution Ds4 is distribution whose peak is located outside the first trap window and the second trap window and part of which is included in the first trap window. In the case of this distribution Ds4, ERR11_CNT>0 and ERR01_CNT=0 are satisfied and the setup violation error flag ERR_SET is set to "1."

As above, according to the first modification example, the error analyzer 811 identifies the kind of timing error based on ERR01_CNT and ERR11_CNT. Because the error is analyzed from the statistics of the error flag, the error analyzer 811 can analyze the error more accurately compared with the fourth embodiment, in which the error is analyzed from the previous value and the present value of the error flag.

Second Modification Example

Figure 58:
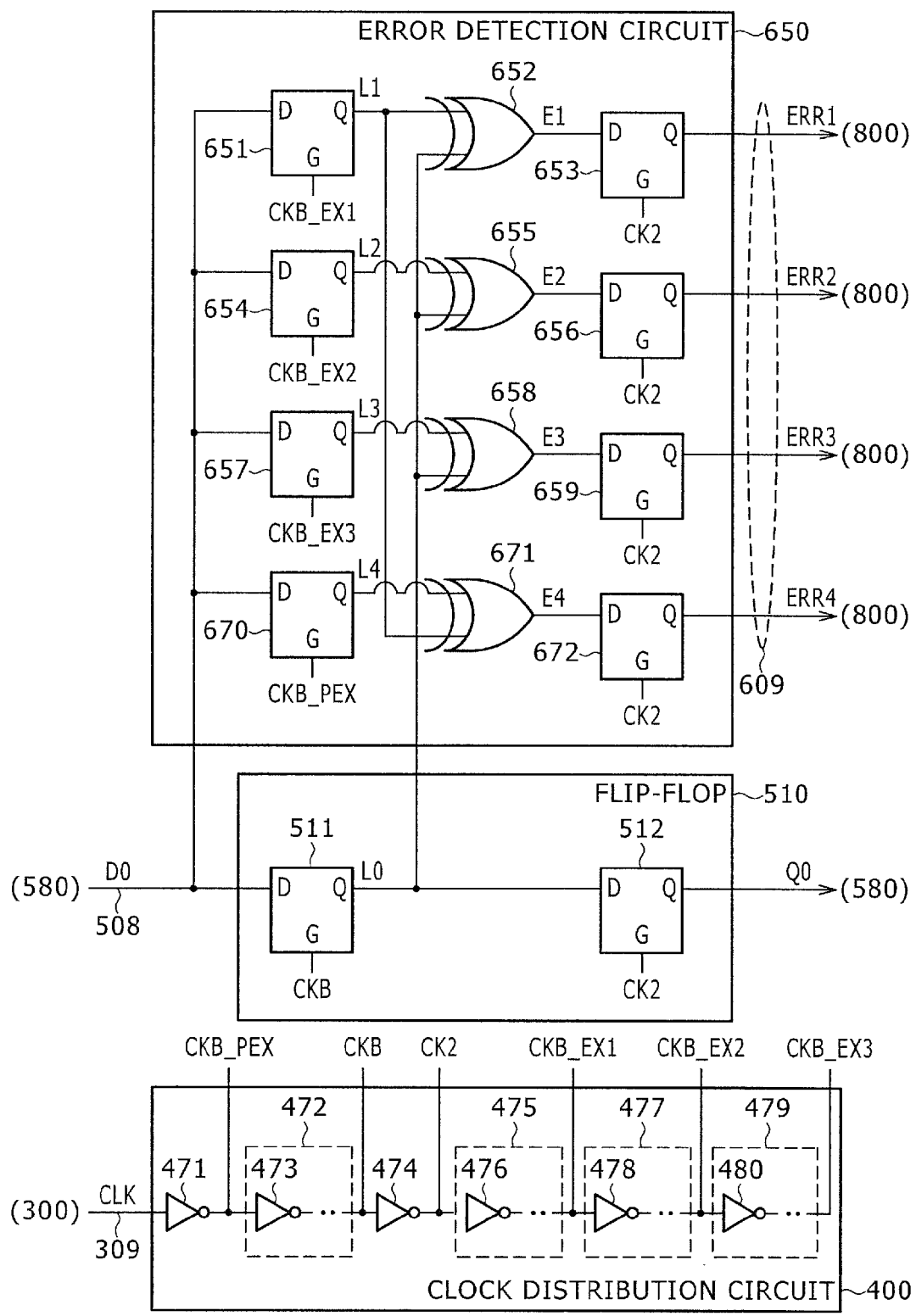
FIG. 58 is a circuit diagram showing one configuration example of the error detection circuit, a flip-flop, and the clock distribution circuit in a second modification example of the fourth embodiment.

FIG. 58 is a circuit diagram showing one configuration example of the error detection circuit 650, the flip-flop 510, and the clock distribution circuit 410 in a second modification example of the fourth embodiment. The clock distribution circuit 410 in this second modification example is different from that in the fourth embodiment in that it further includes delay sections 472 and 479. Furthermore, in the second modification example, a clock signal CKB_PEX is output from the inverter 471 to the error detection circuit 650 and the delay section 472.

The delay section 472 delays the clock signal CKB_PEX. The delay section 472 includes an even number of inverters 473 and delays the clock signal CKB_PEX by these inverters 473 to output the delayed signal as the clock signal CKB to the flip-flop 510 and the inverter 474. The number of inverters 473 is so decided that the delay time by the delay section 472 is longer than the setup time of the flip-flop 510 for example. As a result, a falling edge is generated in the clock signal CKB_PEX at the timing preceding the falling edge of the clock signal CKB by the delay time of the delay section 472.

The delay section 479 further delays the delayed clock signal CKB_EX2. The delay section 479 includes an even number of inverters 480. The delay section 479 delays the delayed clock signal CKB_EX2 by these inverters 480 and outputs the resulting signal as a delayed clock signal CKB_EX3 to the error detection circuit 650.

The error detection circuit 650 in the second modification example is different from that in the fourth embodiment in that it further includes latches 657, 659, 670, and 672 and XOR gates 658 and 671.

The configuration of the latches 657, 659, 670, and 672 is the same as that of the latch 511. The latch 657 holds the input signal D0 and outputs it as a latch output signal L3 when the delayed clock signal CKB_EX3 becomes the off-state. The latch 659 holds an error signal from the XOR gate 658 and outputs it as an error flag ERR3 to the error compensation controller 800 when the clock signal CK2 becomes the off-state. The latch 670 holds the input signal D0 and outputs it as a latch output signal L4 when the clock signal CKB_PEX becomes the off-state. The latch 672 holds an error signal from the XOR gate 671 and outputs it as an error flag ERR4 to the error compensation controller 800 when the clock signal CK2 becomes the off-state.

The XOR gates 658 and 671 output the exclusive logical sum of input signals. The XOR gate 658 outputs the exclusive logical sum of the latch output signals L3 and L0 from the latches 657 and 511 as the error signal E3 to the latch 659. The XOR gate 671 outputs the exclusive logical sum of the latch output signals L1 and L4 from the latches 651 and 670 as the error signal E4 to the latch 672.

According to the above-described configuration, the error signal E3 is detected if the input signal D0 changes in the period obtained by adding the delay time of the delay section 479 after the second trap window.

Furthermore, the error signal E4 is detected if the timing preceding the monitoring start timing by the delay time of the delay section 472 is regarded as the start point and the input signal D0 changes in the period from this start point until the elapse of the first trap window.

Figure 59:
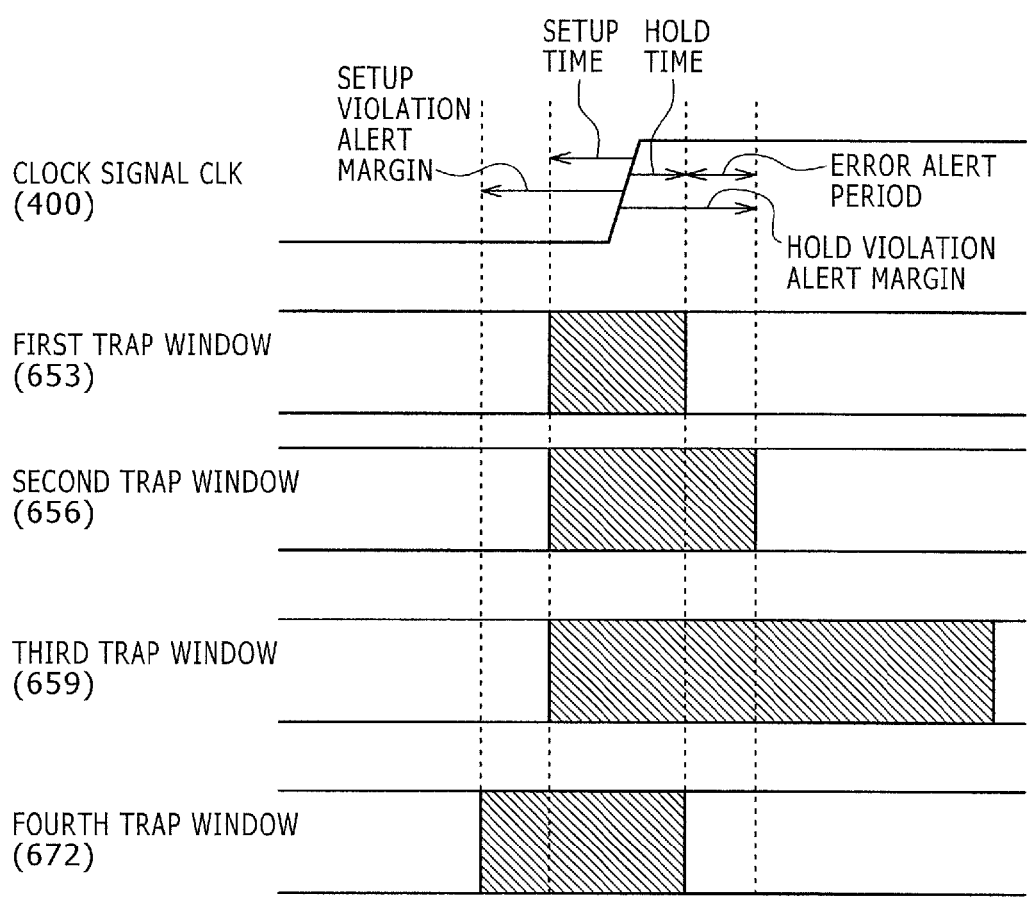
FIG. 59 is a diagram showing one example of trap windows of the error detection circuit in the second modification example of the fourth embodiment.

FIG. 59 is a diagram showing one example of trap windows in the error detection circuit 650 in the second modification example of the fourth embodiment. In the error detection circuit 650 in the second modification example, a third trap window and a fourth trap window are added.

The third trap window is the period in which the latch 659 detects the error flag ERR3. This period is obtained by adding the delay time of the delay section 479 after the second trap window.

The fourth trap window is the period in which the latch 672 detects the error flag ERR4. This period is from the timing preceding the rising edge of the clock signal CLK by the delay time of the delay section 472 to the end point of the first trap window.

By using these error flags, the error compensation controller 800 and the power supply section 200 can analyze the error and carry out error compensation more accurately.

For example, if all of the error flags are "0" at the previous time and only the error flag ERR3 is "1" at the present time, the power supply section 200 boosts the clock distribution circuit drive voltage vCK to a set value lower than Vac.

Furthermore, if all of the error flags are "0" at the previous time and only the error flag ERR4 is "1" at the present time, the error compensation controller 800 issues an alert on setup violation. If only the error flag ERR4 is "1" at the previous time and all of the error flags are "1" at the present time, the error compensation controller 800 detects the setup violation error.

A trap window may be further added to the error detection circuit 650 by adding latches and inverters. Furthermore, the trap window added to the first trap window is optional. For example, the integrated circuit 100 may add only the fourth trap window to the first trap window or may add only the second trap window and the third trap window to the first trap window.

As above, according to the second modification example, the error detection circuit 650 has at least three trap windows and therefore more accurate error analysis can be performed.

The integrated circuit 100 of the above-described fourth embodiment may include the clock distributor 400 of the first embodiment instead of the clock distribution circuit 410 and distribute the minimally-delayed clock signal mCLK to the synchronous operation circuit 500. This further reduces clock skew. Similarly, the integrated circuit 100 of the fourth embodiment may include the clock distribution circuit controller 700 and the clock distributor 400 of the second embodiment instead of the clock distribution circuit 410 and distribute the minimally-delayed clock signal mCLK to the synchronous operation circuit 500.

The above-described embodiments are one example for embodying the present technique and matters in the embodiments and invention-specifying matters in the claims have a correspondence relationship. Similarly, invention-specifying matters in the claims and matters given the same names as those of them in the embodiments of the present technique have a correspondence relationship. However, the present technique is not limited to the embodiments and can be embodied by giving various modifications to the embodiments without departing from the gist thereof.

The processing procedure explained in the above-described embodiments may be interpreted as a method having this series of procedure and may be interpreted as a program for causing a computer to carry out this series of procedure or a recording medium that stores the program. As this recording medium, e.g. compact disc (CD), MiniDisc (MD), digital versatile disk (DVD), memory card, and Blu-ray Disc (registered trademark) can be used.

It is also possible for the present technique to take the following configurations.

(1) An integrated circuit including a timing signal distribution circuit configured to distribute a timing signal that indicates predetermined timing, a synchronous operation circuit configured to operate in synchronization with the distributed timing signal, a logic circuit configured to perform predetermined logical operation based on an operation result of the synchronous operation circuit, and a power supply section configured to supply a voltage lower than a timing signal distribution circuit drive voltage to drive the timing signal distribution circuit as a logic circuit drive voltage to the logic circuit.

(2) The integrated circuit according to the above-described (1), wherein the power supply section further supplies a voltage having the same voltage value as a voltage value of the logic circuit drive voltage to the synchronous operation circuit.

(3) The integrated circuit according to the above-described (1), wherein the power supply section further supplies a voltage having the same voltage value as a voltage value of the timing signal distribution circuit drive voltage to the synchronous operation circuit.

(4) The integrated circuit according to the above-described (1) to (3), wherein the power supply section includes a timing signal distribution circuit drive voltage controller that drops a supply voltage and supplies the dropped voltage as the timing signal distribution circuit drive voltage to the timing signal distribution circuit, and a logic circuit drive voltage controller that drops the supplied timing signal distribution circuit drive voltage and supplies the dropped voltage as the logic circuit drive voltage to the logic circuit.

(5) The integrated circuit according to the above-described (1) to (3), wherein the power supply section includes a timing signal distribution circuit drive voltage controller that drops a supply voltage and supplies the dropped voltage as the timing signal distribution circuit drive voltage to the timing signal distribution circuit, and a logic circuit drive voltage controller that drops the supply voltage to a voltage lower than the timing signal distribution circuit drive voltage and supplies the dropped voltage as the logic circuit drive voltage to the logic circuit.

(6) The integrated circuit according to the above-described (1) to (5), further including an error detector configured to detect an error in the synchronous operation circuit, wherein the power supply section boosts the timing signal distribution circuit drive voltage if detection frequency of the error is equal to or higher than a predetermined value.

(7) The integrated circuit according to the above-described (6), wherein the power supply section boosts the logic circuit drive voltage (vDP) if the detection frequency of the error is equal to or higher than the predetermined value.

(8) An integrated circuit including a timing signal distribution circuit configured to distribute a timing signal that indicates predetermined timing, a synchronous operation circuit configured to operate in synchronization with the distributed timing signal, a logic circuit configured to perform predetermined logical operation based on an operation result of the synchronous operation circuit, and a power supply section configured to supply a voltage higher than a logic circuit drive voltage to drive the logic circuit as a timing signal distribution circuit drive voltage to the timing signal distribution circuit if the logic circuit drive voltage is lower than a first voltage.

(9) The integrated circuit according to the above-described (8), wherein the power supply section supplies a voltage lower than the logic circuit drive voltage as the timing signal distribution circuit drive voltage to the timing signal distribution circuit if the logic circuit drive voltage is higher than a second voltage that is a voltage higher than the first voltage.

(10) The integrated circuit according to the above-described (8) or (9), wherein the power supply section keeps constant difference between a voltage value of the logic circuit drive voltage and a voltage value of the timing signal distribution circuit drive voltage if the logic circuit drive voltage is lower than the first voltage.

(11) The integrated circuit according to the above-described (10), wherein the power supply section supplies the first voltage as the timing signal distribution circuit drive voltage to the timing signal distribution circuit if the logic circuit drive voltage is lower than the first voltage.

The present disclosure contains subject matter related to that disclosed in Japanese Priority Patent Application JP 2011-197941 filed in the Japan Patent Office on Sep. 12, 2011, the entire content of which is hereby incorporated by reference.

It should be understood by those skilled in the art that various modifications, combinations, sub-combinations and alterations may occur depending on design requirements and other factors in so far as they are within the scope of the appended claims or the equivalents thereof.

What is claimed is:

1. An integrated circuit comprising:
a timing signal distribution circuit configured to distribute a timing signal that indicates predetermined timing;
a synchronous operation circuit configured to operate in synchronization with the distributed timing signal;
a logic circuit configured to perform predetermined logical operation based on an operation result of the synchronous operation circuit; and
a power supply section configured to supply a voltage lower than a timing signal distribution circuit drive voltage to drive the timing signal distribution circuit as a logic circuit drive voltage to the logic circuit,
wherein the power supply section includes:
a timing signal distribution circuit drive voltage controller that drops a supply voltage and supplies the dropped voltage as the timing signal distribution circuit drive voltage to the timing signal distribution circuit, and
a logic circuit drive voltage controller that drops the supplied timing signal distribution circuit drive voltage and supplies the dropped voltage as the logic circuit drive voltage to the logic circuit.

2. The integrated circuit according to claim 1, wherein the power supply section further supplies a voltage having the same voltage value as a voltage value of the logic circuit drive voltage to the synchronous operation circuit.

3. The integrated circuit according to claim 1, wherein the power supply section further supplies a voltage having the same voltage value as a voltage value of the timing signal distribution circuit drive voltage to the synchronous operation circuit.

4. An integrated circuit comprising:
a timing signal distribution circuit configured to distribute a timing signal that indicates predetermined timing;
a synchronous operation circuit configured to operate in synchronization with the distributed timing signal;
a logic circuit configured to perform predetermined logical operation based on an operation result of the synchronous operation circuit;

a power supply section configured to supply a voltage lower than a timing signal distribution circuit drive voltage to drive the timing signal distribution circuit as a logic circuit drive voltage to the logic circuit; and an error detector configured to detect an error in the synchronous operation circuit, wherein the power supply section boosts the timing signal distribution circuit drive voltage if detection frequency of the error is equal to or higher than a predetermined value.

5. The integrated circuit according to claim 4, wherein the power supply section boosts the logic circuit drive voltage if the detection frequency of the error is equal to or higher than the predetermined value.

6. An integrated circuit comprising:

a timing signal distribution circuit configured to distribute a timing signal that indicates predetermined timing;

a synchronous operation circuit configured to operate in synchronization with the distributed timing signal;

a logic circuit configured to perform predetermined logical operation based on an operation result of the synchronous operation circuit; and a power supply section configured to supply a voltage higher than a logic circuit drive voltage to drive the logic circuit as a timing signal distribution circuit drive voltage to the timing signal distribution circuit if the logic circuit drive voltage is lower than a first voltage, wherein the power supply section supplies a voltage lower than the logic circuit drive voltage as the timing signal distribution circuit drive voltage to the timing signal distribution circuit if the logic circuit drive voltage is higher than a second voltage that is a voltage higher than the first voltage.

7. The integrated circuit according to claim 6, wherein the power supply section keeps constant difference between a voltage value of the logic circuit drive voltage and a voltage value of the timing signal distribution circuit drive voltage if the logic circuit drive voltage is lower than the first voltage.

8. The integrated circuit according to claim 6, wherein the power supply section supplies the first voltage as the timing signal distribution circuit drive voltage to the timing signal distribution circuit if the logic circuit drive voltage is lower than the first voltage.

* * * * *